US006040829A

United States Patent [19]
Croy et al.

[11] Patent Number: 6,040,829
[45] Date of Patent: Mar. 21, 2000

[54] PERSONAL NAVIGATOR SYSTEM

[76] Inventors: Clemens Croy, Staufenstrasse 39, 60323 Frankfurt am Main; Rainer F.R. Bermbach, Billrothstrasse 7, D-38302 Wolfenbüttel, both of Germany

[21] Appl. No.: 09/078,604

[22] Filed: May 13, 1998

[51] Int. Cl.[7] .................................................. G06F 3/00
[52] U.S. Cl. ................... 345/327; 345/352; 345/146; 345/353; 348/3; 348/13; 348/734; 348/731; 348/906; 455/158.5; 455/186.2; 455/352
[58] Field of Search ................................. 345/327, 352, 345/353, 146; 348/3, 13, 734, 731, 906; 455/158.5, 186.2, 352

[56] References Cited

U.S. PATENT DOCUMENTS

| | | | |
|---|---|---|---|
| 5,410,326 | 4/1995 | Goldstein | 348/134 |
| 5,541,738 | 7/1996 | Mankovitz | 358/335 |
| 5,710,605 | 1/1998 | Nelson | 348/734 |
| 5,724,106 | 3/1998 | Autry et al. | 348/734 |
| 5,734,444 | 3/1998 | Yoshinobu | 348/731 |
| 5,751,373 | 5/1998 | Ohyama et al. | 348/569 |
| 5,901,366 | 4/1999 | Nakano et al. | 455/575 |

*Primary Examiner*—Ba Huynh
*Assistant Examiner*—Tadesse Hailu
*Attorney, Agent, or Firm*—Blakely, Sokoloff, Taylor & Zafman LLP

[57] ABSTRACT

A hand-held device and system for monitoring and controlling electronic devices is disclosed. In one embodiment, a control device for monitoring and controlling an electronic device, includes: 1) a base unit including a microcontroller and an interface coupled to the microcontroller for receiving external information; and 2) a personal navigator coupled to the base unit via a data link, the personal navigator further including a display component for displaying a dual partition selection list including at least a portion of the external information received from the interface, the dual partition selection list further includes a first selection list and a second selection list, at least a portion of the first selection list and at least a portion of the second selection list being at least partly concurrently displayable on the display component.

40 Claims, 56 Drawing Sheets

| 20.00 | ABC | SEINFELD |
| 20.35 | CH4 | ER |
| 20.55 | AMC | GONE WITH THE WIND |
| 22.05 | CNN | HEADLINE NEWS |
| 22.45 | DIS | BAMBI |
| 23.30 | MTV | SOUNDGARDEN LIVE |
| MARK | ←— Misc. —→ Evening | INFO |

| | | | | | | |
|---|---|---|---|---|---|---|
| 19.30 MTV TOP 10 HITS | 20.00 MTV INTERVIEW WITH EDDIE VAN HALEN | 20.30 MTV LATEST VIDEOS | 22.55 MTV PREVIEWS | 21.00 MTV U2 IN CONCERT | 23.00 MTV ROCK NEWS | Station→ MTV→ All →Evening  INFO |

MARK

FIG. 29

| 20.00 | ABC | SEINFELD |
| 20.35 | CH4 | ER |
| 20.55 | AMC | GONE WITH THE WIND |
| 22.05 | CNN | HEADLINE NEWS |
| 22.45 | DIS | BAMBI |
| 23.30 | MTV | SOUNDGARDEN LIVE |
| MARK | Keyword→Actor→Atikinson, Rowan | INFO |

| Time | Channel | Program |
|---|---|---|
| 20.00 | ABC | LIVE AT THE MET |
| 20.35 | CH4 | BOSTON POPS |
| 20.55 | AMC | AMADEUS |
| 22.05 | NBC | CLASSICAL HOUR |
| 22.45 | CH11 | NY PHILHARMONIC |
| 23.30 | CH25 | BEETHOVEN SYMPHONIES |

MARK | pic → Music → Classics → Evening | INFO

FIG. 43

PERSONAL NAVIGATOR SYSTEM

FIELD OF THE INVENTION

The present invention relates to the field of control devices for user control of home appliances. Particularly, the present invention relates to a control device having access to network delivered information

BACKGROUND OF THE INVENTION

It has become increasingly important to enable home consumers to obtain and use a wealth of information received from outside the home or business and to use such information for viewing or controlling home/business appliances or consumer electronics. In recent times, the Internet and the World Wide Web (WWW) have been important new sources of electronic information. In addition, radio and television broadcasts available via cable or satellite communications are also additional sources of information available for the home or business consumer. Additionally, the conventional telephone network is yet another source of information and a valuable information communication medium.

Although these various forms of information sources and electronic communication media exist, the prior art systems have been unable to effectively combine these information sources and communication media into a readily usable and convenient control device. Because the information sources provide such a wealth of information in a highly divergent set of formats, it has been particularly difficult to combine this divergent information into a convenient and robust control device. Moreover, because each of the various information sources may not be available at all locations, it is necessary to provide a control device that is uniformly useful no matter where it may be deployed.

Various forms of prior art devices exist. For example, U.S. Pat. No. 5,710,605 entitled "Remote Control Unit for Controlling a Television and Video Cassette Recorder with a Display for Allowing a User to Select Between Various Programming Schedules" discloses a universal remote control unit for controlling a television and videocassette recorder. The device includes a data input mechanism securable to a telephone line for receiving signals from an external supplier representing television programming schedule items. The device includes a display mechanism for displaying television programming schedule items and television and videocassette operating functions in a hierarchy of textual and scrollable selection lists. The device also includes a user-operable selector mechanism for allowing a user to scroll through the lists and then select television programming schedule items or television and videocassette functions. Although the device provides a wealth of functionality, the user interface is excessively complex and confusing. The user is presented with a myriad of buttons and menu displays, which easily confuse an unsophisticated user. Further, the device provides only a telephone line link for receiving external information via the telephone network.

Further, other devices exist in the prior art for receiving information via the vertical blanking interval (VBI) in a cable television transmission. Using the VBI, data can be transmitted across a video cable at the same time as real-time video images are transmitted on the cable. Using this technique, data can be transmitted to a wide audience using the cable television infrastructure. Many conventional set-top boxes are coupled to such cable TV systems and receive data transmitted during the VBI.

Other prior art systems describe various ways of displaying and manipulating electronic programming guide (EPG) information on a conventional television (TV) monitor. These on-screen television guides necessarily interrupt the standard video signal while the user is manipulating the EPG display on the monitor. Such interruptions affect all those who are viewing the monitor. Further, no privacy can be provided for a user manipulating the EPG information if the information is displayed on the TV monitor.

Thus, a better control device is needed for receiving information from external sources and for using the information for controlling home appliances.

SUMMARY OF THE INVENTION

A hand-held device and system for monitoring and controlling electronic devices is disclosed. In one embodiment, a control device for monitoring and controlling an electronic device, includes: 1) a base unit including a microcontroller and an interface coupled to the microcontroller for receiving external information; and 2) a personal navigator coupled to the base unit via a data link, the personal navigator further including a display component for displaying a dual partition selection list including at least a portion of the external information received from the interface, the dual partition selection list further includes a first selection list and a second selection list, at least a portion of the first selection list and at least a portion of the second selection list being at least partly concurrently displayable on the display component.

BRIEF DESCRIPTION OF THE DRAWINGS

FIGS. 12–53 illustrate various screen displays and menu configurations for invoking the various functionality enabled by the present invention.

DETAILED DESCRIPTION OF THE PREFERRED EMBODIMENT

A hand-held device and system for monitoring and controlling electronic devices using a dual partition user interface with a dual partition selection means is disclosed. In the following description, for purposes of explanation, numerous specific details are set forth in order to provide a thorough understanding of the present invention. It will be evident, however, to one of ordinary skill in the art that the present invention may be practiced without these specific details. In other instances, well-known structures and devices are shown in block diagram form in order to avoid unnecessarily obscuring the present invention.

The Personal Navigator (referred to herein as the PN) is a hand-held device which forms a general, nearly unlimited standard user-interface for home appliance control, including television, video cassette recorder (VCR), and stereo control, and applications including ("Home Browsing"). The PN is equipped with a display unit and selection means to choose among the possible functions and features of the PN. A diagram of the preferred embodiment of the present invention is illustrated in FIG. 3. Block diagrams of the base station 100 and PN 200 are shown in FIGS. 1 and 2, respectively.

Figure 1:
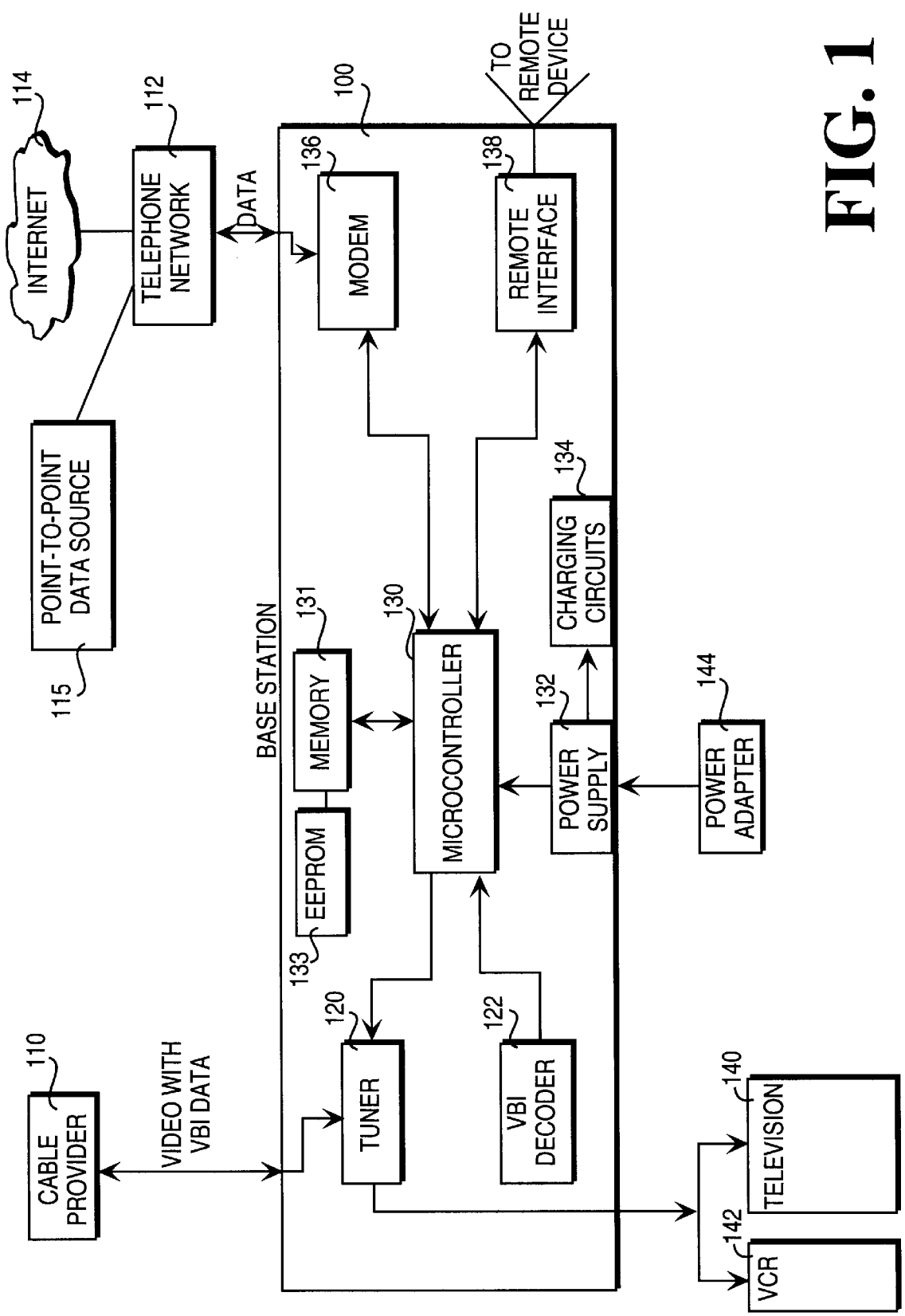
FIG. 1 illustrates a block diagram of the architecture of the base station of the preferred embodiment.
Figure 2:
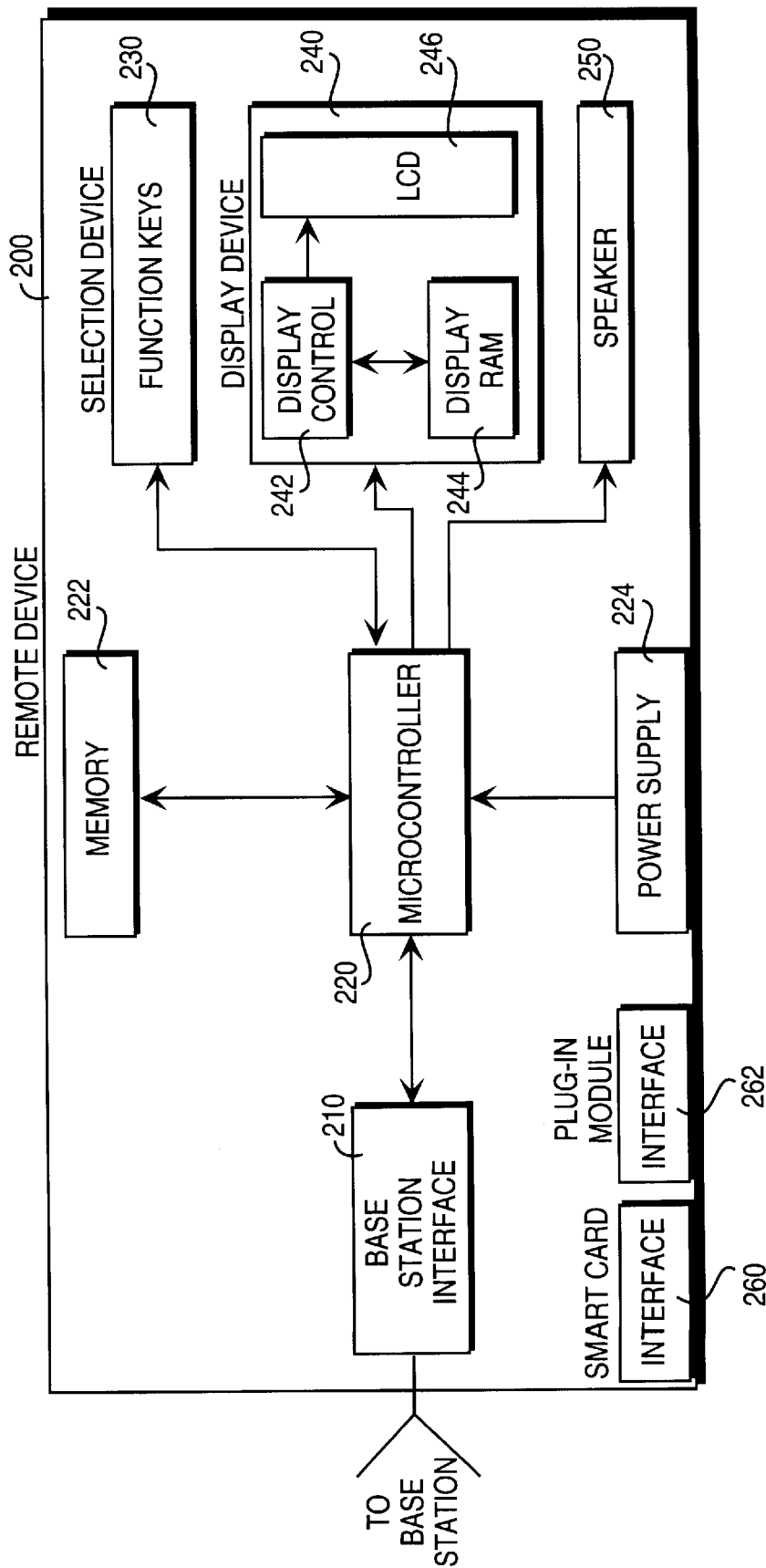
FIG. 2 illustrates a block diagram of the architecture of the remote unit of the preferred embodiment.

Referring now to FIG. 1, a block diagram illustrates the system architecture of the base station of the preferred embodiment of the present invention. The base station 100 receives external information from a cable television provider 110 and/or external information received from the Internet 114 or other digital sources 115 via telephone network 112. In regard to the external information received from cable provider 110, a video signal with digital data inserted in the vertical blanking interval (VBI) is received by base station 100 and a tuner 120 therein. It will be apparent to those of ordinary skill in the art that there are alternative techniques other than the use of the VBI to transmit data with a video signal. For example, the overscan portion of a video signal or a separate carrier may be used for the transmission of data with a video signal. Tuner 120 separates out the various channels received from cable provider 110. The raw video signals can be passed through to television 140 or videocassette recorder (VCR) 142 as a standard video input. VBI decoder 122, coupled to tuner 120, receives a data stream in the vertical blanking interval (VBI) of a particular predetermined channel. Using conventional techniques, the data encoded in VBI can be extracted and provided to a microcontroller 130. As mentioned above, VBI decoder 122 may alternatively be another conventional type of decoder for decoding data from the overscan portion or a separate carrier on the predetermined channel. Microcontroller 130 decodes the information, descrambles it (if necessary) and looks for service and control information in the VBI information. For example, enabling or disabling signals of the PN service will cause the base station controller 130 to send data to the remote device 200 or not (conditional access). Microcontroller 130 receives the VBI encoded data as one source of external information provided to base station 100.

In addition or solely, base station 100 may include modem 136 for receiving digital information via the conventional telephone network 112. Using conventional technology, modem 136 can be coupled via telephone network 112 to the Internet 114 via an Internet service provider (not shown). Additionally, modem 136 can be coupled through telephone network 112 to a point-to-point or proprietary data source 115 using conventional techniques. Information received from these external sources via telephone network 112 is passed through modem 136 to microcontroller 130 as an additional external information source. Alternatively, base station 100 may also include an interface for coupling the base station 100 to a conventional computer network. External information from a conventional computer network may then be received by the base station 100 and microcontroller 130 therein. Microcontroller 130 may then store this external information in memory 131 for subsequent processing.

Memory 131 may be a volatile type of memory such as a dynamic random access memory (DRAM) or a non-volatile form of memory such as flash memory or battery-backed CMOS memory. Microcontroller 130 and the other electronic components of base station 100 are powered by power supply 132, which receives external power through power adapter 144. Power supply 132 may also be used to supply an internal power source for charging circuits 134, which are used to charge the batteries of the remote device 200.

Microcontroller 130 includes an interface to a remote interface device 138 with which base station 100 may communicate with the remote device 200 or personal navigator (PN) of the present invention. Remote interface 138 may be a conventional infrared (IR) link with a corresponding interface transmitter/receiver 210 within remote device 200. If an IR interface is used, the transmission of data can be one-way (i.e. from remote device 200 to base station 100) or two-way (i.e. both the base station 100 and the remote device 200 have IR transmitters and IR receivers). In an alternative embodiment, remote interface 138 may be a direct coupling connection between base station 100 and remote device 200. Direct coupling can mean a simple point to point connection e.g., with digital logic or optical levels. This also includes the use of standard interfaces (parallel or serial), such as Centronics (PC parallel port), or serial communications via RS232 or RS422, use of standard networks like ethernet, or even such enhanced communication interfaces like SCSI, USB (universal serial bus) or even IEEE1394 Firewire. In fact, one could use any kind of standard interface available in a conventional set-top box, personal computer, or information appliance. In addition, these direct coupling interface configurations include all those interfaces using galvanic, i.e. direct electrical contacts or other means such as optical isolation or magnetic/capacitor means. In another alternative embodiment, the remote interface 138 may be a wireless radio frequency (RF) communication interface between the remote device 200 and the base station 100. Such RF communication methods are well known and used, for example, in cordless telephones.

For identification of the present invention, a unique number resides inside the base station 100 secure within EEPROM 133. The unique identification number is preloaded at manufacture time and enables the base station 100 and the PN 200 to be uniquely identified from all other similar devices. Alternatively, the identification number, secured in an EEPROM or similar conventional non-volatile memory device, may also be stored in the PN 200 itself. In this manner, the PN 200 can be uniquely identified.

If the hand-held PN device 200 is coupled to the base station 100 via electrical contacts, the PN 200 is supplied with information (in addition to charging the batteries) only when PN 200 is coupled to the base 100. In this case, no buffer memory is needed inside the base 100. The technically most simple form of supplying the PN hand-held device 200 with information is transmitting the data via galvanic connectors during charging of the batteries. If programming changes are transmitted more often than other data, laying back the hand-held device 200 onto the base station 100 even for a short span of time will be sufficient to update PN 200 data contents. Having the hand-held 200 on the base 100 for several hours to charge the batteries, e.g. over night, there is plenty of time to update all information and even application programs inside the hand-held device 200. In addition to information downloaded to the hand-held device 200, data, especially configuration information, is also uploaded from the hand-held device 200 into the base station 100. This will prevent a totally new installation of the hand-held device 200 if the batteries have drained completely.

Referring now to FIG. 2, a block diagram illustrates the internal architecture of the remote device (PN) 200 of the preferred embodiment of the present invention. Remote device 200 includes a base station interface 210 for receiving and transmitting data with the base station 100. As described above, base station interface 210 may be a conventional IR or RF wireless data interface or a conventional hard-wired data connection. Data received by remote device 200 via base station interface 210 is fed to microcomputer 220 within remote device 200. Microcomputer 220 may then store this information in memory 222. Memory 222 may be a conventional dynamic random access memory (DRAM), a static random access memory (SRAM), or a non-volatile form of memory such as flash memory or battery-backed CMOS memory. Microcomputer 220 and the other electronic components of remote device 220 are powered using power supply 224.

Remote device 200 includes a selection device 230 and output devices including display device 240 and speaker 250. Selection device 230 includes an array of function keys, softkeys, alphanumeric keys or other input keys for providing user input and command selections. This input is provided through selection device 230 to microcomputer 220. Display device 240 provides a means by which information and command selections may be displayed on remote device 200 to a user. Using a conventional liquid crystal display (LCD) device, microcomputer 220 can formulate information displays and command selection menus for display on display device 240. Display device 240 includes a display control component 242 including logic for controlling the display of information on LCD 246. In addition, display device 240 includes a display memory (RAM) 244 used for retaining information for display on LCD 246. Speaker 250 is used to provide output for audible information as controlled by microcomputer 220.

Optionally, the remote device 200 can be equipped with a reading interface 260 for smart cards (SC) and the like or a plug-in module interface 262. The smart cards can be cards with the standard magnetic stripe or more advanced with built-in memory or computer chip. Readout may be done directly (reading the magnetic information or using contacts for getting the data galvanicly off the chip) or indirectly using e.g. inductive or capacitive coupling. In some cases, it may be useful to build the interface into the base station 100 (or the set-top box with which the remote device 200 is working).

Such smart cards can be used for identification or they can supply a small amount of (e.g. decremented) data to enable services e.g. like telephony cards. Also, a conventional money card/cash card may be used to pay for services or load cash onto the card. In the future, SC's may be used to store complete software applications, program code and/or data, which is loaded into the remote device 200. There, they will run on the built-in hardware and/or simply present the data on the card in a special way. Taken to the extreme, the remote device 200 may serve only as a user interface, while the actual application runs on the smart card.

The smart card is useful, especially when the remote device 200 is working with an on-line central server. This may be done through a modem in the base station 100 or the set-top box or a special channel (in-band or out-of-band) of the cable system. The remote device 200 then typically will be equipped with a wireless communication capability (infrared/radio frequency) to the base station to directly interact with the server system at the central point. The remote device 200 and base station 100 transmission is encrypted like the total communication session (see below) for more security.

The remote device 200 allows operation with different smart cards of different service providers. Inserting the smart card into the remote device 200 will activate a suitable mode, e.g. starting the selection menu for that special service. In addition, the customers using the remote device 200 can be prompted to input the smart card after selecting a special menu item on the remote device 200 display 240. The remote device 200 may be used to store personal profiles of the customer internally (or externally on the smart card), e.g. the user's sizes of clothing or personal preferences.

After reading the smart card, the user may additionally be asked to identify himself/herself through input of a smart card personal identification number (PIN, number, or code) for enabling special services. Even more security can be provided if the service access is combined with a special PIN for that specific remote device 200. In addition, identification can be performed using conventional biometric analysis, fingerprint analysis, or eye scanning techniques, instead of or in addition to the above-described PIN technique.

The latter security model will allow for critical services limited for use only with a particular unique remote device 200. This feature is enabled through the unique identification number/code of each remote device 200. For example, a "login process" will establish a secure (encrypted) communication path with (at least) one known central server. The use of conventional ciphered communication will enable secure identification and transactions with the customer. Applying conventional banking standards for encryption and communication protocols will enable the remote device 200 to take part in modem home-banking business.

After identifying himself/herself, the customer will be able to do home-shopping, internet-shopping, home-banking, pay for services (as pay TV, (N)VOD, PPV) or other special services of his/her conventional set-top box.

"Logging in", that is additionally identifying the user through PIN and number/code of the remote device 200 will set up even further possibilities for the user. For example, the user's credit limits granted by the service provider (or via direct bank contact) may be used to allow couch-shopping of more expensive goods and services. In addition, identification can be performed using conventional biometric analysis, fingerprint analysis, or eye scanning techniques, instead of or in addition to the above-described PIN technique.

Currently, the memory 222 of the PN hand-held 200 is designed to meet the requirements of the standard EPG navigation purpose. A simple interface for memory expansion can be included to cope with new demands. New software applications or updates may be downloaded to the hand-held device 200 from the base station 100 if additional expansion memory is provided.

By use of the EPG capability of the present invention, a user of the remote device 200 can scan through the available television channels (by channel increment/decrement or input of a channel number). Concurrently, a message on the PN 200 is displayed to identify the program running on that channel at that very moment. The user may receive additional information on that program by selection of a function key on the PN 200. In this manner, a user can identify whether a channel contains something of interest even when a commercial is running on the channel.

The EPG data received contains ranking in terms of the "quality" of a transmission or in terms of the content of the program, such as whether the program shows sex or violence. In a special setup mode, the PN 200 may be configured to not list programs or to disable switching to a channel showing a program above or below a particular quality or content threshold. These settings can be password protected so children are unable to change the configuration.

The PN 200 and base 100 hardware normally comes fully equipped with the software and firmware needed for an application. As each system is individually addressable, as described above, broadcast information as well as individual information may be supplied to the base station 100 and the PN hand-held device 200. Thus, the software in the base station 100 and in the hand-held device 200 can be received via external sources just as any other external information.

An electronic program guide (EPG) typically does not need a back channel from the customer's home/business to the information source location. In spite of that, there are a lot of possible applications, which will benefit from the availability of a backward communication facility.

In the present invention, the telephone network 112 and modem 136 may be used as a back channel for sending information from the PN 200 or base 100 to the information provider. Alternatively, the PN 200 may use radio frequency (RF) signals via cable as implemented for conventional Pay-Per-View (PPV) services, a cable modem, and/or a separate channel on the cable.

Referring to FIG. 3, the PN 200 is shown removably inserted and electrically coupled into the base station 100. The PN includes a display unit 240 and various function keys 310, 311, and 312. Menus or selection lists are displayed for the user on display 240.

Selection can be performed by using (sole or in combination) dedicated keys, so-called softkeys and function keys 310 and 311 (functions controlled by contents displayed in the display, positioned on any side of the display 240 in any combination, preferably left and right to the display 240), active display areas (stylus or finger touch selection) and/or voice input. Additionally, even such advanced technologies as voice input or eye focussing may be used (by special equipment the direction of the eye's look is detected and used to pick a menu item for selection).

The selection means serve to choose from fixed functions (dedicated keys) or from menus displayed on the screen of the PN display device 240, the content of which is varying during the selection process. The menus may be presented in form of selection lists (scrolling or fixed lists) or preferably in form of "Ping Pong Menus". The term "Ping Pong Menus", as used herein, refers to the selection of one item from a selection list on one side of the display 240 causing a new (context dependent) menu or submenu for further selections to appear on the other side of the display 240. A further user selection causes the new menu or submenu to appear on the original side of the display 240. This back-and-forth menu display action resembles back-and-forth action in a ping pong game. The dual-sided ping pong menu structure also supplies a visual cue for the user to find the way back in the menu hierarchy. The selection means may be designed for use in one- (for left- or right-handers) or two-handed style.

The PN 200 includes a selection for invoking a "Back" function, which causes the PN 200 to redisplay a previous submenu. In this manner, the user may "undo" a current selection by using the "Back" selection to go back to a previous menu and making another selection. In addition, a "Menu" selection is provided by the PN 200, which allows the user to activate the menu hierarchy from the top. In this way, the user can go all the way back to the beginning and begin a new sequence of function selections and submenu displays.

Using the PN 200 menus, a lot of menu items may be very often selected, others seldom or never selected. This user specific selection pattern is recorded in the PN 200 to enable rearrangement of the menus such that the more interesting (i.e. most often selected) items appear on the first (or topmost) positions and/or are presented in more detail. The less interesting (i.e. the least often selected) will slide to the lower positions or vanish completely from most menus (i.e. will only be included in 'all' selections). This automatic adoption of user preference may be enabled or disabled by the user. In addition, the user can select explicit preferences (s)he wants to see often and explicit preferences may be used to specify the position of the menu items.

The memory in the PN 200 is limited, so only a certain amount of information (program data and additional information related to the programs) can be stored in the PN 200. Most people do not regularly watch all television channels, but use only, say ten channels, for example. In this case, the PN 200 may store additional information on the transmissions of these ten often viewed channels and less information on the other channels that are seldom viewed. The same policy applies to certain types of programs. As user viewing and selection habits change, the PN 200 adapts itself to the user automatically by tracking current user selections.

The functions and features of the PN 200 are primarily built-in. But most of the information and data to be processed and displayed will be loaded into the PN 200 from an external source. Also, the code for special or new functions may be loaded into the PN 200 for temporary or continuos use (software/firmware update). The PN 200 may download its own software (not only data) thus adapting itself to future needs.

The sources for additional or external data or code for the PN 200 may be via any one of the following:

1) memory card, chip card, smart card, plug-in modules via a smart card interface 260 or a plug-in module interface 262;
2) download over broadcasting networks: TV analog/digital; terrestrial, cable, satellite; VBI, dedicated channel, part of information multiplex (digital channel); in-band, out-of-band; unidirectional or bi-directional; radio analog/digital (digital audio broadcast—DAB) and other RF services like pagers;
3) download over telecommunication networks: telephone line, RF mobile communication, cable modem, and power line networks (i.e. conventional companies, such as Echelon Corp. of Palo Alto, Calif. provide broadcast and point to point network communications using modulated signals on standard power lines); and/or
4) download from dedicated computer networks such as local area networks (LAN), metropolitan area networks (MAN), or wide area networks (WAN).

The base station 100 will work with its own dedicated interface to the abovementioned communication paths in a standalone configuration or the base station 100 can be (partly or totally) integrated into conventional analog/digital set-top boxes (STBs), television (TV) sets, videocassette recorders (VCRs), personal computers (PCs), or network computers (NCs). The PN 200 will be coupled to those base station 100 interfaces directly (e.g. galvanicly) or communicate via IR or RF connection.

The PN 200 is uniquely "identifiable" using a unique internal number, defined and incorporated into the base station 100 and/or each PN 200 at the time of manufacture. Thus, the PN 200 can be used for ordered services. By use of the unique internal number, the PN 100 is able to handle personal profiles ("personifiable") e.g., personal viewing choices on TV, own bookmarks for www, personal data, and the like based on the unique internal number.

Though the primary user-interface for the PN 200 is the hand-held display 240, an on-screen display on TV set 140 is also possible for example, if several people want to share the content (decision what to view, where to go, what to order) displayed by the present invention.

Though primarily intended for EPG use (electronic program guide), the PN 200 can be beneficial in a lot of applications as standard user-interface. Examples are given as follows:

(1) TV, VCR, music radio (EPG): scheduling, navigating, programming, service ordering, such as video on demand (VOD), near video on demand (NVOD), pay per view (PPV), impulse pay per view (IPPV), and other services;

(2) remote control (RC) for different TV sets, VCR's, satellite receivers, high fidelity (HI-FI) equipment, set-top boxes, and the like;

(3) terminal for "net-global" and personal messages, uni/bi-directional, email, home banking, home shopping, service ordering and the like;

(4) internet/www access: as navigator to find sites, also to display Web content;

(5) terminal for information services e.g., cinema/theater/opera schedule and ordering, weather forecast (hurricane warning), local news/events/activities, public information (opening hours . . . ), sport scores, stock quotes, traffic (jam, airport information), games, commercials, and the like;

(6) calendar, reminder, personal data base;

(7) remote control for household appliances: kitchen, air condition, heating, security, and the like; and/or (8) portable intelligent phone or video phone (if wireless base station communication).

In conventional analog cable systems, the present invention needs access to a specified channel, which carries its information in the VBI. There is a conflicting situation if that channel is not reachable because there is a cable TV structure where only one channel can be viewed at a time. Fortunately all households can receive one of a defined set of channels. So if the PN 200 data is traveling on the VBI of one of those channels and the base station has its own tuner/reception capability, continuous data transport is guaranteed.

As the channel mapping throughout the U.S. is not always consistent, the present invention may need to identify the channel map to use in an actual system. If channel programming or the multiple service operator (MSO) may automatically be recognized, the tuner 120 in the base station 100 will scan the available channels to get the necessary information.

All the PN 200 external information is received/transmitted in encoded format via data packets in the VBI of one or more channels or via the telephone network 112 or received/transmitted via the telephone network 112 alone. The information is received by the tuner 120 or modem 136 in the base station 100, that is individually addressable. If the service is enabled, data is fed to the hand-held PN 200, which the customer will use to navigate through the programming information received by the tuner 120 or modem 136.

Figure 54:
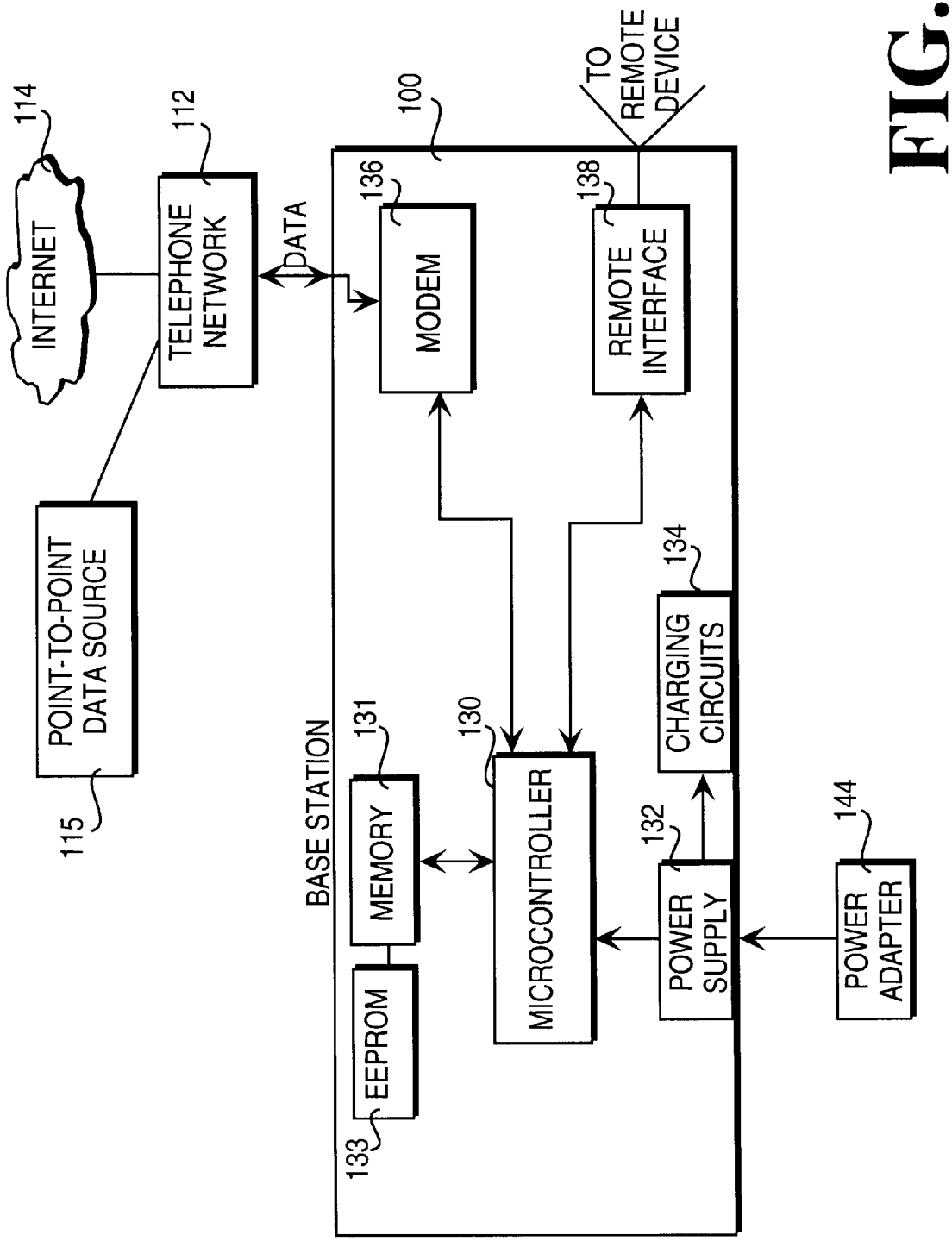
FIG. 54 illustrates a block diagram of an alternative embodiment of the architecture of the base station of the present invention.

In an alternative embodiment of the present invention, the data transport via VBI is replaced by the use of the telecommunication network alone. This embodiment is illustrated in FIG. 54. Note that the tuner 120, the decoder 122 and all antenna related parts can be omitted from the base station 100. Instead, a conventional modem 136 alone has been included.

From a cost point of view, the remote device 200, if only used for TV schedule navigation, needs only a simple conventional modem, e.g. 14400 bps (bits per second). Downloading, for example, 256 kbytes of new data will take approx. 3 minutes, which is fast enough in most situations. However, thinking of more robust features, especially WWW-access, a faster modem (up to 56 kBaud) would be more desirable.

At least one server must be installed to supply the remote device 200 with information transmitted over the Internet. One can start with a very simple server, which will grow proportionally to the number of subscribers. At some later time, several servers spread over the U.S. or other countries will be helpful.

The server for a remote device 200 is connected, through base station 100, with at least one Internet service provider (ISP) to allow access to the Internet through a user's dial-in points (local call) for the remote devices 200. During certain low-traffic time, the remote devices 200 installed will, in a randomly distributed fashion, call the ISP to get in contact with the server for the remote device 200.

Once a remote device 200 reaches the server, a secure communication session is opened to exchange data in a secure fashion. A remote device 200 identifies itself by sending its unique number/code. The secure communication session may also be the basis for additional services. In the preferred embodiment, the unique number/code can only be used one time per day to receive new data. This procedure additionally secures the system from illegal hardware clone systems. In some cases, the remote device 200 may also be called directly by a central system to initiate the communication session from the server side.

The external data the remote device 200 may receive depends on the services to which the particular customer has subscribed. In addition to the automatic dial-in during off-peak hours (e.g. during the night), the server can be called manually by the customer using the remote device 200 to get immediate updated external information (e.g. sports scores, news headlines, etc).

FIGS. 4 through 11 are flowcharts illustrating processing logic performed by the firmware or software within base station 100 and remote device 200. As would be apparent to one of ordinary skill in the art, this software or firmware can reside in memory 131 in base station 100 and be executed by microcontroller 130. Also, the firmware and software can reside in memory 222 of remote device 200 and be executed by microcontroller 220. It will also be apparent to one of ordinary skill in the art that the functionality described herein may be equivalently implemented on either base station 100 and/or remote device 200 or a remote device 200 combining the functionality of both base station 100 and remote device 200.

Figure 4:
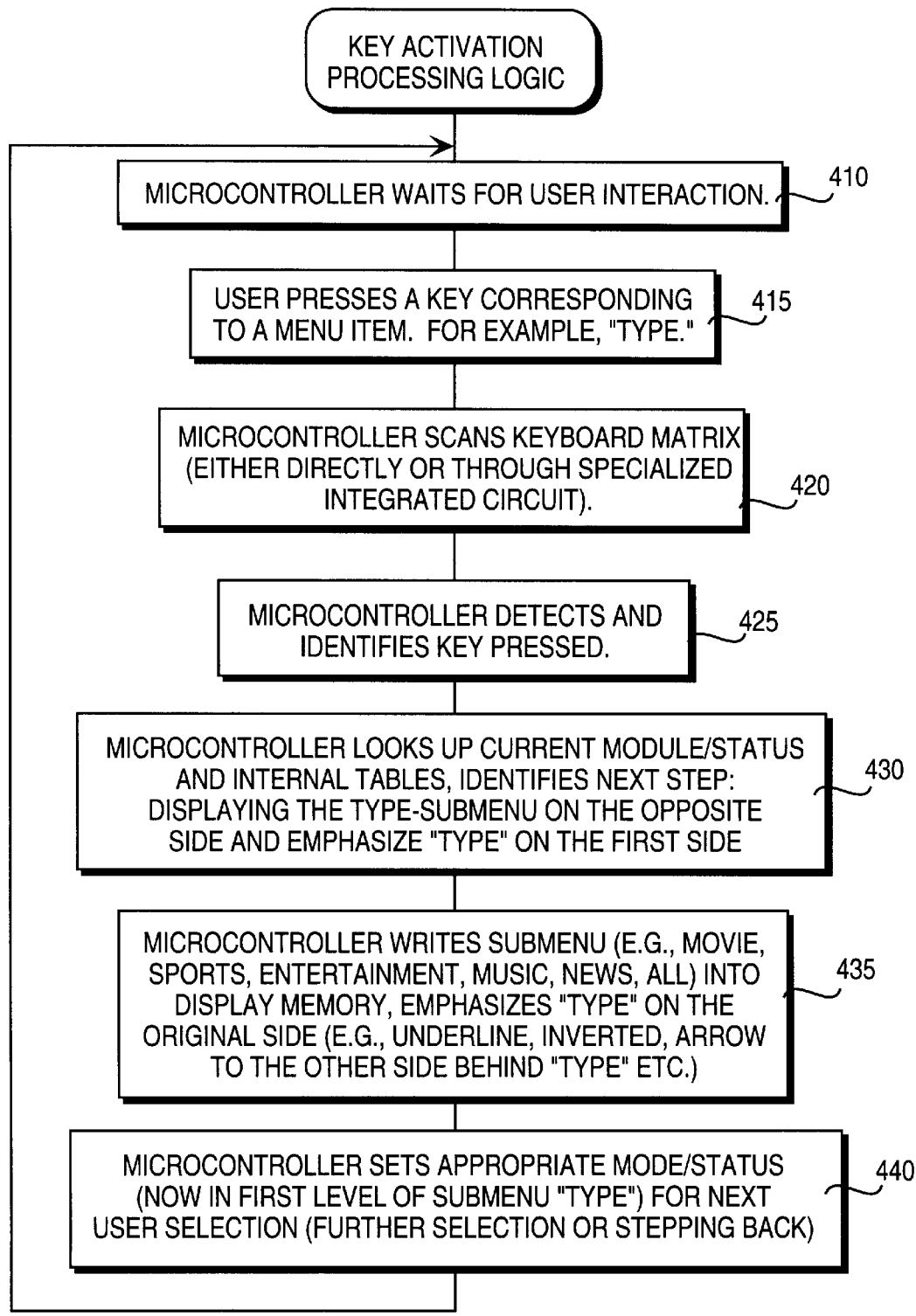
FIG. 4 is a flowchart illustrating the processing logic used in the preferred embodiment for handling key activations in the remote device.

Referring now to FIG. 4, a flow diagram illustrates a processing logic performed with a remote device 200 when a function key 230 is activated. In processing block 410, microcontroller 220 waits for user interaction with one of the function keys 230. When a user presses one of the function keys 230, microcontroller 220 receives the key activation in processing block 415. For example, the user may have entered a key activation corresponding to a "type" menu item. In processing block 420, microcontroller 220 scans the function key matrix 230 either directly or indirectly through a specialized integrated circuit. Such keyboard matrix integrated circuits are well known to those of ordinary skill in the art. In processing block 425, microcontroller 220 detects and identifies the key depressed by the user. In processing block 430, microcontroller 220 performs a lookup to determine the current mode and status corresponding to the depressed key using internal tables stored in memory 222. Using these tables, microcontroller 220 identifies a next step to perform in response to the key depression. For example, microcontroller 220 may display a submenu on the opposite side of the screen display on display device 240. This submenu would correspond to the menu item selected by the user. For example, the submenu may correspond to the "type" menu item. In processing block 435, microcontroller 220 writes the submenu corresponding to the menu item selected by the user into display memory 244. The selected menu item on the original side of the display device 240 is emphasized or highlighted to identify the selected menu item. In processing block 440, microcontroller 220 sets the appropriate mode or status indicators to correspond to the selected menu item. This action configures the software to accept the next user selection. As a result, a list of program(s) corresponding to the user selections is displayed and processing flow loops back to processing block 410 where microcontroller 220 waits for the next user function key activation.

Figure 5:
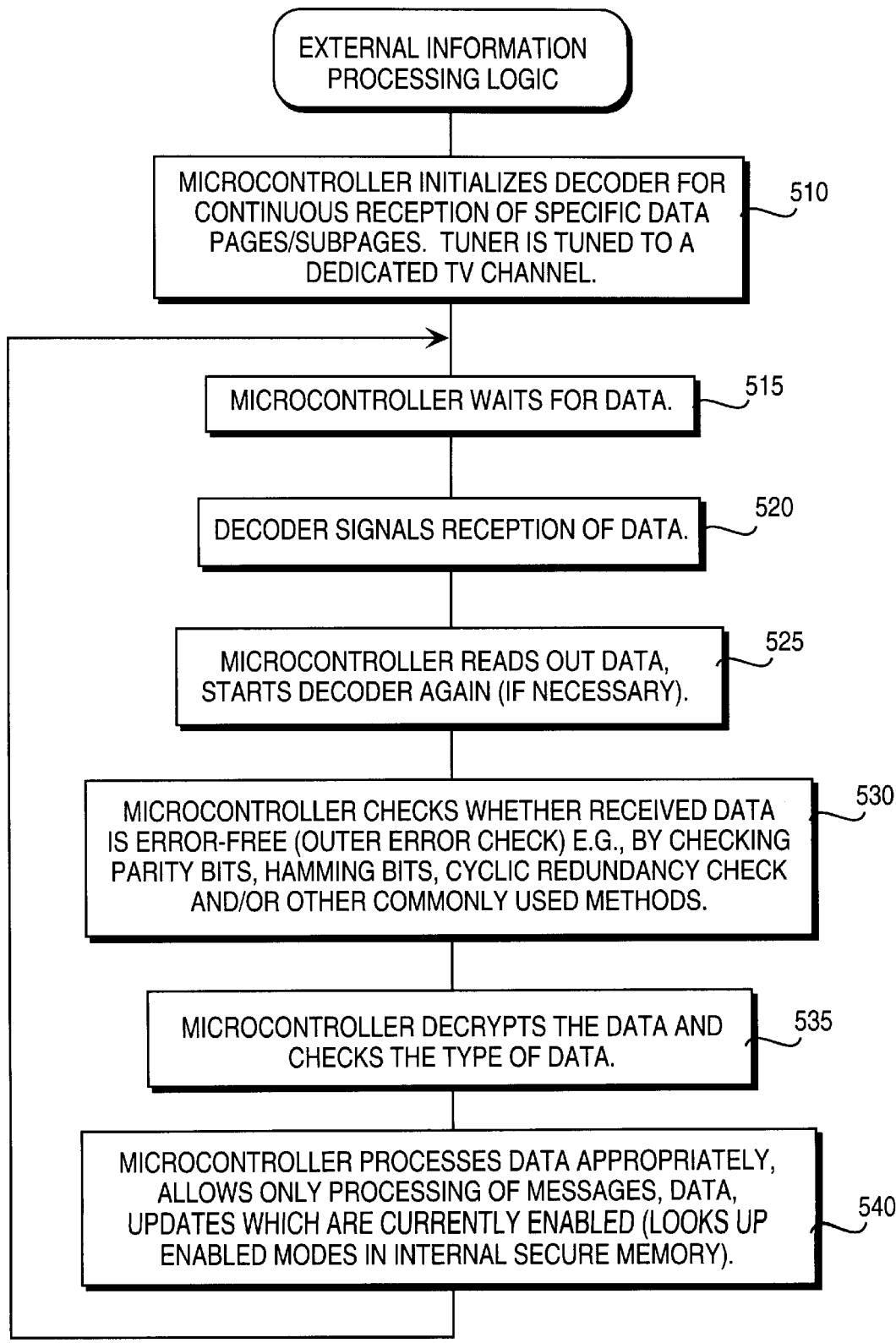
FIG. 5 is a flowchart illustrating the processing logic used in the preferred embodiment for processing the receipt of external information at the base station.

Referring now to FIG. 5, a flowchart illustrates the processing logic performed by base station 100 when it receives external information from cable provider 110 via the VBI portion of the video and data transmission from cable provider 110. Similar processing logic could be performed for external information received via telephone network 112 and modem 136.

In processing block 510, microcontroller 130 initializes decoder 122 for continuous reception of specific data in the form of pages or subpages. Tuner 120 is tuned to a dedicated TV channel to receive this data. In processing block 515, microcontroller 130 waits for data detected and decoded by decoder 122. In processing block 520, decoder 122 receives data from cable provider 110 through tuner 120. Decoder 122 signals microcontroller 130 of the reception and data. In processing block 525, microcontroller 130 reads the data provided by decoder 122 and enables decoder 122 to receive the next data transfer. In processing block 530, microcontroller 130 checks that the received data is error free by checking the parity bits, hamming bits, cyclic redundancy check, and/or other commonly used methods for validating the integrity of transferred data. In processing block 535, microcontroller 130 decrypts the received data and determines the type of the received data. In processing block 540, microcontroller 130 processes the data according to its type and according to the previously configured system parameters, which enable or disable the processing of particular messages or data types. The processing performed in processing block 540 is described in more detail in connection with FIGS. 6 through 11 as described below. Once microcontroller 130 processes the received data in processing block 540, processing loops back to processing block 515 where microcontroller 130 waits for the next data transmission.

Figure 6:
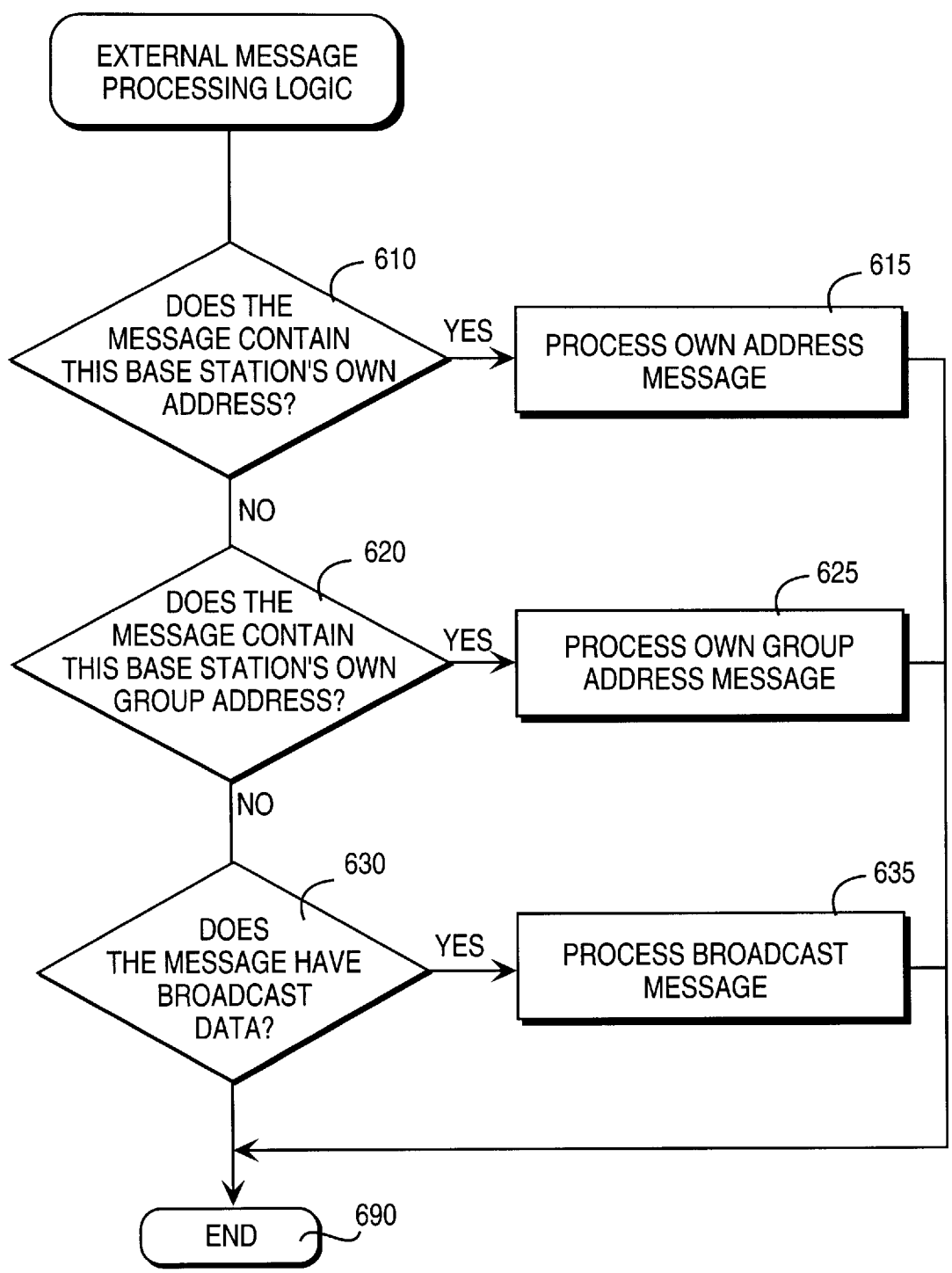
FIGS. 6–11 are more detailed flowcharts illustrating the processing logic used in the preferred embodiment for processing the receipt of external information at the base station.

Referring now to FIG. 6, the processing performed on external messages received by base station 100 is illustrated. As can be seen in FIG. 6, external messages received by base station 100 in the preferred embodiment can contain three types of addressing. In the first addressing type, the message can contain the address of an individual base station 100. In this situation, the addressed base station will process its own messages addressed to itself. In a second type of addressing, an external message may address a group of base stations 100. In this situation, a particular base station 100 that is a member of the addressed group will process these types of messages. In the third type of addressing, external messages may be identified as broadcast messages for all base stations 100. In these situations, any base station 100 receiving a broadcast message will process the message. Referring now to decision block 610 illustrated in FIG. 6, the external message is tested for the presence of a specific address corresponding to the individual base station 100 processing the message. If the message addresses that particular base station 100, processing block 615 is performed and the external message is decoded and processed as will be described in more detail in FIGS. 7 and 8. In decision block 620, the message is tested for the presence of a group identifier corresponding to a group to which this particular base station 100 may be a member. If this particular base station 100 is a member of the addressed group, processing block 625 is performed. Address group message processing is described in more detail in connection with FIG. 9. In decision block 630, the external message is tested for the presence of broadcast addressing. If the received message is a broadcast message, processing block 635 is performed. The broadcast message processing is described in more detail in connection with FIG. 10. Having completed processing for the incoming external message, processing terminates at end block 690 illustrated in FIG. 6.

Figure 7:
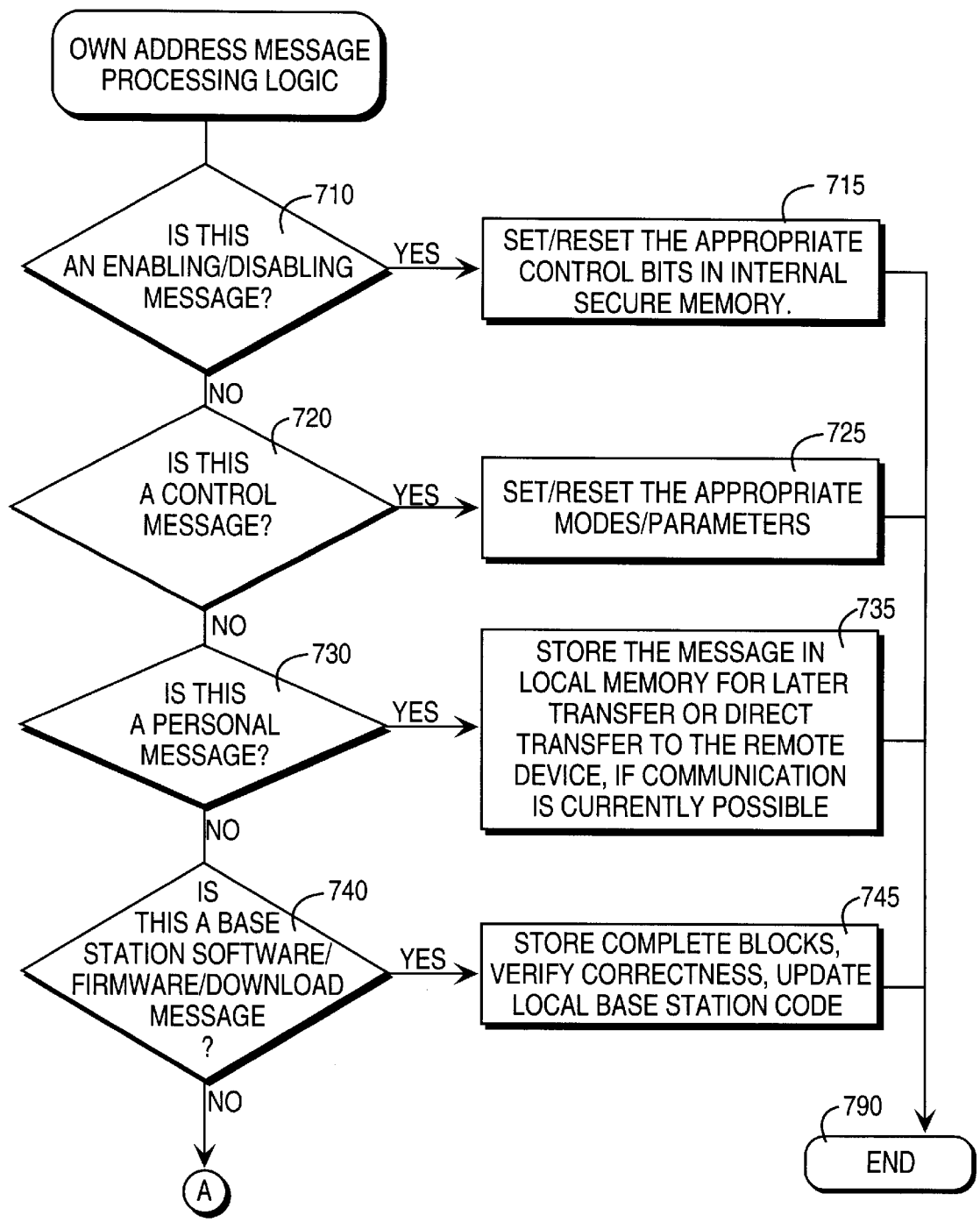
Figure 8:
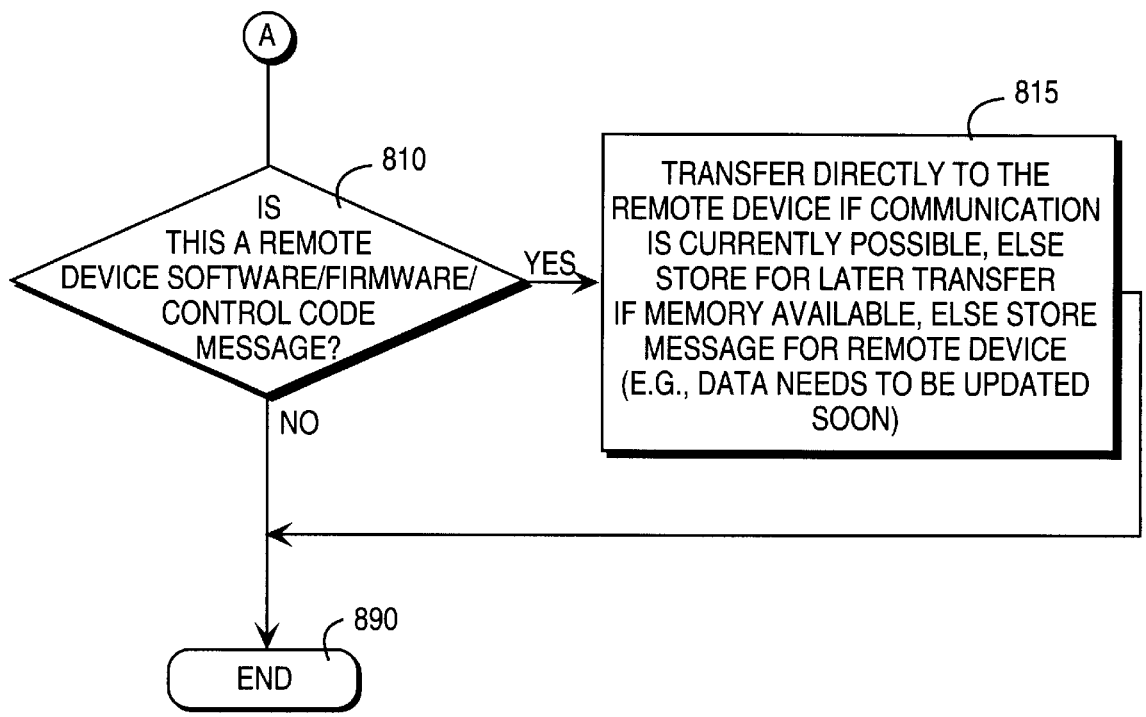

Referring now to FIGS. 7 and 8, the processing logic performed for processing an incoming external message addressed for a particular base station 100 is illustrated. Referring to FIG. 7 and decision block 710, if the incoming message is an enabling/disabling message, processing block 715 is performed. In this case, the appropriate control bits in internal secure memory are set or reset corresponding to the information in the enabling/disabling message. Processing then terminates at end block 790. If the incoming external message is a control message (decision block 720), the appropriate modes/parameters corresponding to information in the control message are set or reset accordingly (processing block 725). Processing terminates at end block 790. If the incoming external message is a personal message (decision block 730), the personal message is stored in local memory 131 for later transfer to remote device 200 or for direct transfer to remote device 200 if communication with remote device 200 is currently possible. Processing terminates at end block 790. If the incoming external message is a base station 100 software/firmware download message (decision block 740), the software/firmware download data is checked for correctness or any presence of data corruption. If the incoming download is valid, the local base station 100 firmware or software is updated with the download data (processing block 745). Processing terminates at block 790. If the incoming external message is not any of the types of messages corresponding to those tested in decision blocks 710, 720, 730, or 740, processing continues to the bubble labeled A illustrated in FIG. 8.

Referring now to FIG. 8, the incoming external message is tested in decision block 810. If the incoming message is a remote device software/firmware control code message, the control code is stored in memory 131 for late transfer to remote device 200. Alternatively, if communication with remote device 200 is currently possible, the received control code is transferred directly to remote device 200 where the control code is applied. Upon completion of the processing in processing block 815, processing terminates at end block 890 illustrated in FIG. 8.

Figure 9:
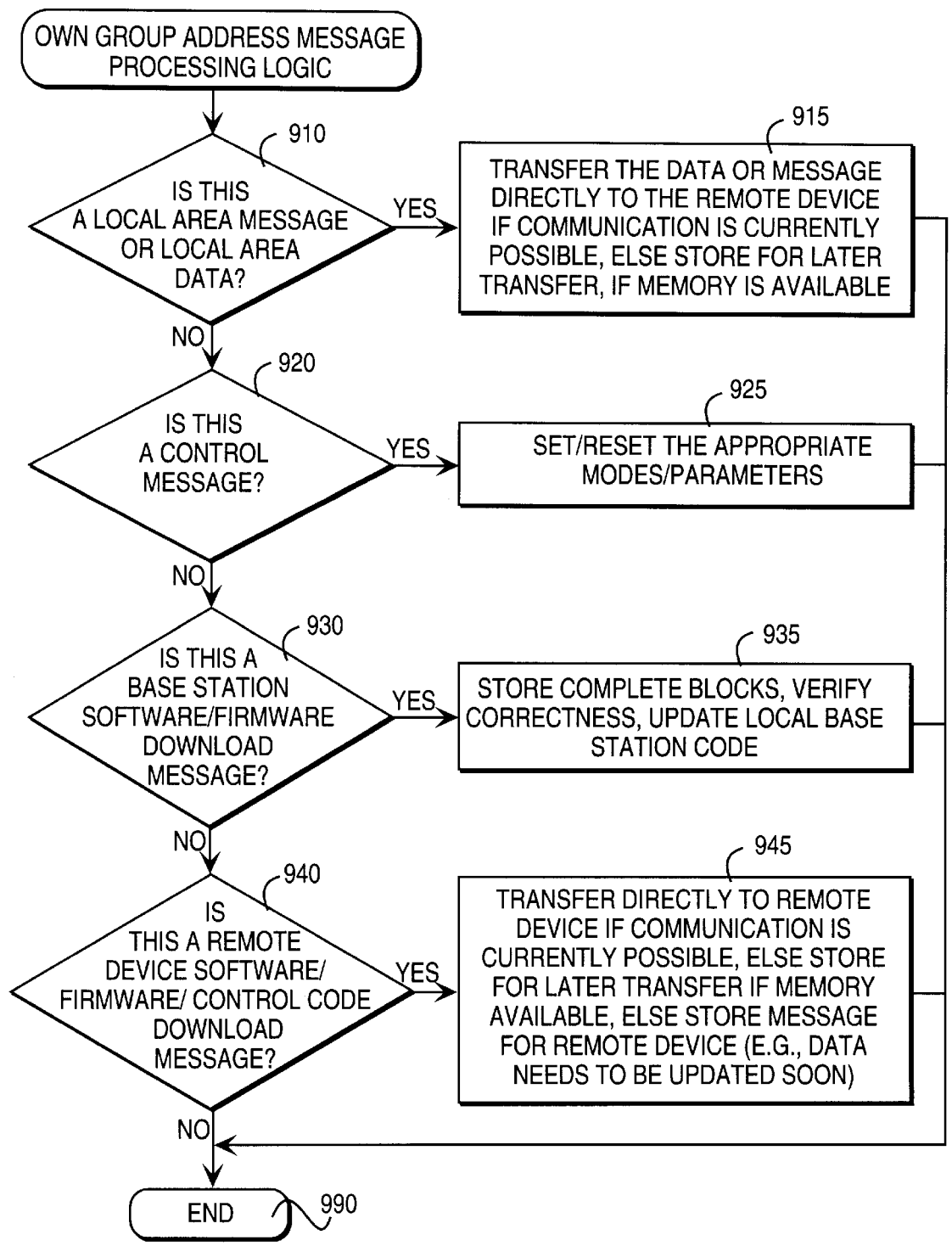

Referring now to FIG. 9, the processing performed by base station 100 for group address messages is illustrated. In decision block 910, the incoming external message is tested. If the incoming message is a local area message or local area data, processing block 915 is executed. In this case, the local area message or local area data is transferred to remote device 200 or queued for later transfer to remote device 200. Processing then terminates at end block 990. If the incoming message is a control message (decision block 920), the appropriate modes/parameters are set or reset in processing block 925. Processing terminates at end block 990. If the incoming group address message is a base station 100 software/firmware download message (decision block 930), the incoming download is verified for correctness in processing block 935 and the base station 100 memory is updated to correspond to the downloaded information. Processing terminates at end block 990. If the incoming group address message is a remote device software/firmware/control code download message (decision block 940), the software, firmware, or control code is transferred to remote device 200 or queued for later transfer to remote device 200 when communication is available (processing block 945). Processing terminates at end block 990.

Figure 10:
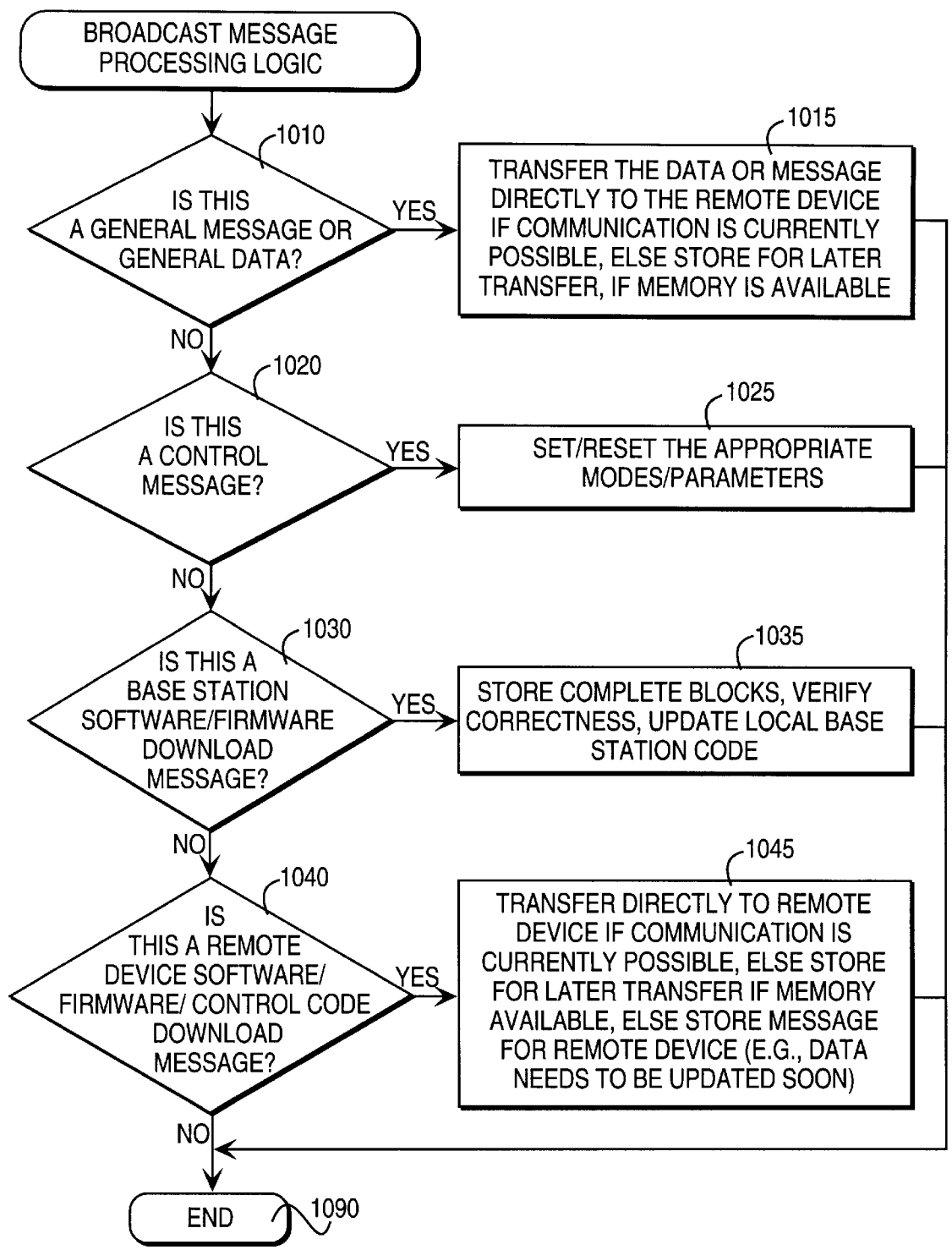

Referring now to FIG. 10, the processing performed by base station 100 for an incoming broadcast message is illustrated. In decision block 1010, if the incoming broadcast message is a general message or general data, the general message or general data is transferred to remote device 200 or queued for transfer to remote device 200 when communication is possible (processing block 1015). Processing terminates at end block 1090. If the incoming broadcast message is a control message (decision block 1020), the appropriate modes/parameters are set or reset in processing block 1025. Processing terminates at end block 1090. If the incoming broadcast message is a base station software/firmware download message (decision block 1030), the download data is verified for correctness in processing block 1035 and the local base station 100 code is updated. Processing terminates at end block 1090. If the incoming broadcast message is a remote device software/firmware control code download message (decision block 1040), the software/firmware or control code is transferred to remote device 200 or queued for later transfer to remote device 200 when communication becomes possible (processing block 1045). Processing terminates at end block 1090.

Figure 11:
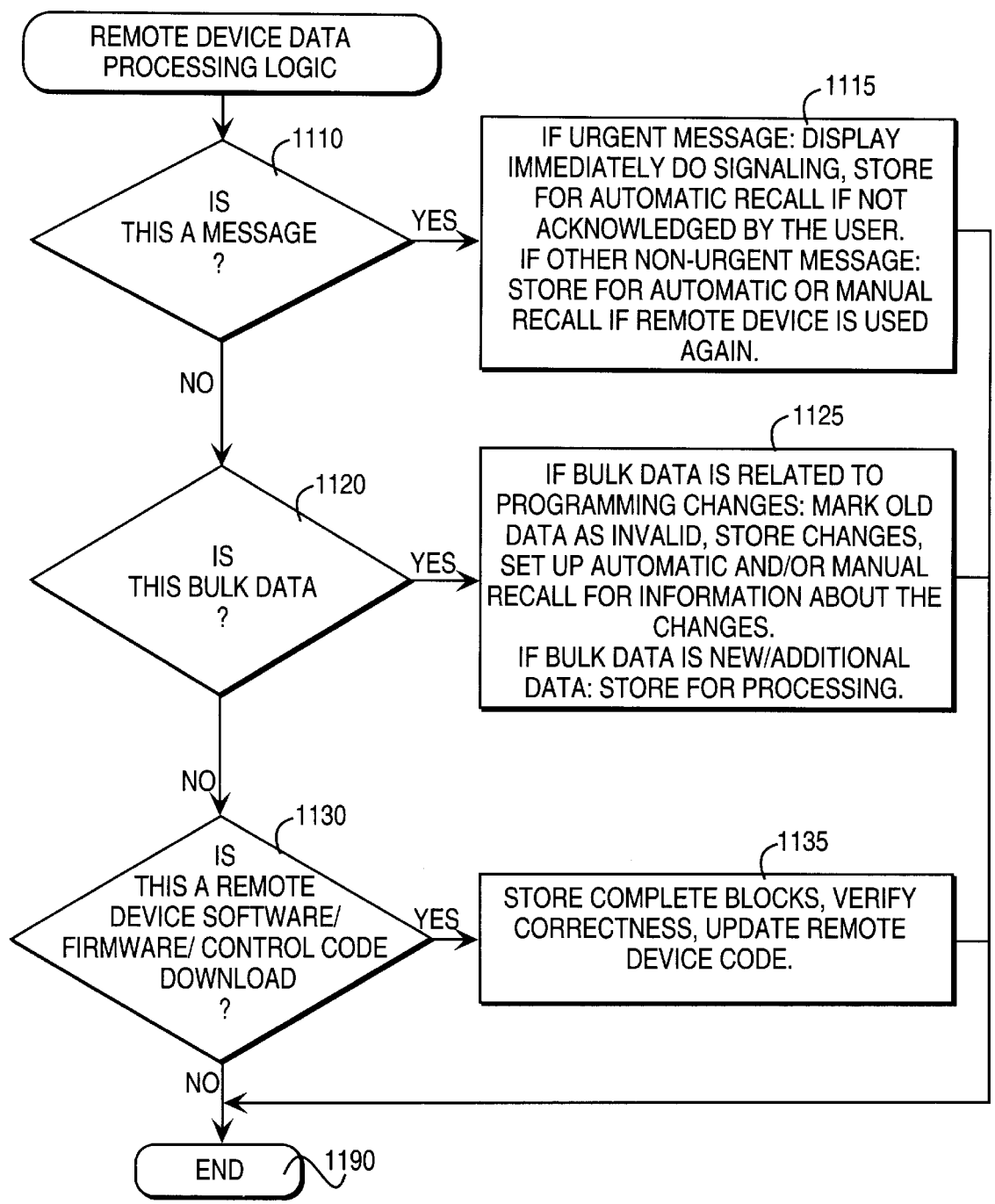

Referring now to FIG. 11, the processing logic performed by remote device 200 is illustrated. In decision block 1110, the incoming external message received by remote device 200 is tested. If the incoming data is a message, processing block 1115 is executed. If the incoming message is an urgent message, the message is displayed immediately to the user and acknowledgement by the user is requested. If the incoming message is not an urgent message, the message is stored for automatic or manual recall if the remote device 200 is later used by the user (processing block 1115). Processing terminates at end block 1190. If the incoming external data is bulk data (decision block 1120), processing block 1125 is executed. If the bulk data is related to programming changes in remote device 200, the old data in remote device 200 is marked as invalid and the changes are stored. Automatic and/or manual recall of information about the changes is set up within remote device 200. If the bulk data is new/additional data, the new/additional data is stored for processing in remote device 200 (processing block 1125). Processing terminates at end block 1190. If the incoming data is a remote device software/firmware/control code download (decision block 1130), the download data is verified for correctness in processing block 1135. Subsequently, the validated download is stored in remote device 200 as updated code. Processing terminates at end block 1190.

Figure 3A:
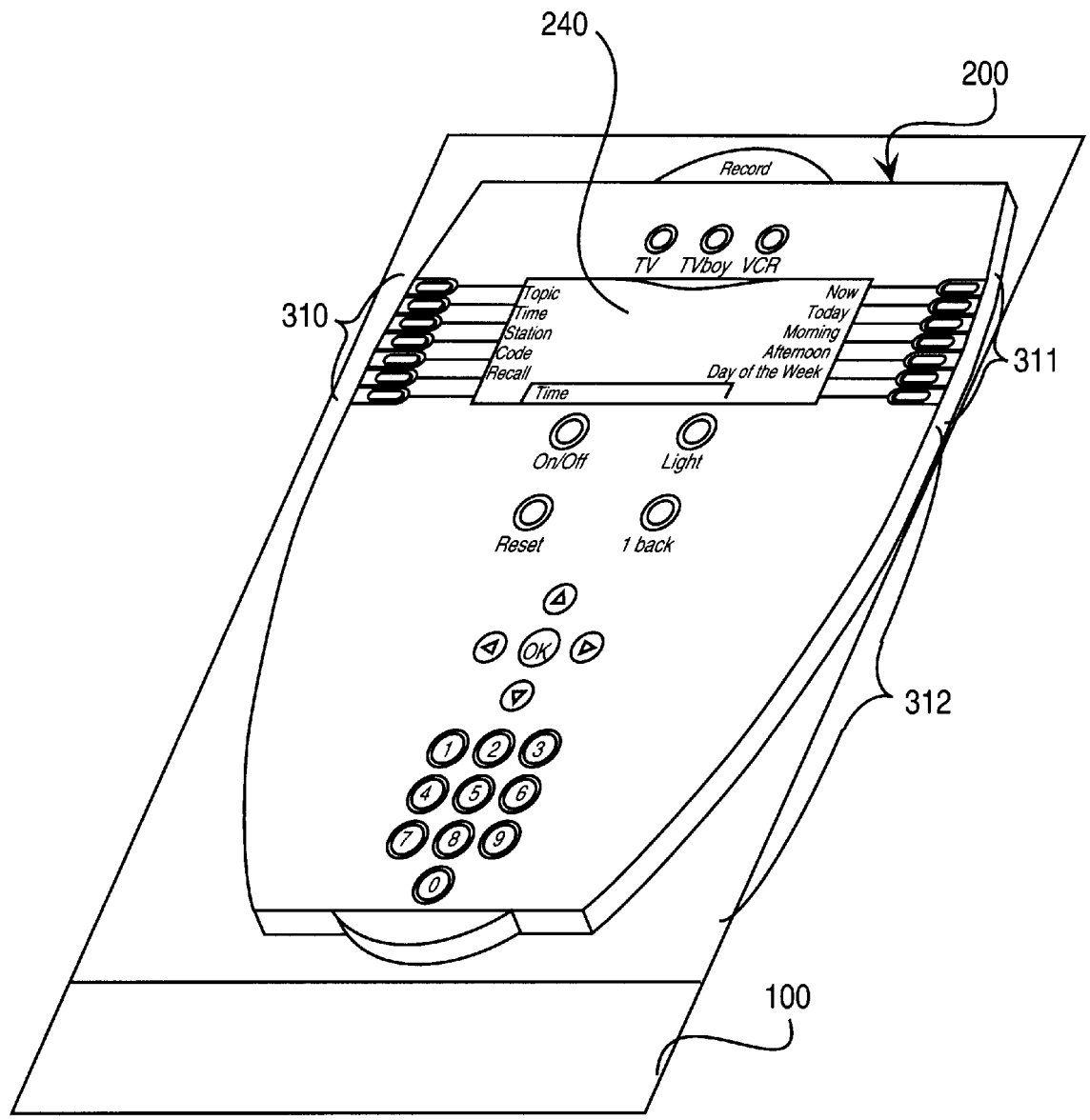
FIG. 3A illustrates the remote unit and base station of the preferred embodiment.
Figure 3B:
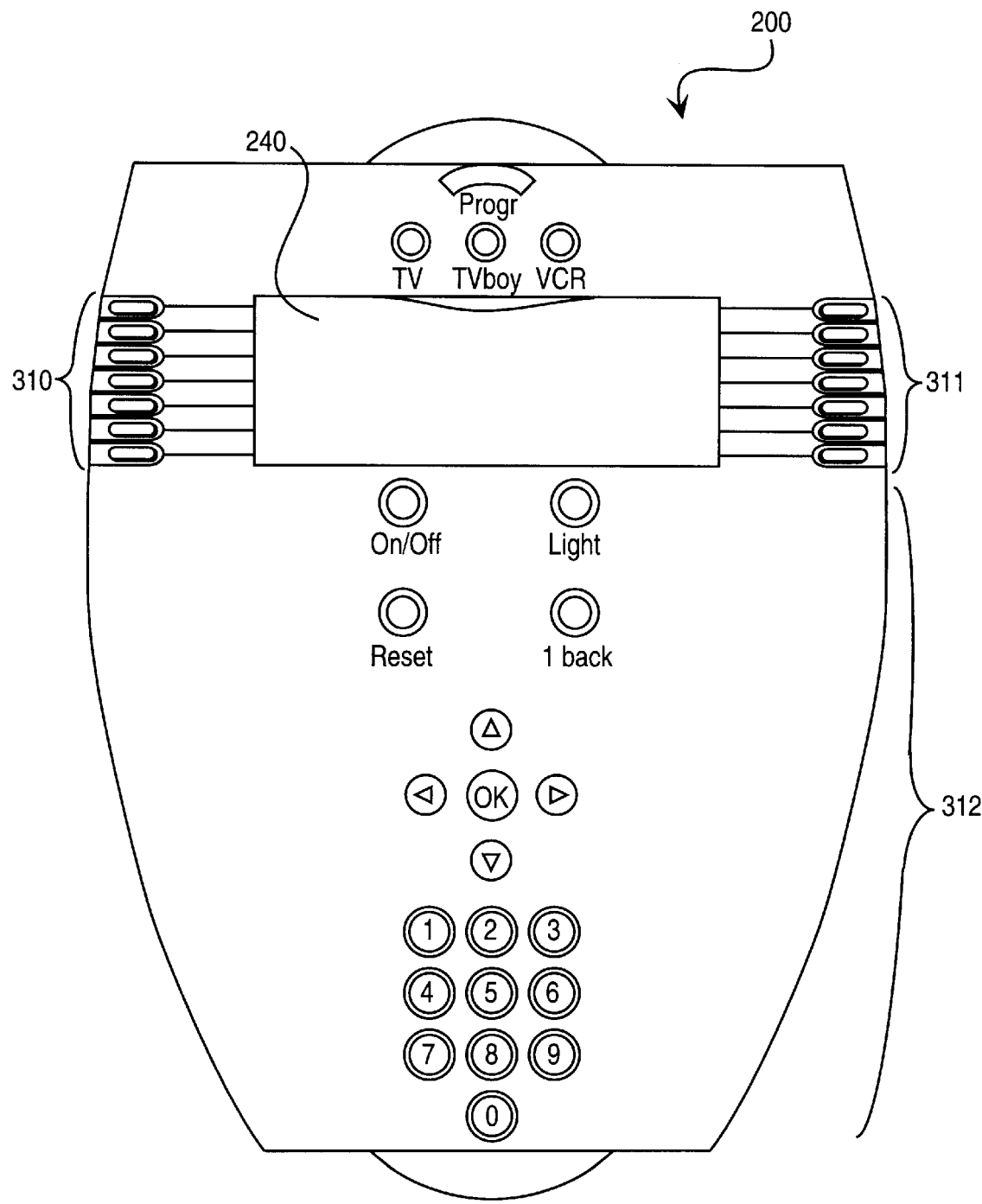
FIGS. 3B and 3C illustrate other alternative embodiments of the remote unit.
Figure 3C:
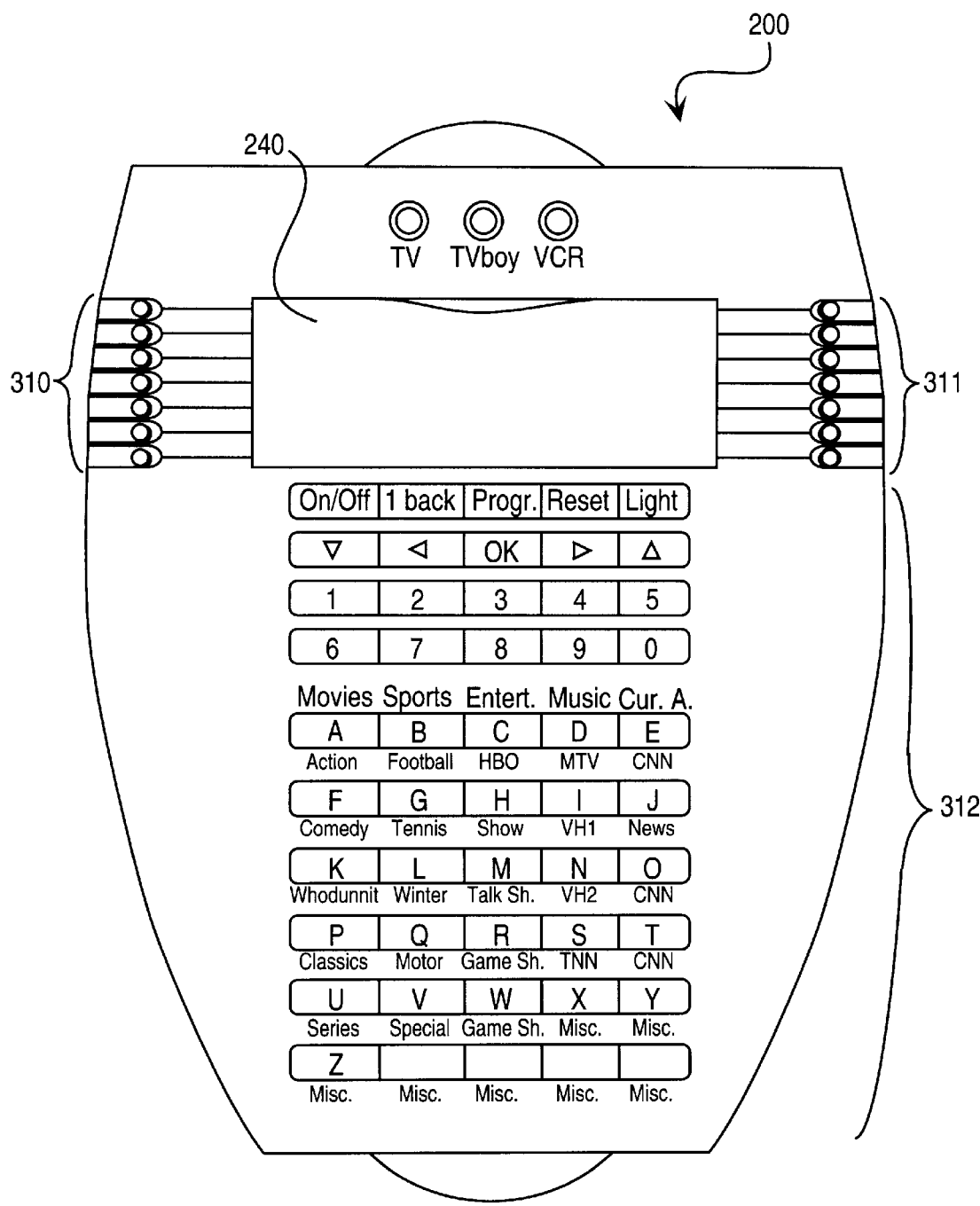
Figure 12:
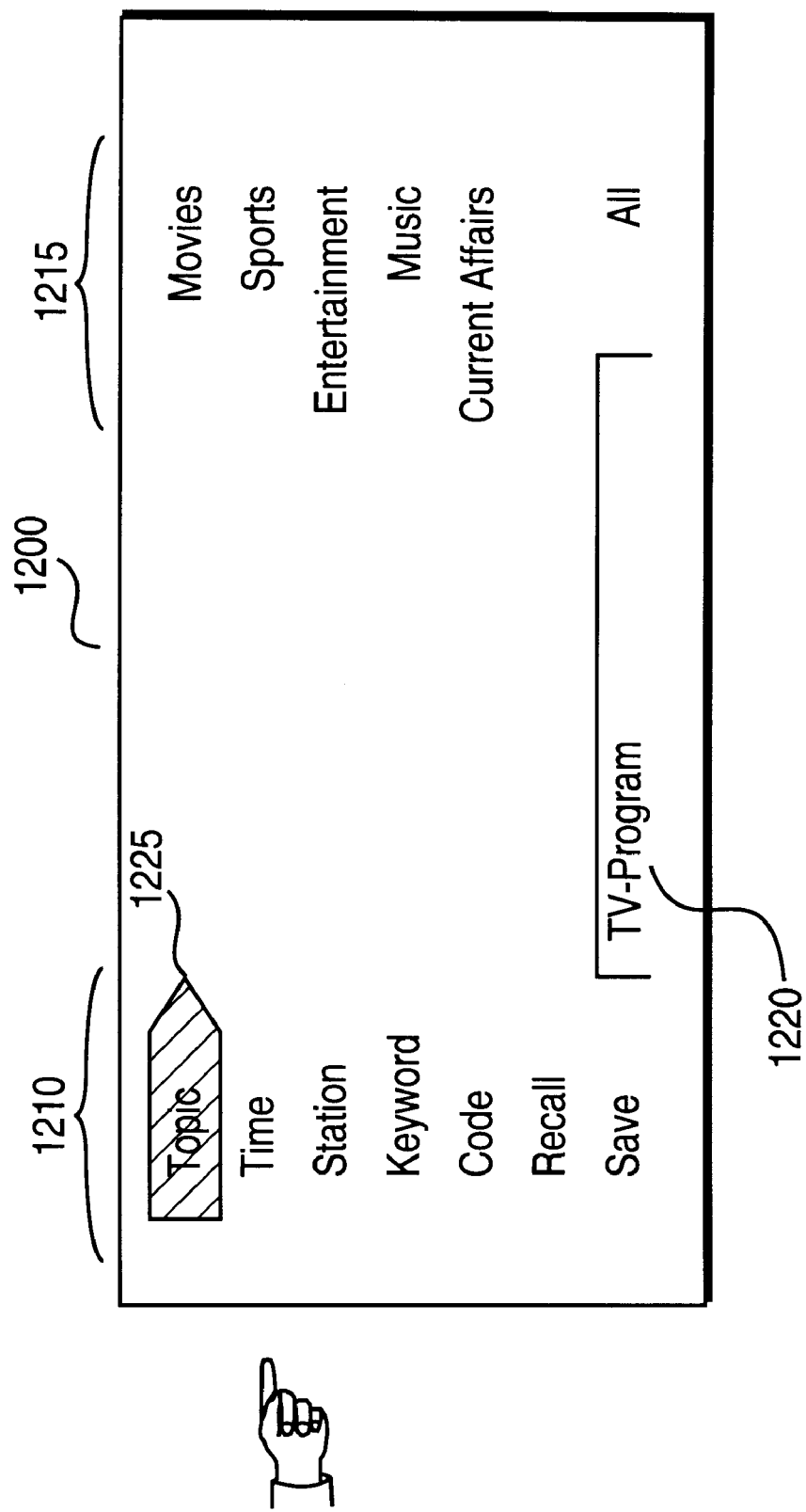
Figure 13:
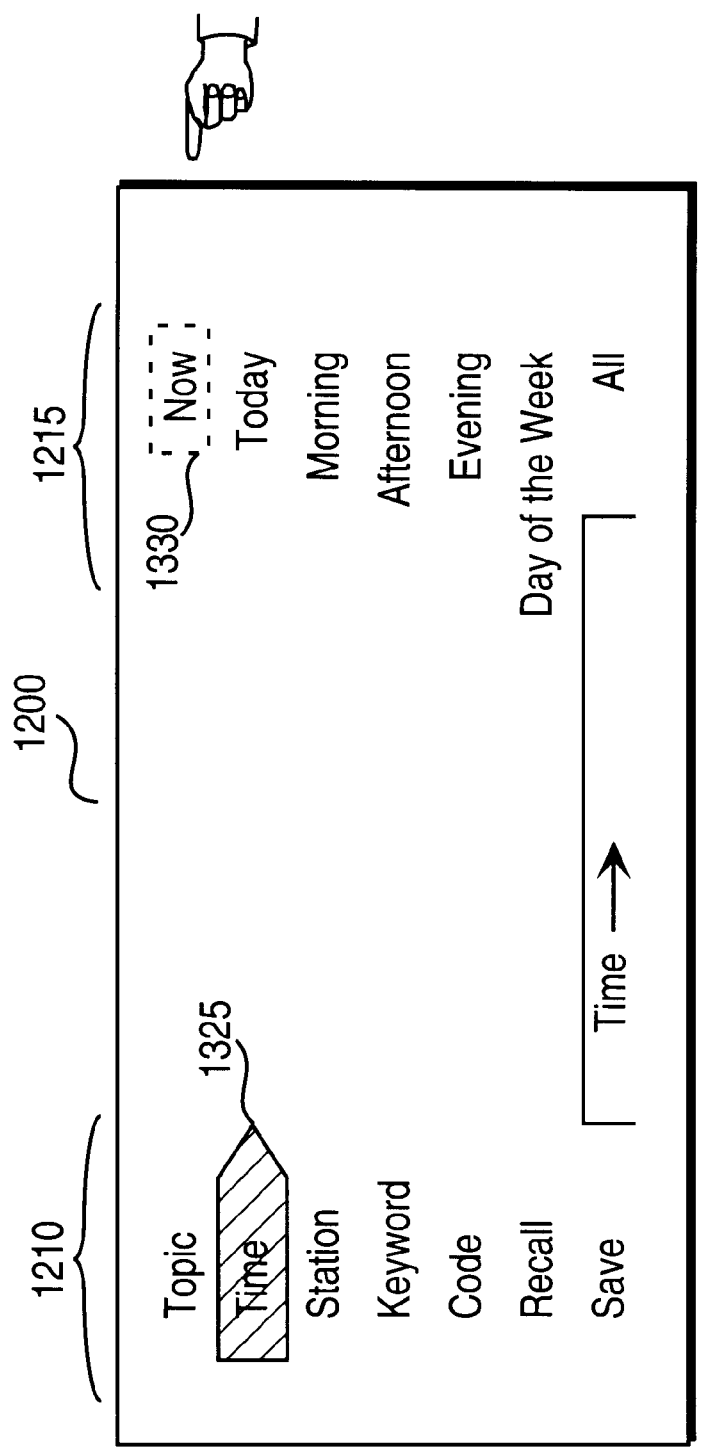

Referring now to FIGS. 12 through 53, the figures illustrate the various screen displays and function key manipulations available on the remote device 200 of the preferred embodiment of the present invention. As illustrated in FIG. 12, a user interface and menu 1200 is illustrated. Such a menu can be displayed on display device 240 in remote device 200 of the preferred embodiment. In the present invention, each menu is configured with at least two sets of menu items in a distinct display area on remote device 200. For example, as illustrated in FIG. 12, a first display area 1210 contains a vertical arrangement of menu items available for selection by a user using function keys 310 as illustrated in FIGS. 3A, 3B, and 3C. Similarly, the menu 1200 shown in FIG. 12 includes a second display area 1215 containing a second vertical arrangement of menu items. As consistently applied throughout the user interface in the present invention, the menu items in menu 1200 in one display area corresponds to a user selection of a particular menu item in a different display area. For example illustrated in FIG. 12, a menu item 1225 in first display area 1210 has been selected by a user. In response to the menu item selection 1225, the submenu selection items in second display area 1215 are displayed. As shown in FIG. 13, the selection of a different menu item 1325 causes a different set of submenu items to be displayed in second display area 1215. Similarly, other menu selections in first display area 1210 cause a corresponding presentation of submenu items in second display area 1215.

Referring again to FIG. 12, menu 1200 also includes a third display area 1220. Third display area 1220 is a status display area for presenting information corresponding to the history of the most recent series of command selections. Using the status area 1220, the user may quickly determine where he/she is in a command selection hierarchy. The information presented in status area 1220 will become more clear in the description of the menus that follow. In the example illustrated in FIG. 12, the phrase "TV-program" displayed in status area 1220 corresponds to a current mode, which in this example, is a mode for selection of TV programming (as opposed to the selection of TV remote control (RC) or video cassette recorder (VCR) modes, and the like). The status area 1220 is also used to display a history of menu selections as will be apparent in the examples that follow.

Figure 14:
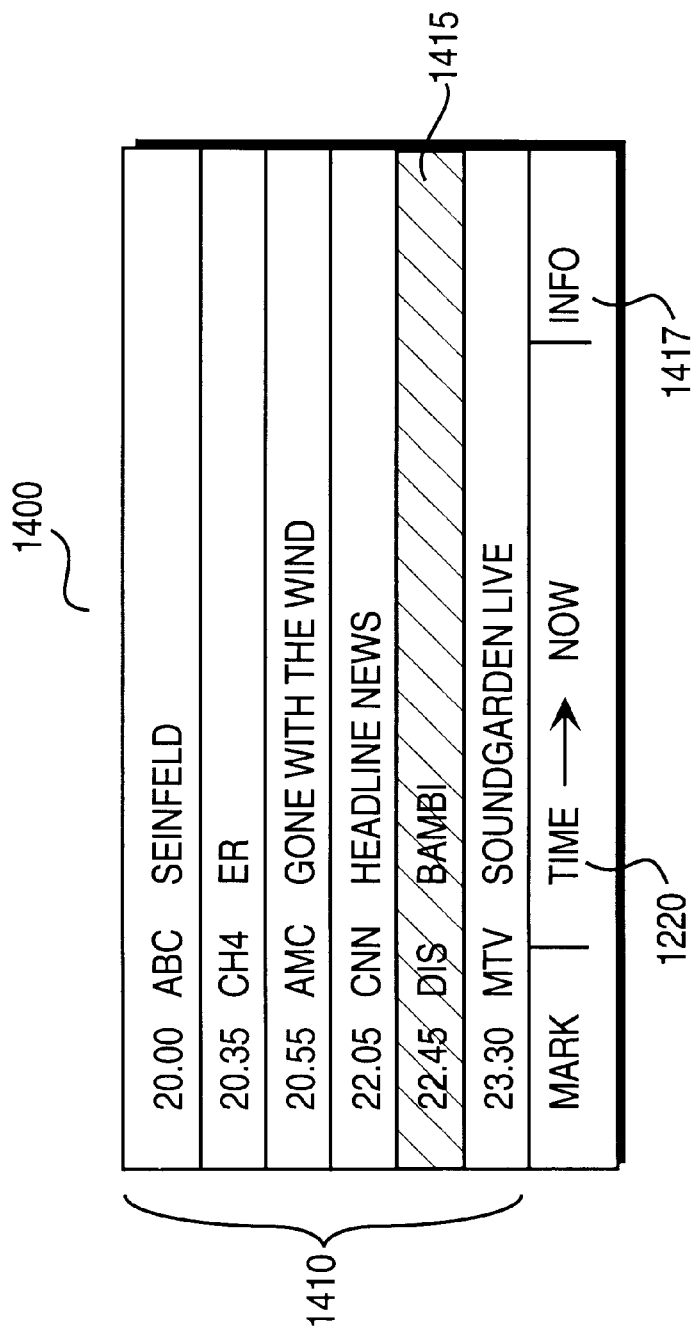
Figure 15:
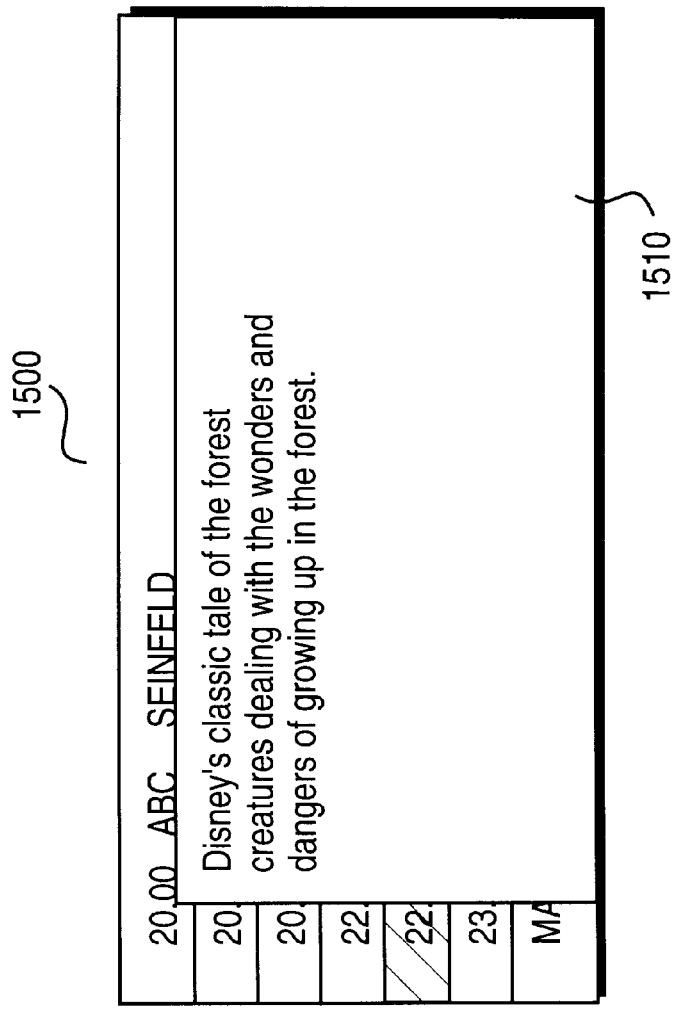

Referring again to FIG. 12, the menu items illustrated in the first display area 1210 correspond to the initial set of command or function options available in the preferred embodiment of the present invention. These commands or functions support the functionality of remote device 200 for enabling a user to easily and efficiently manage the selection of video programming and data available from a cable provider 110. The first such menu item is the "Topic" menu. The "Topic" menu item enables a user to select the type of television programming desired. As shown in FIG. 12, the types of topics available in the preferred embodiment include movies, sports programming, entertainment programming, music programming, or current affairs programming. It will be apparent to one of ordinary skill in the art that other types of programming options or topics may be displayed and selected in equivalent alternative embodiments. In a second menu item of the list of items in first display area 1210, the "Time" menu item is available. The "Time" menu item enables a user to identify a time frame of interest during which various programming options are available. The submenu options corresponding to the selection of the "Time" menu item is illustrated in the second display area 1215 shown in FIG. 13. For example, once a user has selected a menu item from the first display area 1210, such as the "Time" menu item 1325, the user may subsequently select one of the submenu items presented in the second display area 1215. If, for example, the user selects the "Now" submenu item 1330, the resulting display for this example is illustrated in FIG. 14. Referring now to FIG. 14, note that the information displayed in status area 1220 identifies the first menu item selected ("Time") followed by the second submenu item selected ("Now"). The information displayed in status area 1220 thereby identifies the chain of command or menu item selections made by a user. The information display 1400 illustrated in FIG. 14 corresponds to the example of a user selection of a "Time" menu item followed by the selection of a "Now" submenu item. As a result of these user selections, the display area 1410 identifies at least a portion of the television programming available at the present time. In the preferred embodiment, the information display 1410 identifies the time when a particular program will start, the channel or network upon which the program will be televised, and a title identifying the content of the program. It will be apparent to one of ordinary skill in the art that additional or augmented information associated with the available individual programs may similarly be displayed with an information display 1410. In a further opportunity for user interaction, the user may individually select one of the programming options identified in information display 1410. In the example shown in FIG. 14, a user has selected the fifth programming option 1415 causing this option to be highlighted or uniquely displayed to identify the selected programming option. As a result of this programming option selection and the activation of a softkey titled "Info" 1417, a resulting display, as shown in FIG. 15, provides more detailed descriptive information on the selected program. It will be apparent to one of ordinary skill in the art that additional information may be provided for the programming illustrated by example in FIGS. 14 and 15. In the preferred embodiment, an overlay window or display area 1510 is used to present the additional programming information to the user. Upon the appropriate command option selection, the information window 1510 will be removed and the user allowed to identify other programming selection options.

Figure 16:
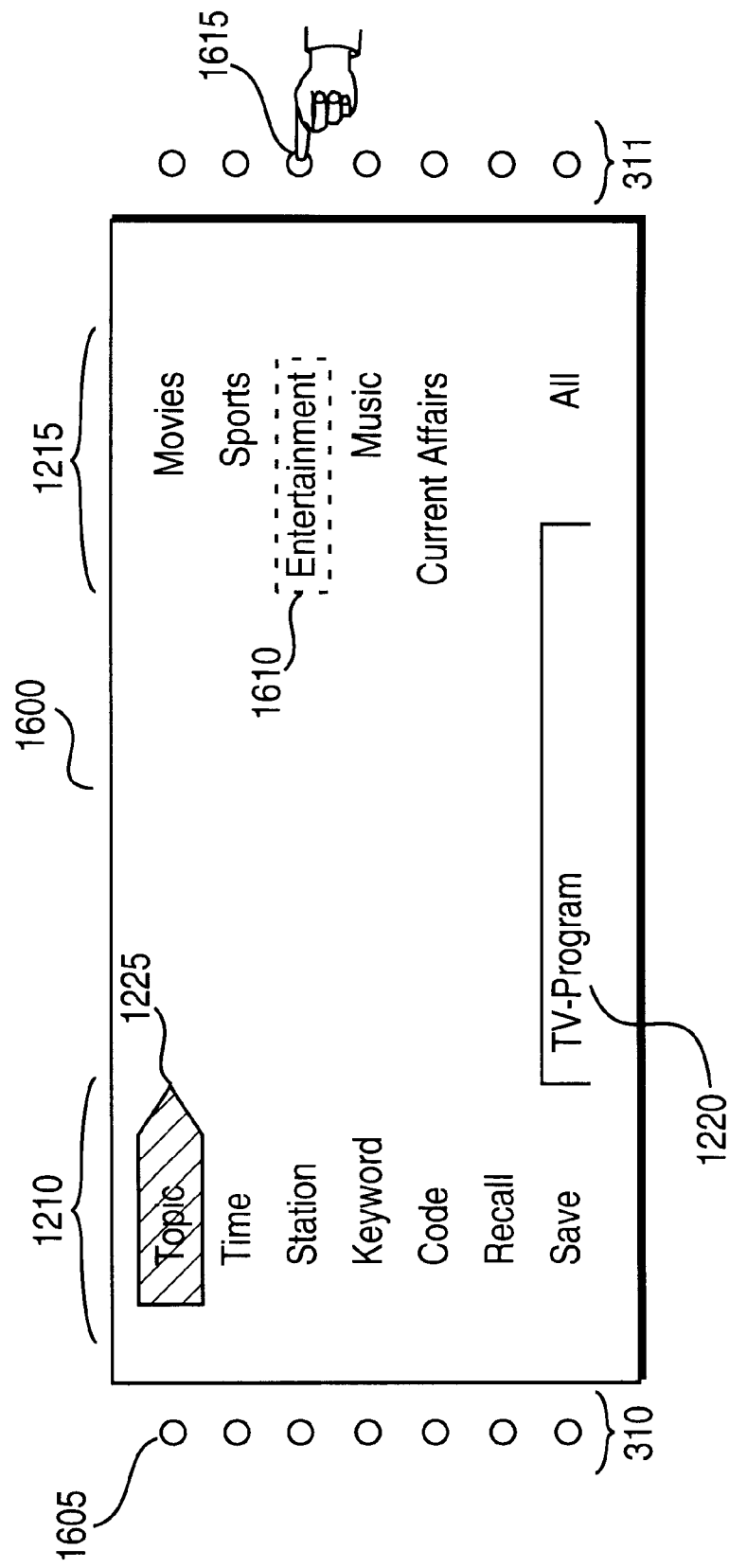

Referring now to FIG. 16, a menu 1600 similar to the menu illustrated in FIG. 12 is shown. As described and illustrated in connection with the example of menu 1200, the first display area 1210 and second display area 1215 operate as a ping-pong style menu. For example, a list of menu items are presented in first display area 1210. The user is prompted to select one of these menu items using corresponding function keys 310 in proximity to the first display area 1210. By highlighting one of the menu items in first display area 1210, a corresponding list of submenu items corresponding to the highlighted menu item is displayed in the second display area 1215. Once the selection of a menu item in the first display area 1210 is made using function keys 310 and the corresponding submenu items are displayed in second display area 1215, the present invention allows the selection of one of the submenu items in second display area 1215 using a second set of function keys 311 in proximity to the second display area 1215. As shown in the example illustrated in FIG. 16, the user has first selected menu item 1225 in first display area 1210 using function key 1605. As a result, submenu items are displayed in the second display area 1215. The user may now select one of these submenu items using function keys 311. In the example of FIG. 16, the user has selected the "Entertainment" submenu item 1610 using function key 1615. The resulting display is illustrated in FIG. 17.

Figure 17:
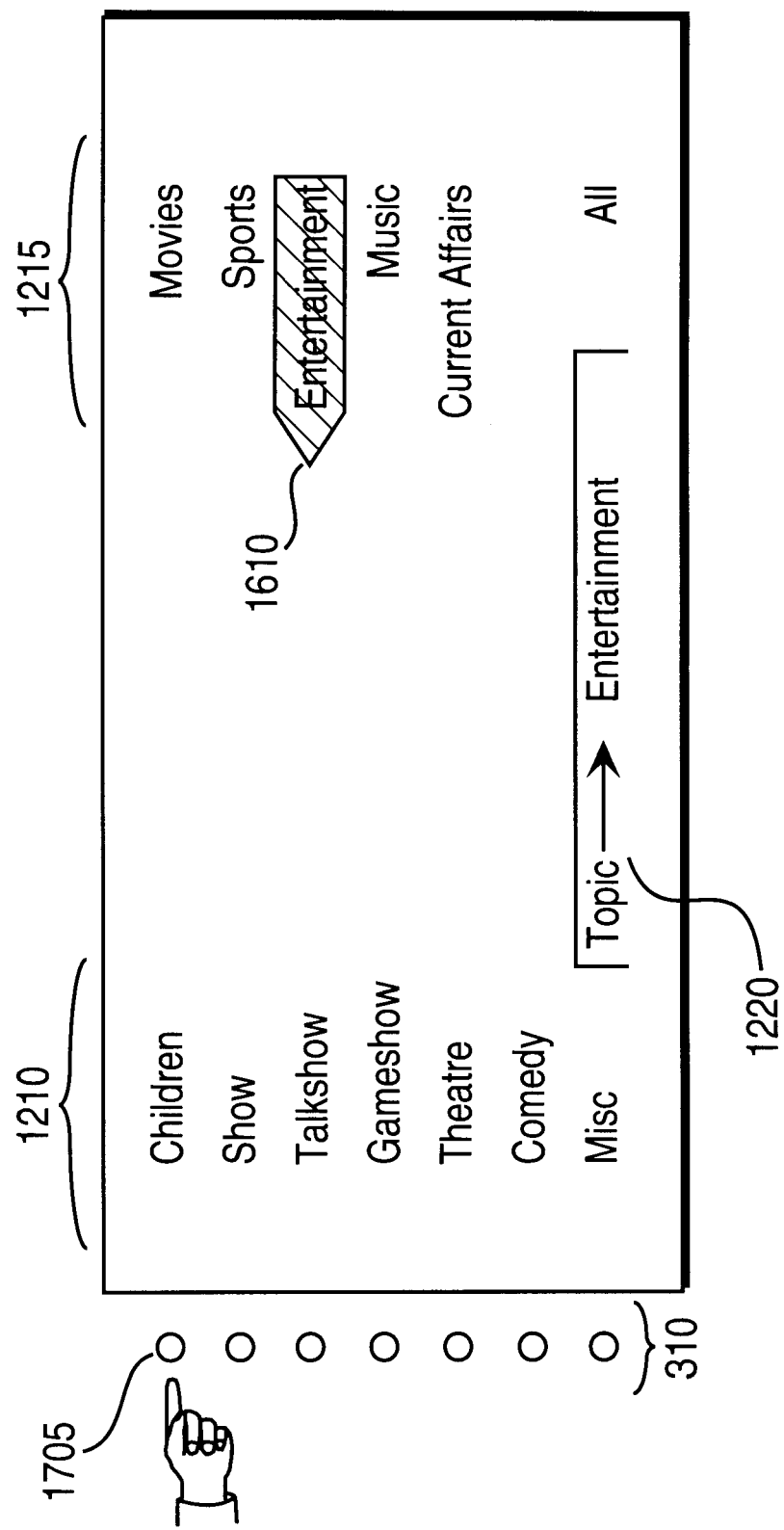

Referring now to FIG. 17, the menu items in first display area 1210 have been replaced with new submenu items corresponding to the selection 1610 made in second display area 1215. Each of the submenu items now displayed within first display area 1210 correspond to options related to selected menu item 1610 from second display area 1215. At this point, the user may select one of the submenu items within first display area 1210 using one of the function keys 310. In the example shown in FIG. 17, the user activates the function key 1705 associated with the first menu item displayed in first display area 1210. As a result, the menu illustrated in FIG. 18 is displayed.

Figure 18:
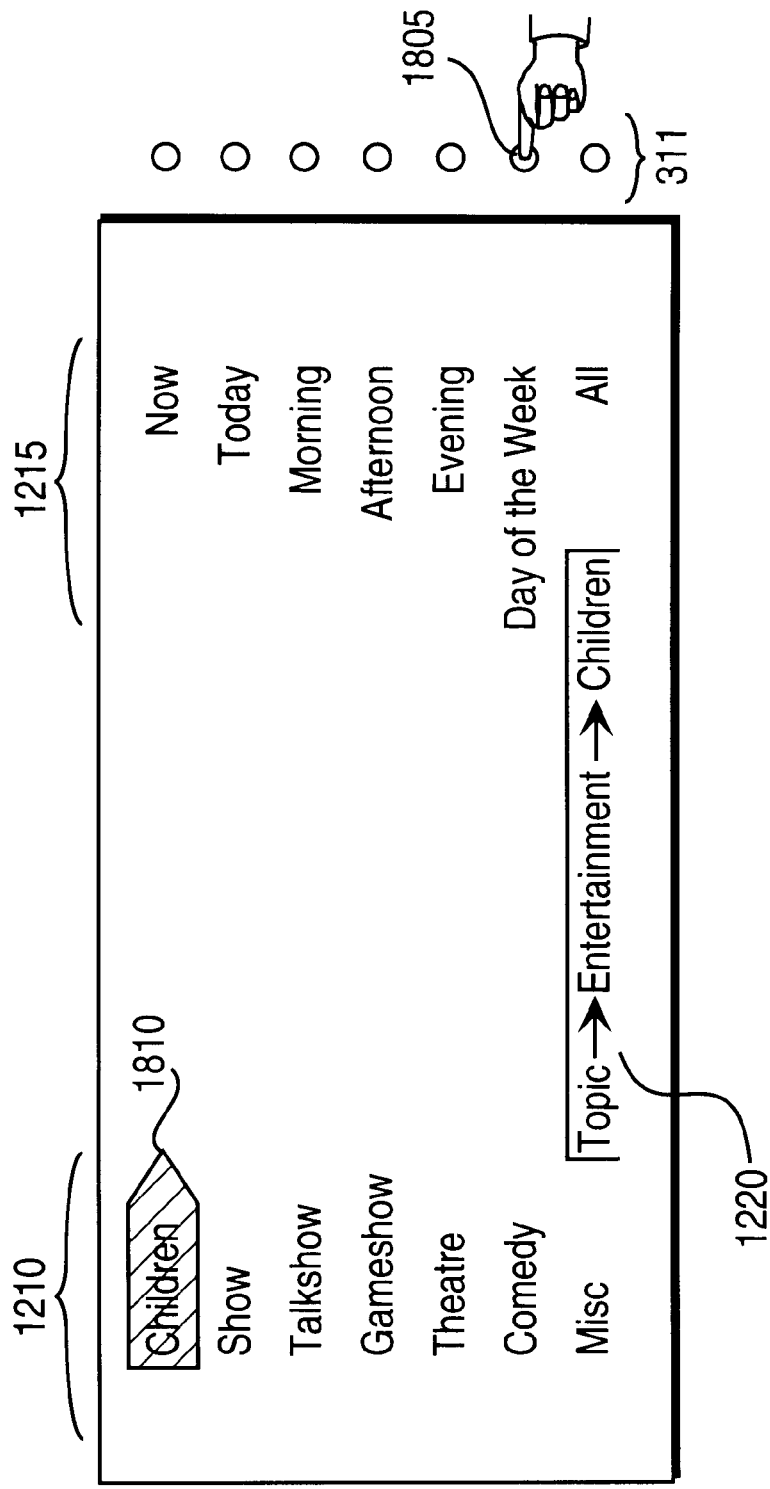
Figure 19:
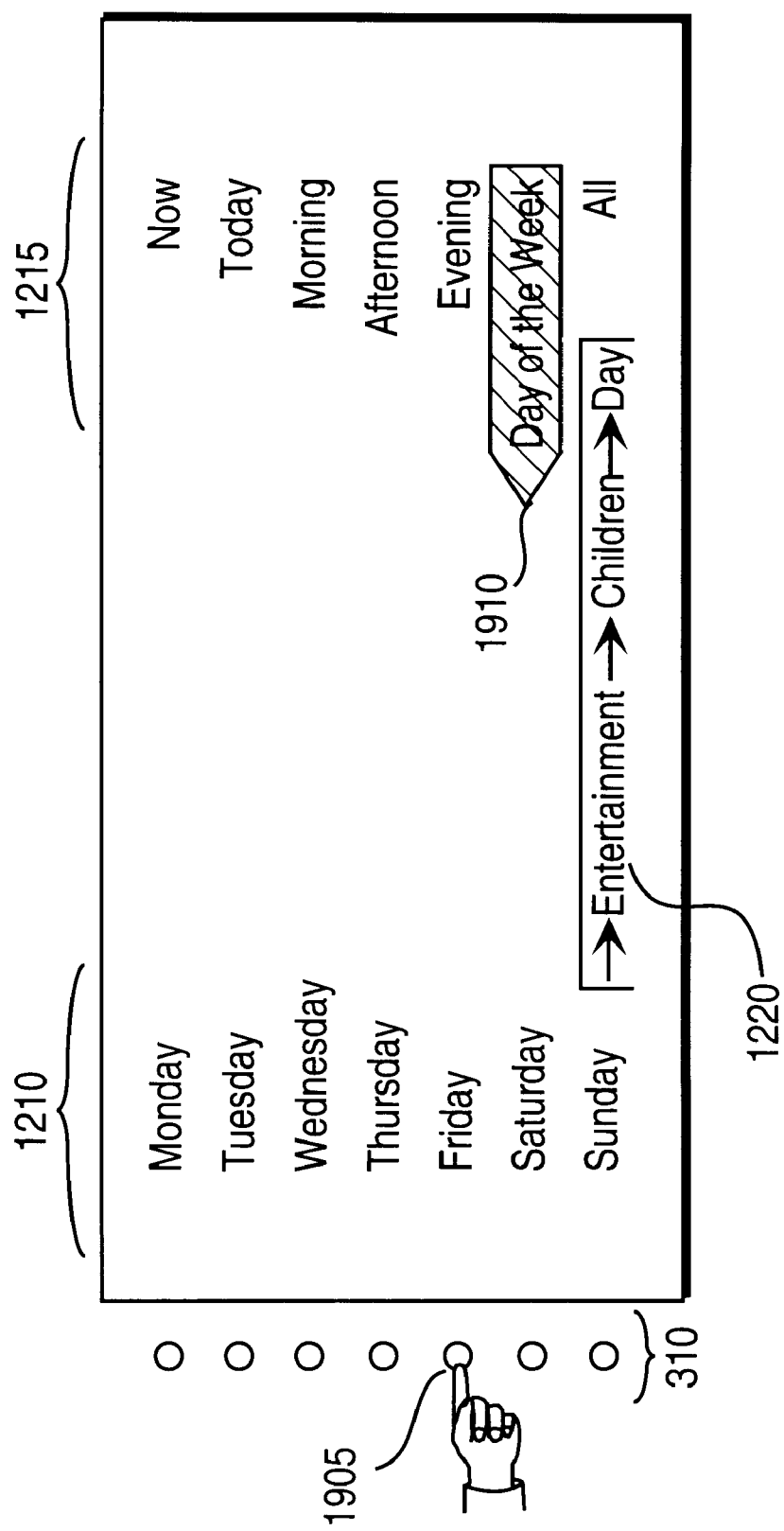
Figure 20:
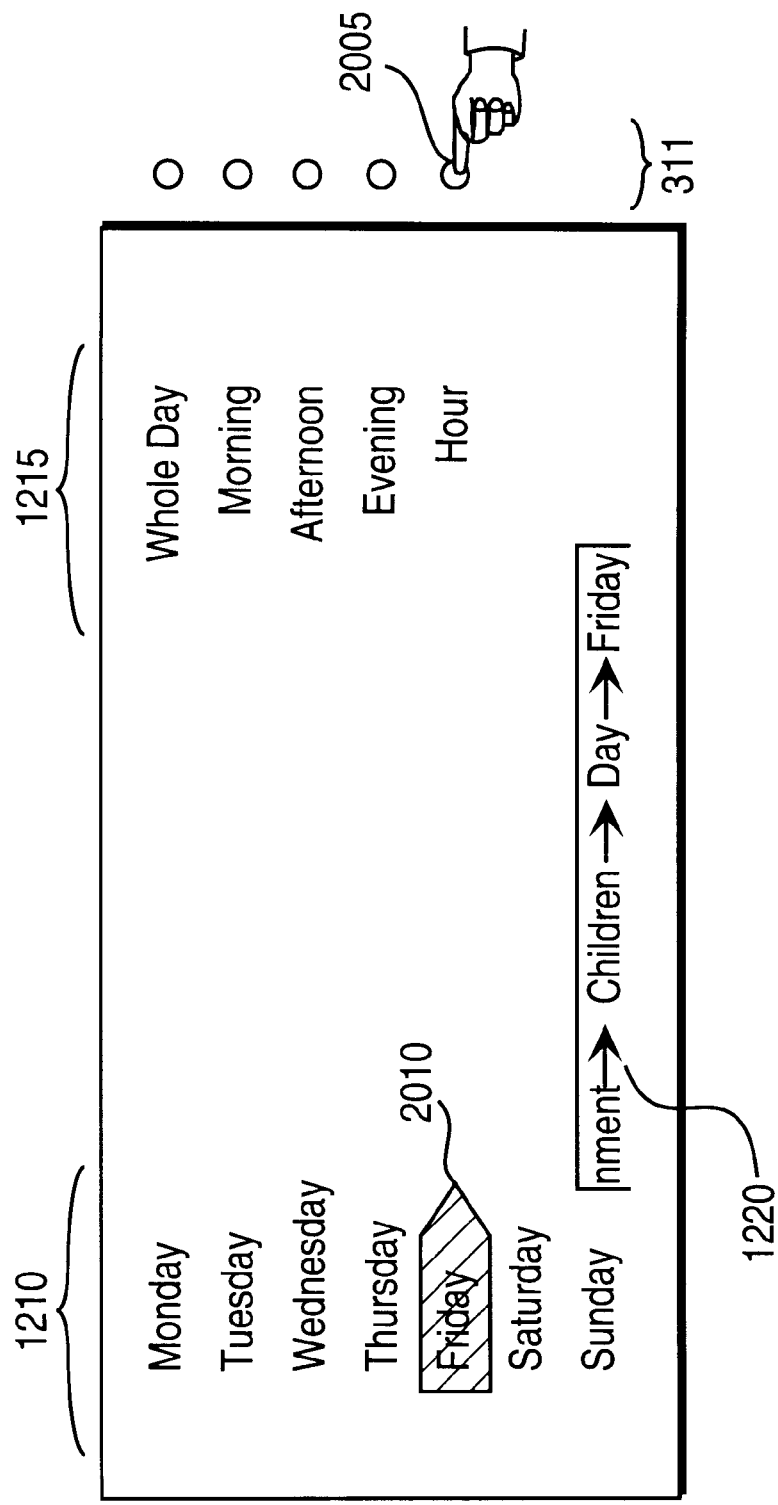
Figure 21:
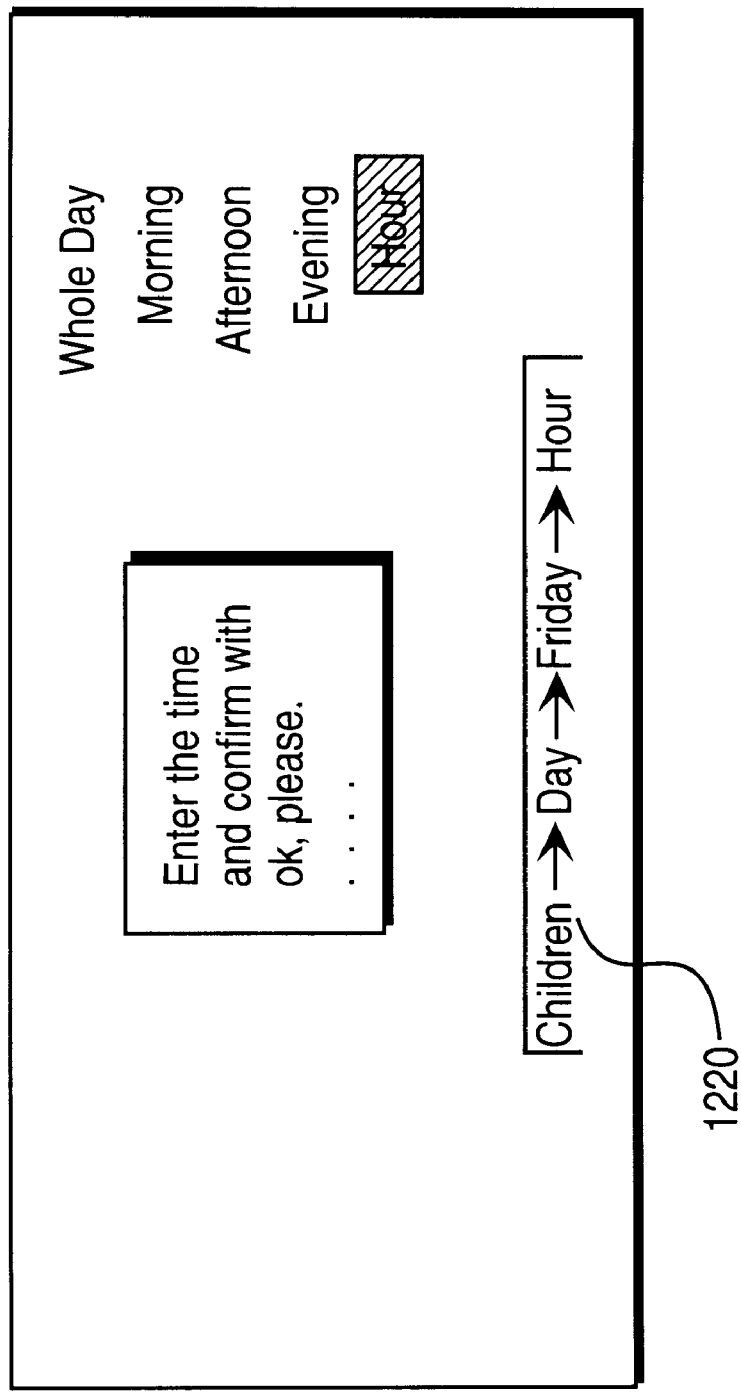

Referring now to FIG. 18, a menu is displayed which corresponds to the activation of function key 1705 illustrated in FIG. 17. Because in the example illustrated in FIGS. 17 and 18, the first submenu item 1810 in first display area 1210 has been selected, the corresponding submenu is displayed in second display area 1215 as shown in FIG. 18. Again, the user may select one of the submenu items in second display area 1215 by activating the corresponding function key within the set of function keys 311. In the example illustrated in FIG. 18, the user activates function key 1805. As a result, the menu illustrated in FIG. 19 is displayed. As shown in FIG. 19, the menu items displayed in first display area 1210 have been replaced with submenu items corresponding to the menu item 1910 selected from the second display area 1215. The user may then use one of the function keys 310 to select one of the menu items under first display area 1210. In the example illustrated in FIG. 19, the user selects function key 1905 to select the fifth menu item displayed in first display area 1210. As a result, the display illustrated in FIG. 20 is displayed. As shown in FIG. 20, the selection of menu item 2010 from first display area 1210 causes the resulting display of corresponding submenu items within second display area 1215. The user may then use one of the function keys 311 to select one of the submenu items displayed in second display area 1215. In the example illustrated in FIG. 20, the user activates function key 2005 which results in the display shown in FIG. 21. As a result of activation of the function key corresponding to the selection of an hour, a message is displayed to the user prompting the user to enter the time and confirm the time entry as shown in FIG. 21. The user may then enter the time using number keys or alternatively using a special numeric softkey menu. The user then confirms the time entry using function keys available on remote device 200.

As shown by the menu samples illustrated in FIGS. 16 through 21, the user is able to navigate through a hierarchy of menus and submenus by bouncing back and forth between a first display area and a second display area using a first set of function keys 310 and a second set of functions keys 311. This ping-pong menu concept of the present invention provides an efficient and fast way to navigate through a set of menu items. With each activation of a function key as illustrated in FIGS. 16 through 21, information identifying the activated function is sequentially illustrated in status area 1220. The information in status area 1220 assists the user in orienting himself/herself during a sequence of function key activations.

Figure 22:
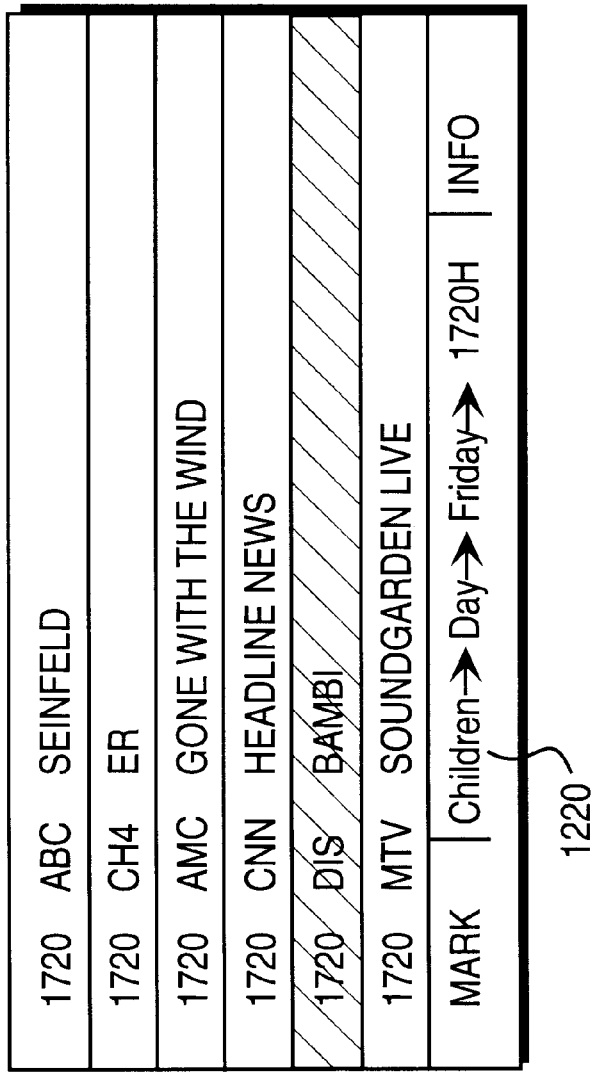

Referring now to FIG. 22, a menu illustration example shows the result of the entry of a time prompted in the example shown in FIG. 21. In this example, the user responded to the prompt for the entry of a time by entering the hour "17:20". In response to this, the display shown in FIG. 22 is presented for the user. Because the user entered a time corresponding to "17:20", programming available from the cable provider 110 at the specified hour is illustrated line by line on the display device 240 of remote device 200. Note that the information displayed in status area 1220 has been updated to indicate the user's entry of the specific time. The present invention also includes a "Mark" function that allows the user to mark particular programs and to be reminded of the imminent broadcast of a marked program or programs. This feature is described in more detail below in connection with FIGS. 44–46.

Figure 24:
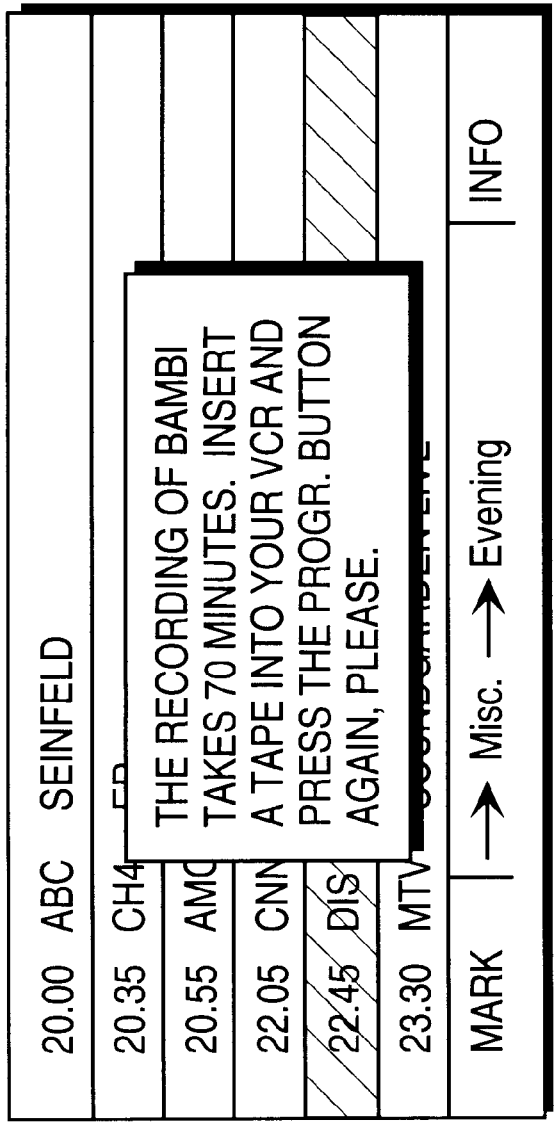
Figure 25:
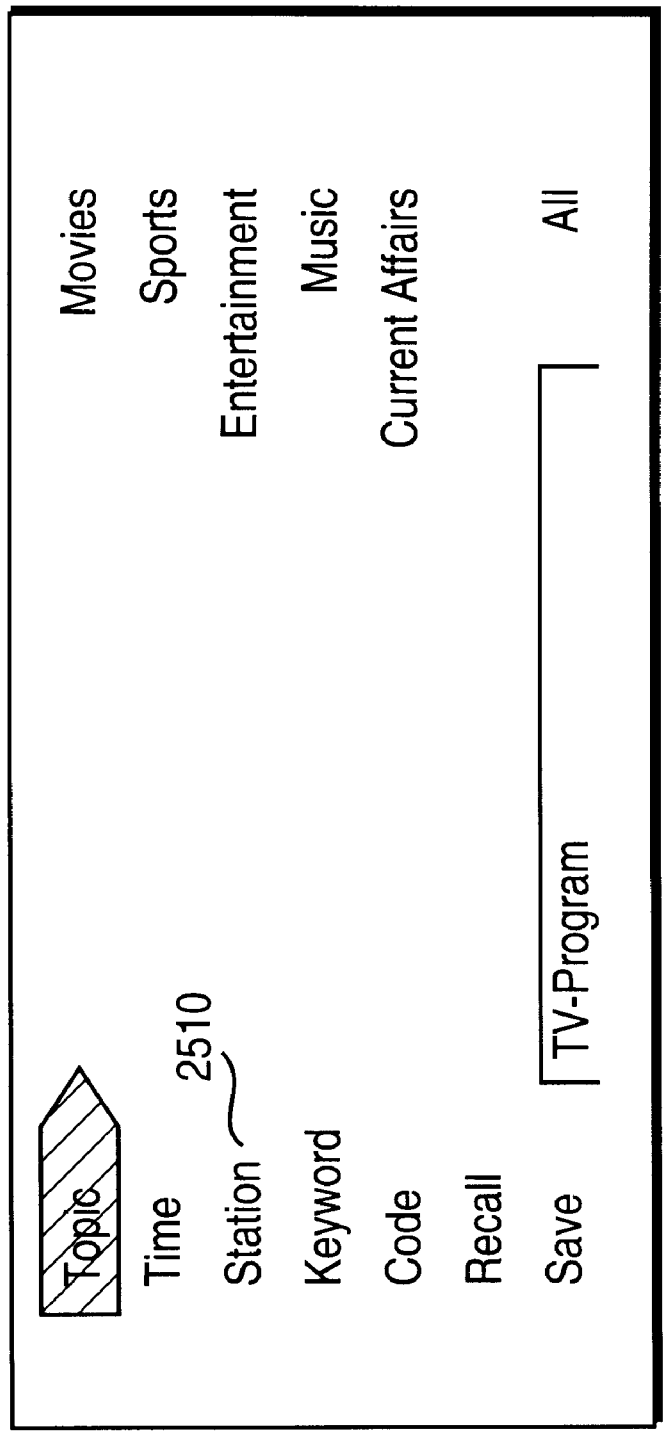
Figure 25:
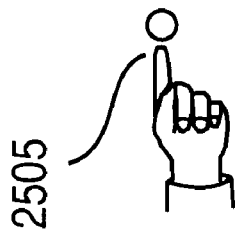

Referring now to FIGS. 23 and 24, the examples illustrate the operation of the present invention for selecting a particular programming for recording using a video cassette recorder (VCR) or other recording means. Referring to FIG. 23, the display presented for the user includes a listing of television programs, channels upon which those television programs are available, and times when those television programs will be aired. In the example shown in FIG. 23, the user has manipulated the available function keys on remote device 200 to select a particular television program 2305. Having selected the specific program 2305 as shown in FIG. 23, the remote device 200 may obtain the appropriate control information from internal tables to program a VCR to record the specified program. Additionally, an informational message is displayed for a user such as the message illustrated in FIG. 24.

Figure 26:
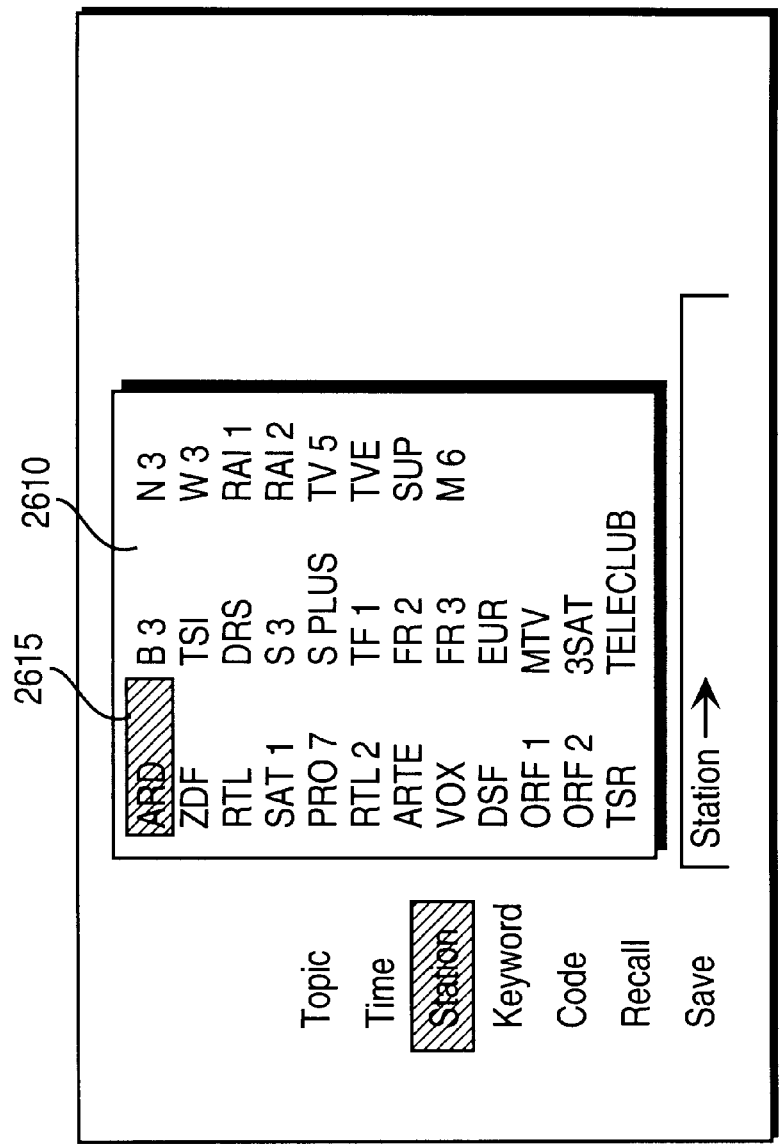
Figure 26:
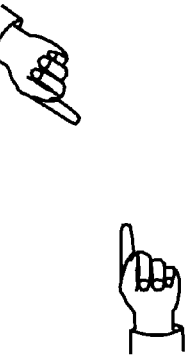
Figure 27:
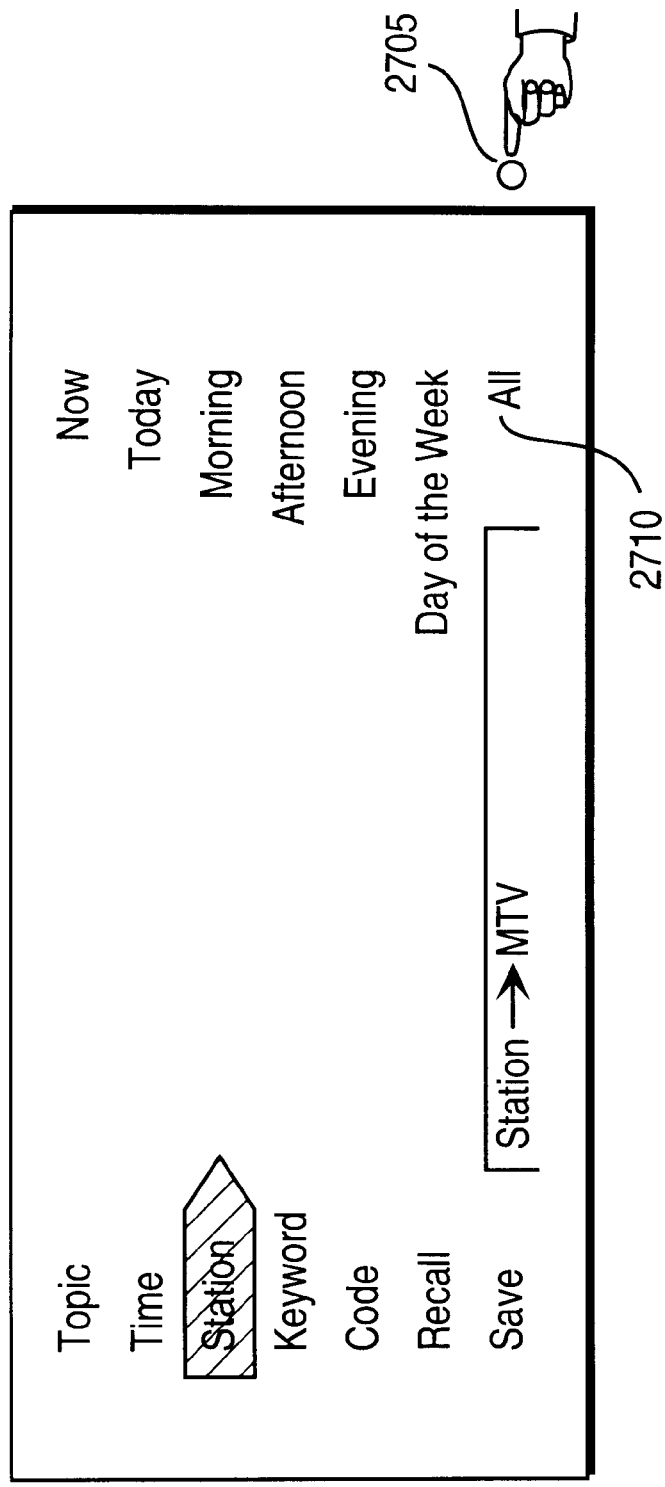
Figure 28:
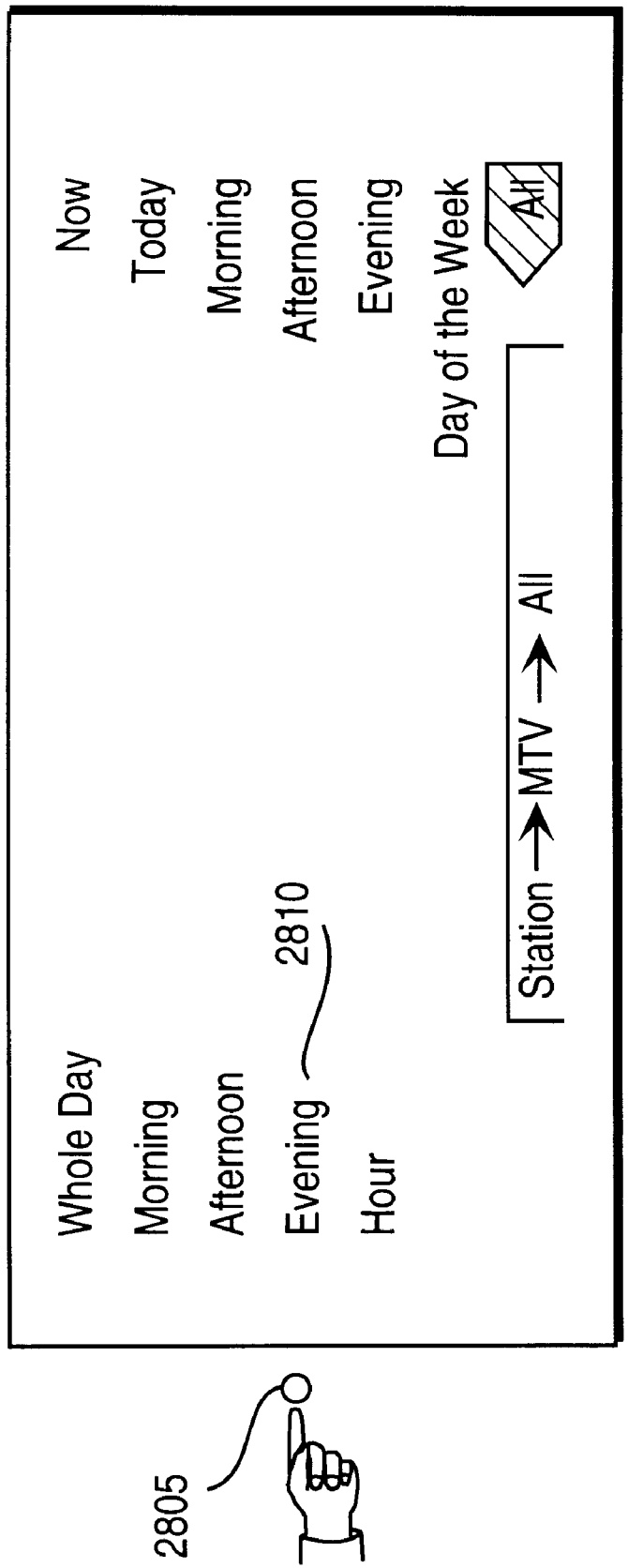

Referring now to FIGS. 25 through 29, an example illustrates the operation of the present invention for selecting the display of programming to be shown on a particular channel during a particular timeframe. In the example shown in FIG. 25, the user selects menu item 2510 using function key 2505. As a result, the program station list 2610 as illustrated in FIG. 26 is displayed. The user may then select, using cursor keys (up/down/left/right) on the remote device 200, a particular channel of interest such as channel 2615 as shown in FIG. 26. As a result of this selection, the channel list 2610 is removed and the display illustrated in FIG. 27 is presented for the user. In this case, the user has selected the station function and the particular station of interest. In this case, the user is prompted to enter a particular time frame of interest. In the example shown in FIG. 27, the user selects menu item 2710 using function key 2705. As a result, the information displayed in FIG. 28 is presented for the user. Referring now to FIG. 28, the user selects menu item 2810 using function key 2805 as shown in FIG. 28. As a result, the information as illustrated in FIG. 29 is illustrated for the user. According to this sequence of function key activations, the user has selected a particular station and a particular time frame corresponding to programming provided on that station. The list of information corresponding to this programming query is illustrated for the user as a list of programs available on that channel at the specified time frame.

Referring now to FIGS. 30 through 34, an example illustrates the operation of the present invention for selecting a particular program containing a specified characteristic. In this example, the present invention executes a query to determine a particular specified movie having a particular specified actor associated with that movie.

Figure 30:
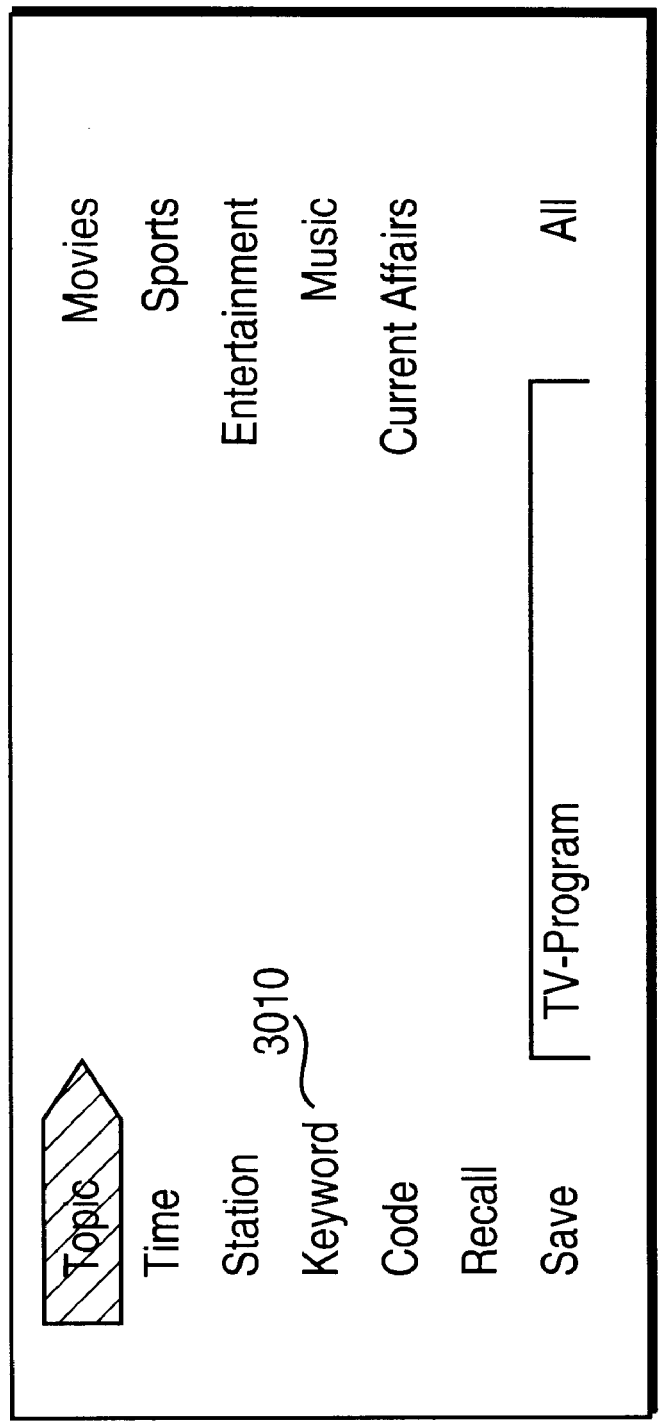
Figure 31:
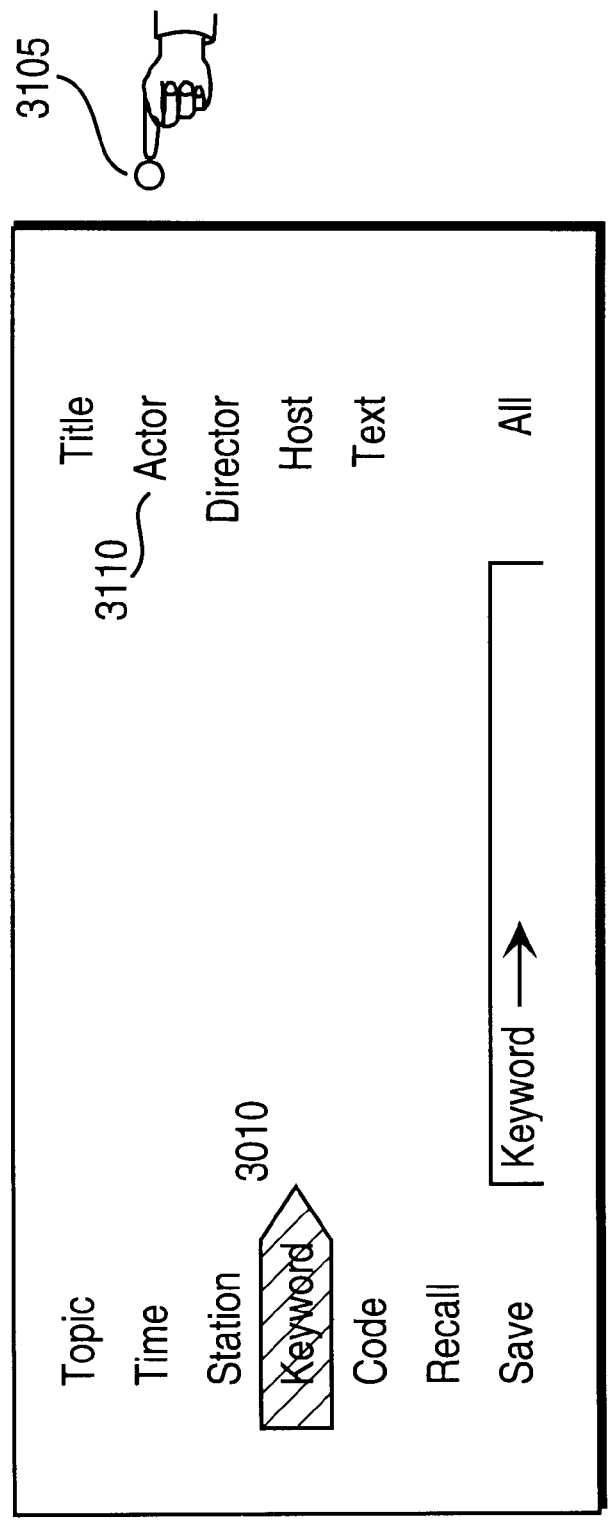
Figure 32:
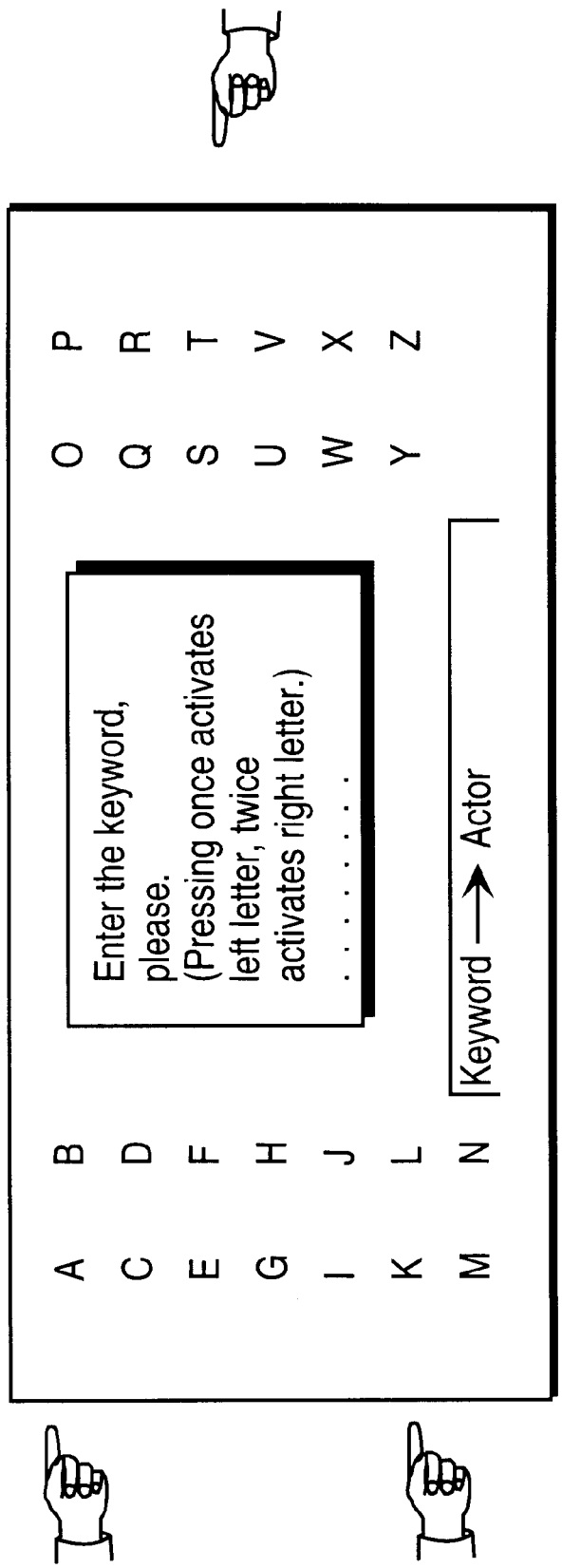
Figure 33:
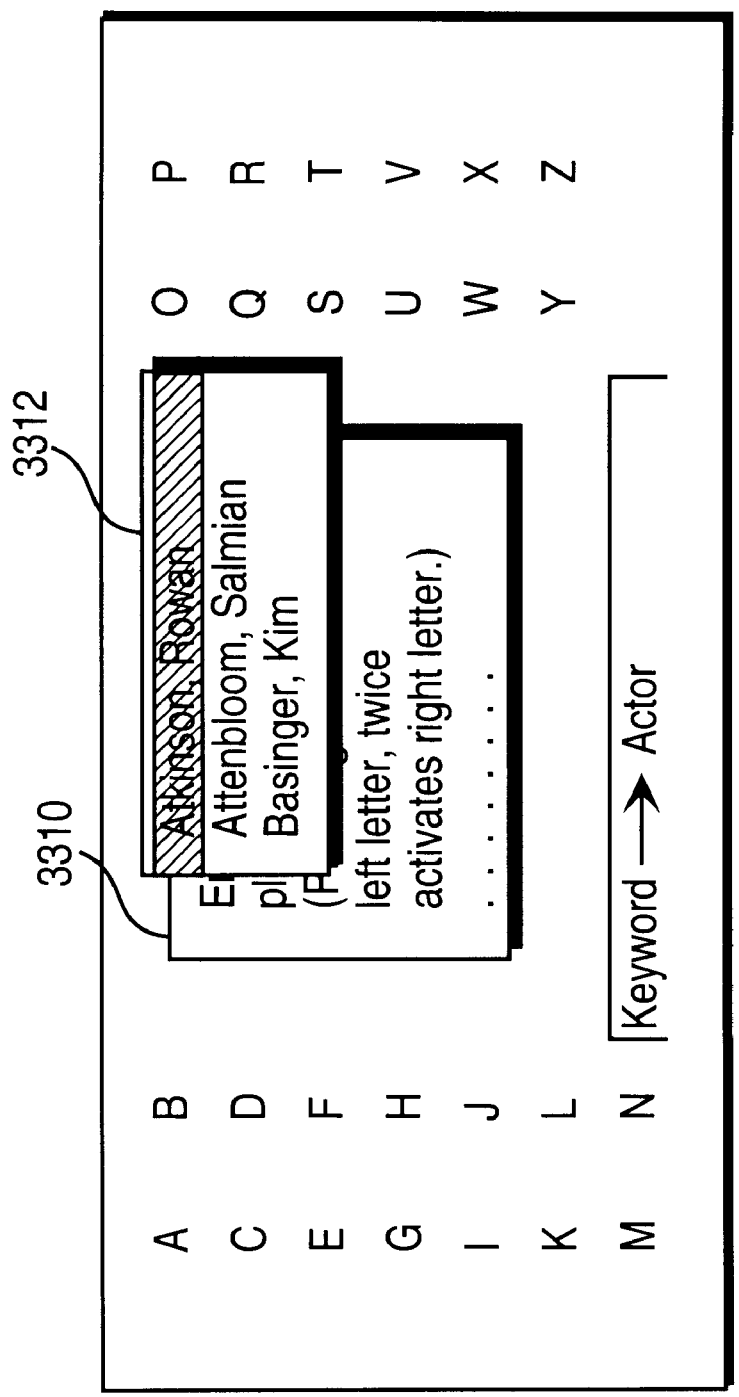

Referring now to FIG. 30, the user activates the menu item 3010 using function key 3005. As a result, the menu illustrated in FIG. 31 is displayed for the user. As shown in FIG. 31, the user then selects menu item 3110 using function key 3105. As a result, the information displayed for the user is illustrated in FIG. 32. In this case, the user is presented with an alphabet with which he/she can type in the keyword associated with the desired characteristic. Other ways of character input are conceivable/possible. In this example, the user can enter the name of the actor of interest in the window 3310 shown in the example of FIG. 33. Only a single character, or a few initial characters of the name may be needed to uniquely identify the selection or the name may be selected from the list in the additional selection window 3312 shown in the example of FIG. 33. The complete name is filled in automatically after a number of characters have been entered to uniquely identify the selection. Once this is complete, the information displayed is illustrated in FIG. 33. In this case, a particular actor has been identified to the system using the alphabetic menu display. As a result of the entry of this keyword, the present invention searches for programming containing the keyword and corresponding characteristic. Having found matching programming, the information is displayed such as the information display illustrated in FIG. 34. Again, note that the status area 1220 illustrates the sequence of key activations up to the present point.

Figure 35:
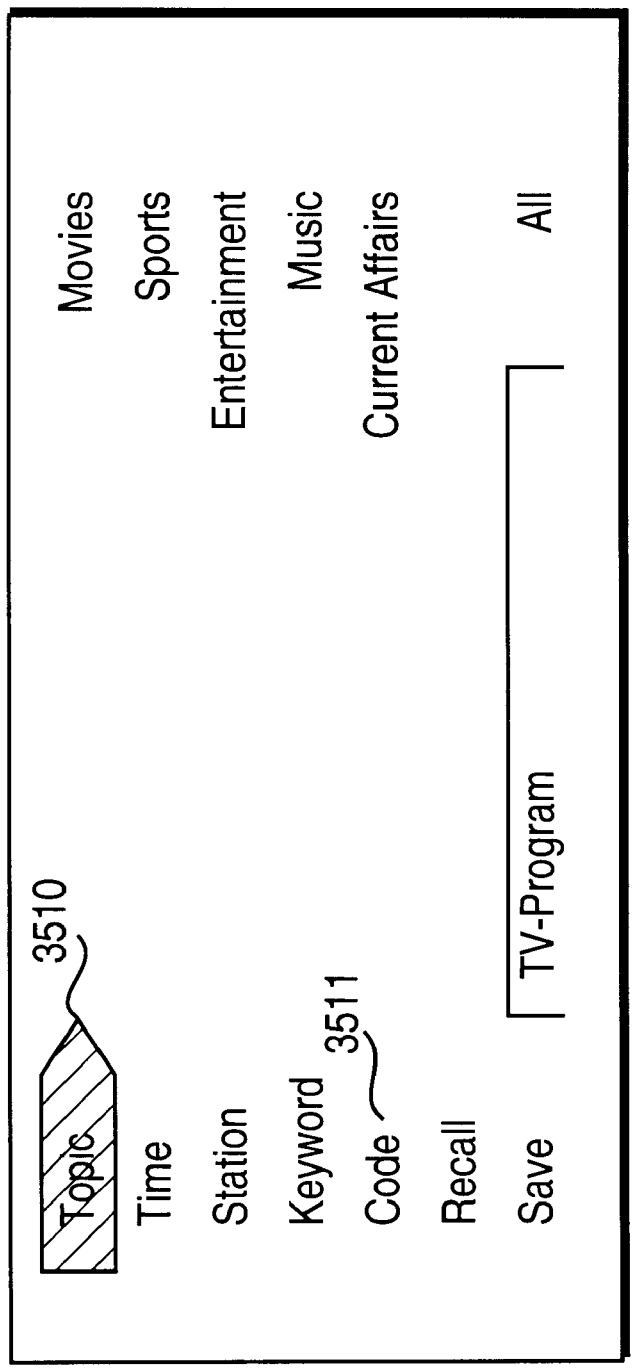
Figure 36:
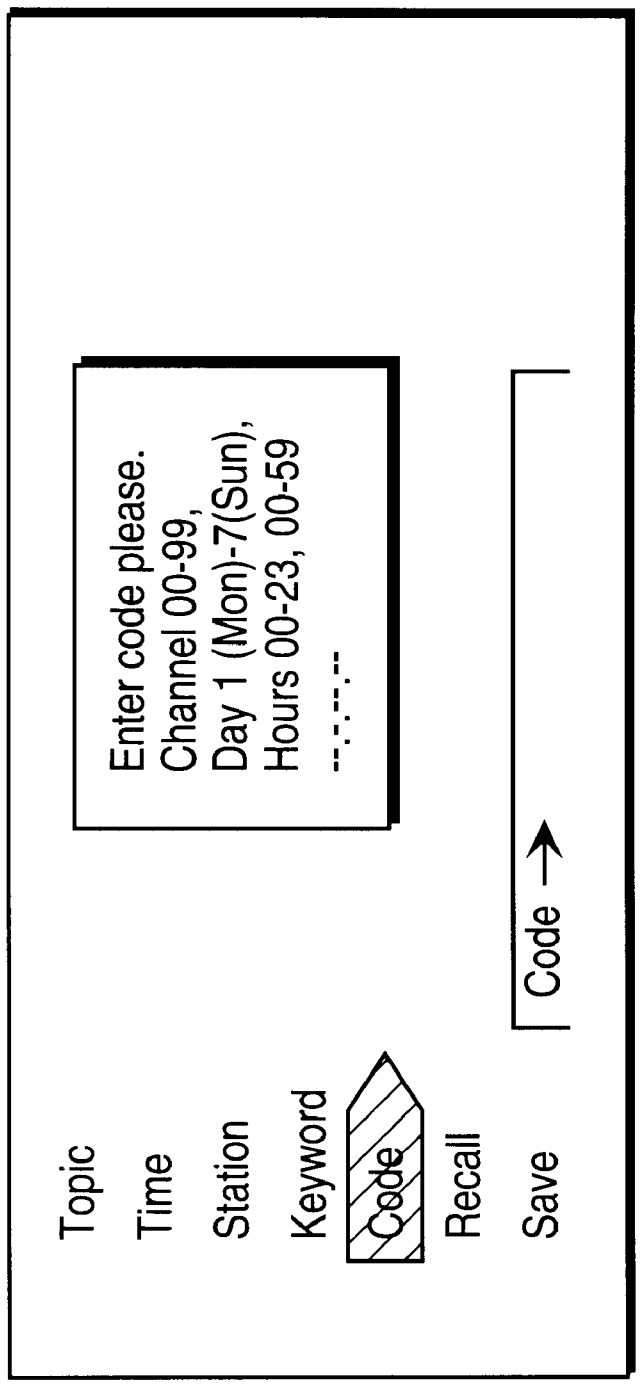
Figure 37:
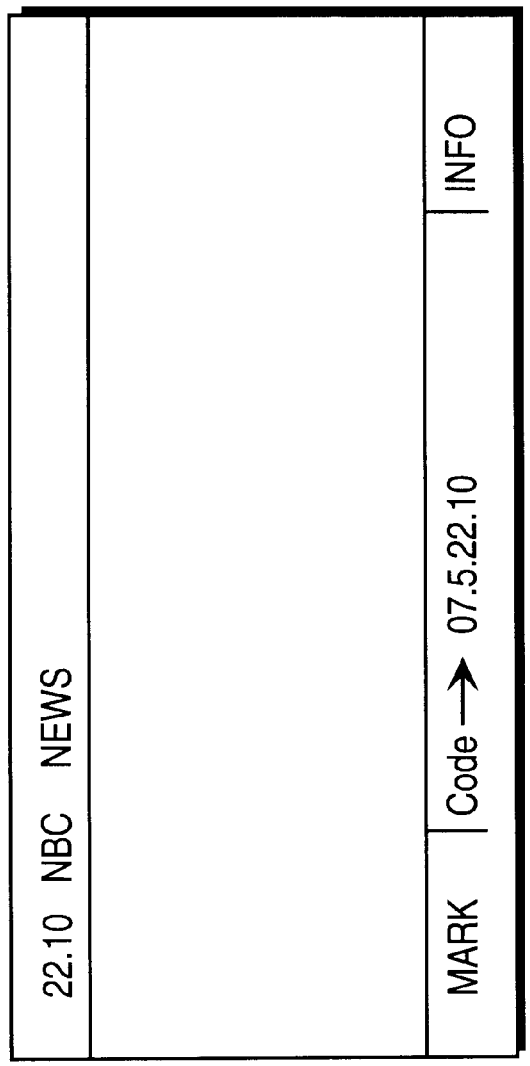
Figure 38:
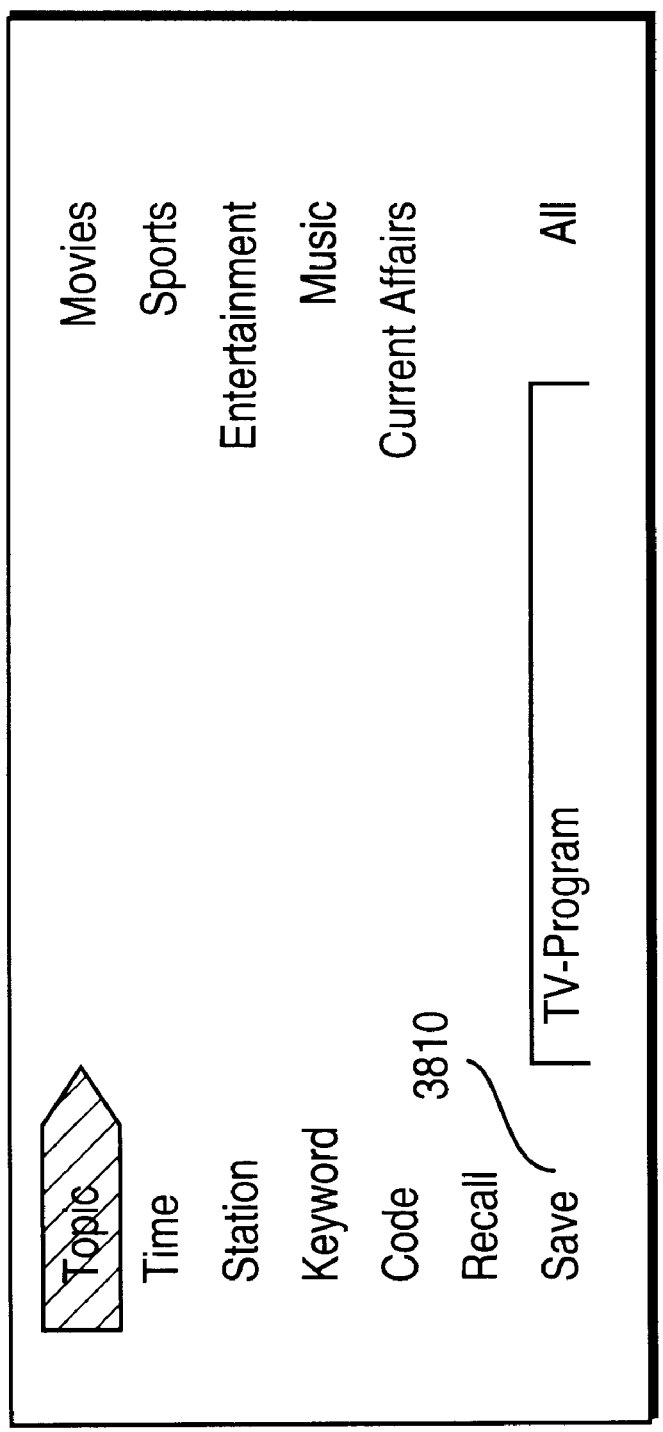
Figure 38:
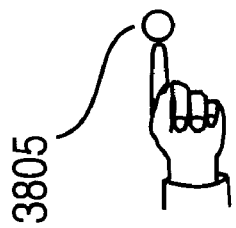

FIGS. 35 through 37 illustrate the operation of the present invention for entering a code number associated with a particular television program. In FIG. 35, a user selects menu item 3511 using function key 3505. The result of this user action is illustrated in FIG. 36. In FIG. 36, a message is displayed to the user to prompt the user to enter the appropriate code number. In the preferred embodiment, such code numbers include a two-digit channel field, a one-digit day of the week field, and a four-digit time field comprising two digits per hour and two digits per minute. In response to this prompt message, the user enters the desired code number using function keys available on remote device 200. The result of this user action is illustrated in FIG. 37. In FIG. 37, the particular television program associated with the user-entered code number is displayed on the display device 240.

Figure 39:
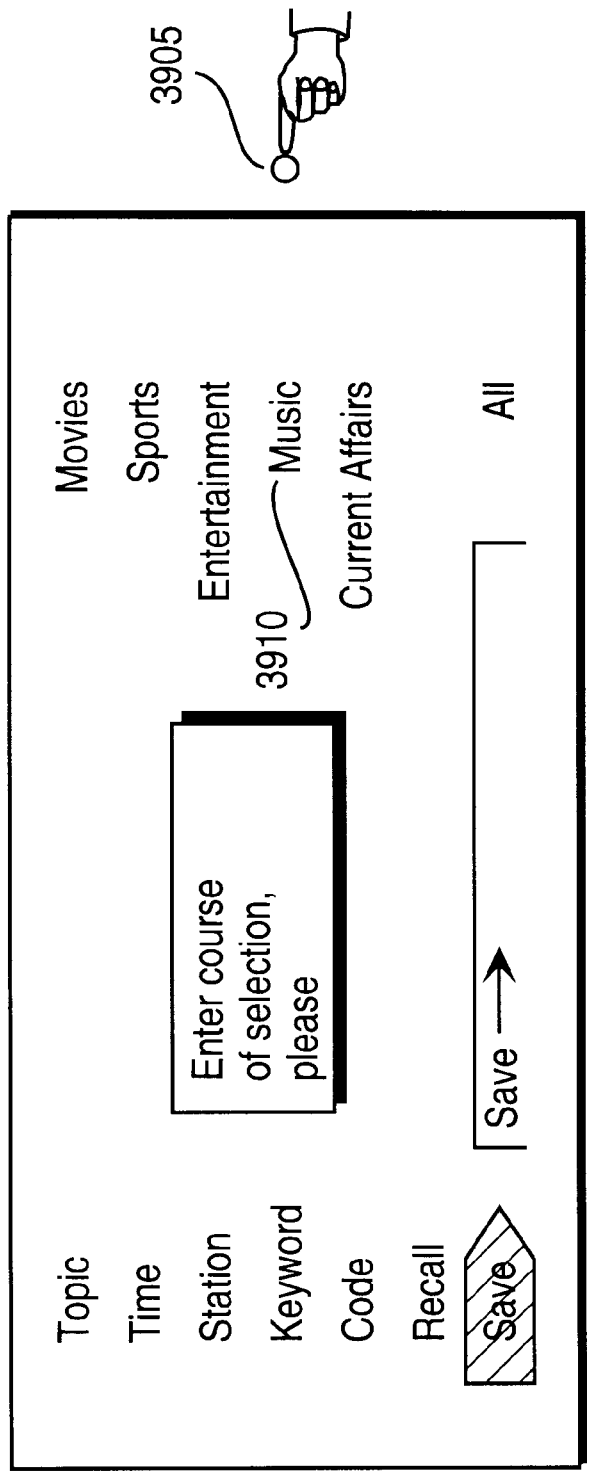

Referring now to FIGS. 38 through 43, a set of menu displays illustrate the operation of the present invention for saving an often used course of selection or for storing personal preferences. As an initial step to invoke this functionality, the user selects menu item 3810 using function key 3805. The result of this user action is illustrated in FIG. 39. The save function allows a user to record a sequence of user function key activations and associate a name with the particular sequence of actions. Once a user has performed the selection process, such as the selection of a particular personal preference, one single time and named the sequence of selections, e.g., MUSIC, the user may simply press "Recall" and "MUSIC" to receive a list of programs that meet these particular qualifiers according to the preselected us er preferences. As described below, the user can delete a personal preference not needed any longer.

Figure 40:
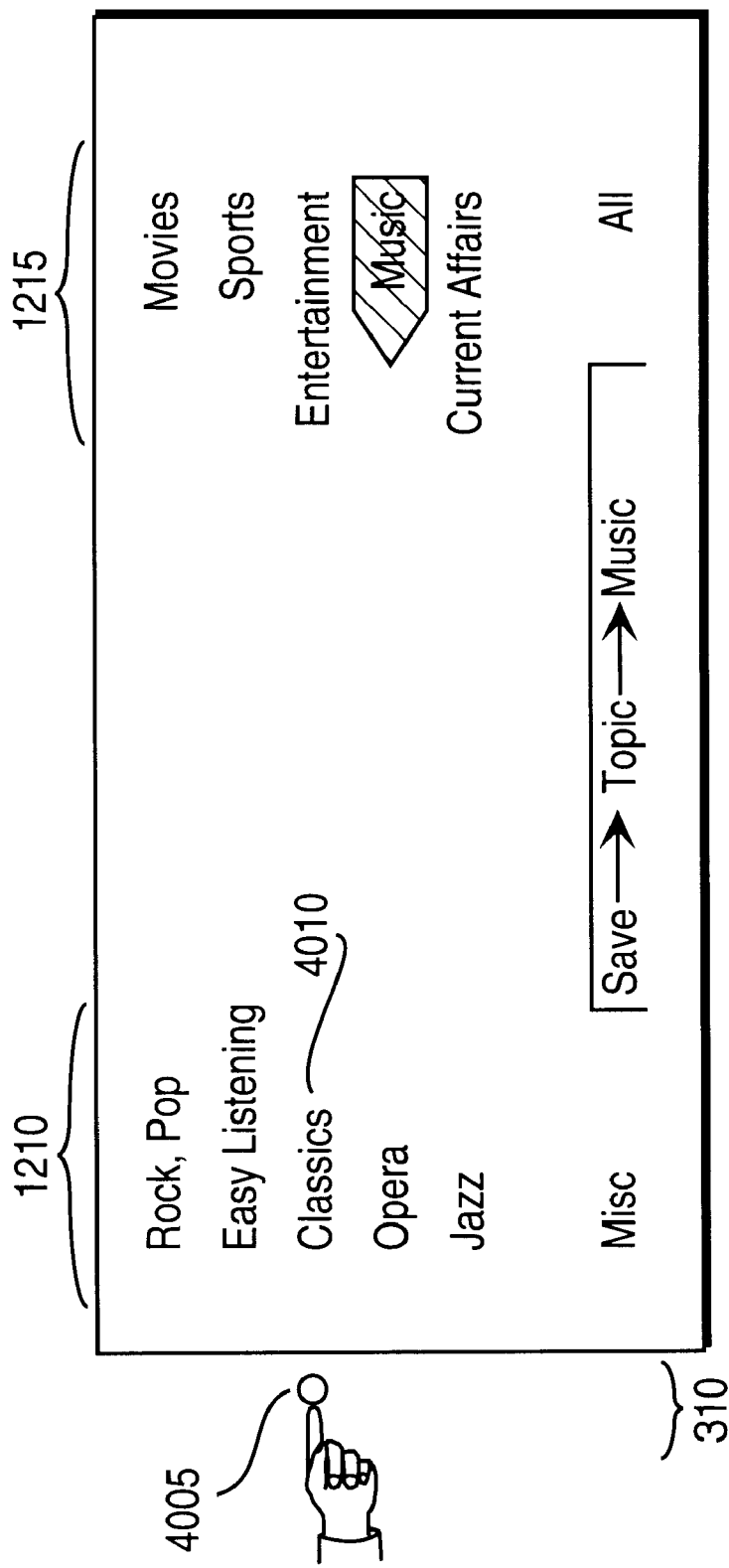
Figure 41:
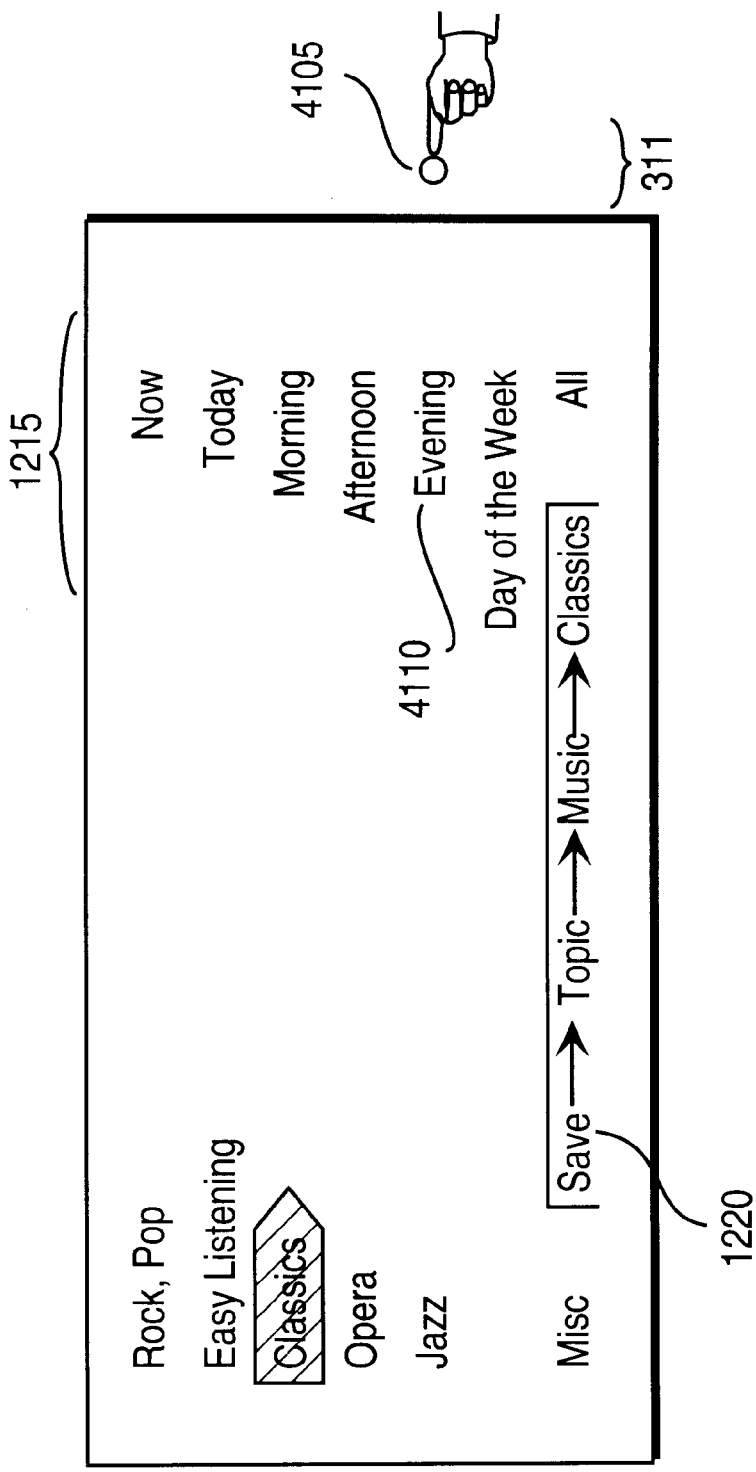
Figure 42:
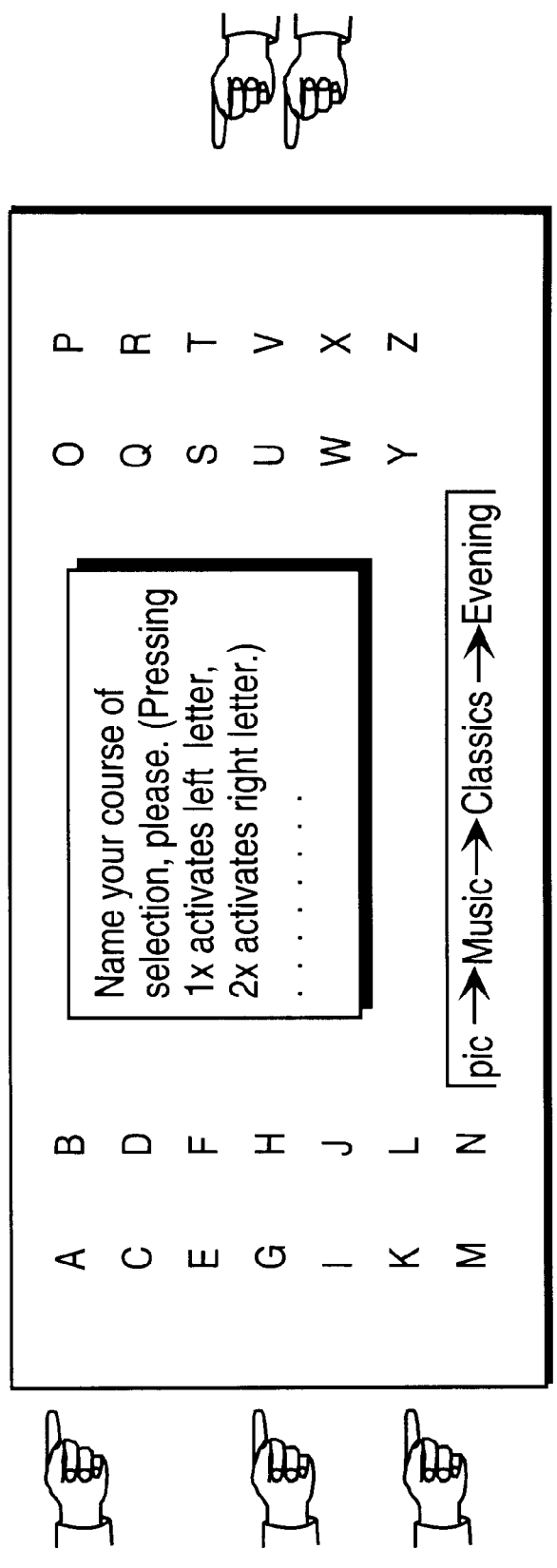

In FIG. 39, the user is prompted to begin this sequence of user activations. In the example of FIG. 39, the user begins by activating menu item 3910 using function key 3905. The result of this action is illustrated in FIG. 40. As a result of the user activation of menu item 3910, the menu items on the opposite side of the display (i.e. first display area 1210) are replaced with submenu items corresponding to the user selection of menu item 3910. The user may now use one of the function keys 310 to activate a menu item in display area 1210. In the example of FIG. 40, the user selects menu item 4010 using function key 4005. The result of this user action is illustrated in FIG. 41. In FIG. 41, it can be seen that the menu items in the display area on the opposite side (i.e. second display area 1215) are replaced with submenu items corresponding to the selection of menu item 4010. Note that status area 1220 has been updated to identify the sequence of menu selections entered by the user so far. At this point, the user may select one of the menu options in display area 1215 using function keys 311. In the example of FIG. 41, the user selects menu item 4110 using function key 4105. The result of this user action is illustrated in FIG. 42. Having completed a sequence of user actions, the user is prompted by the message illustrated in FIG. 42 for the entry of a name of the recorded sequence of user actions. The user may use the alphabetic characters and function keys to enter a user defined name for the sequence of user actions. The entered name is recorded and the programs associated with the sequence of user actions is displayed as illustrated in FIG. 43.

Figure 44:
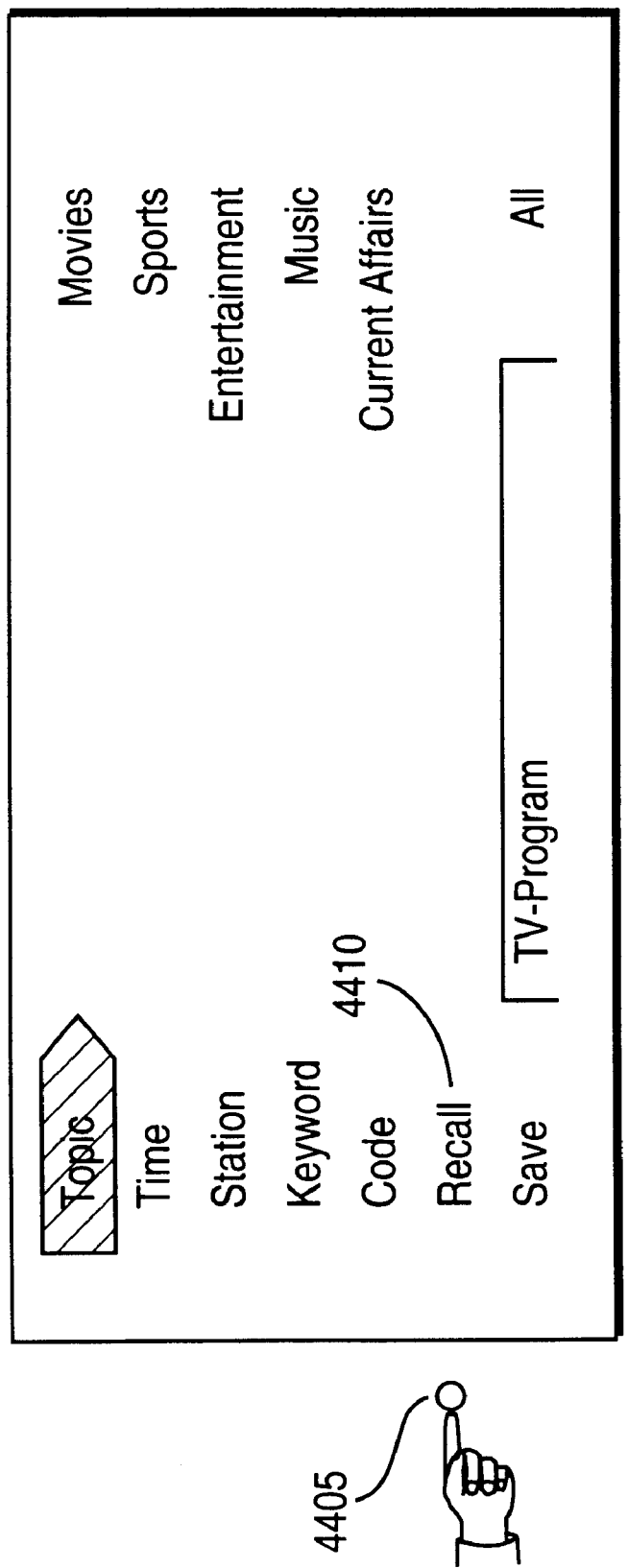
Figure 45:
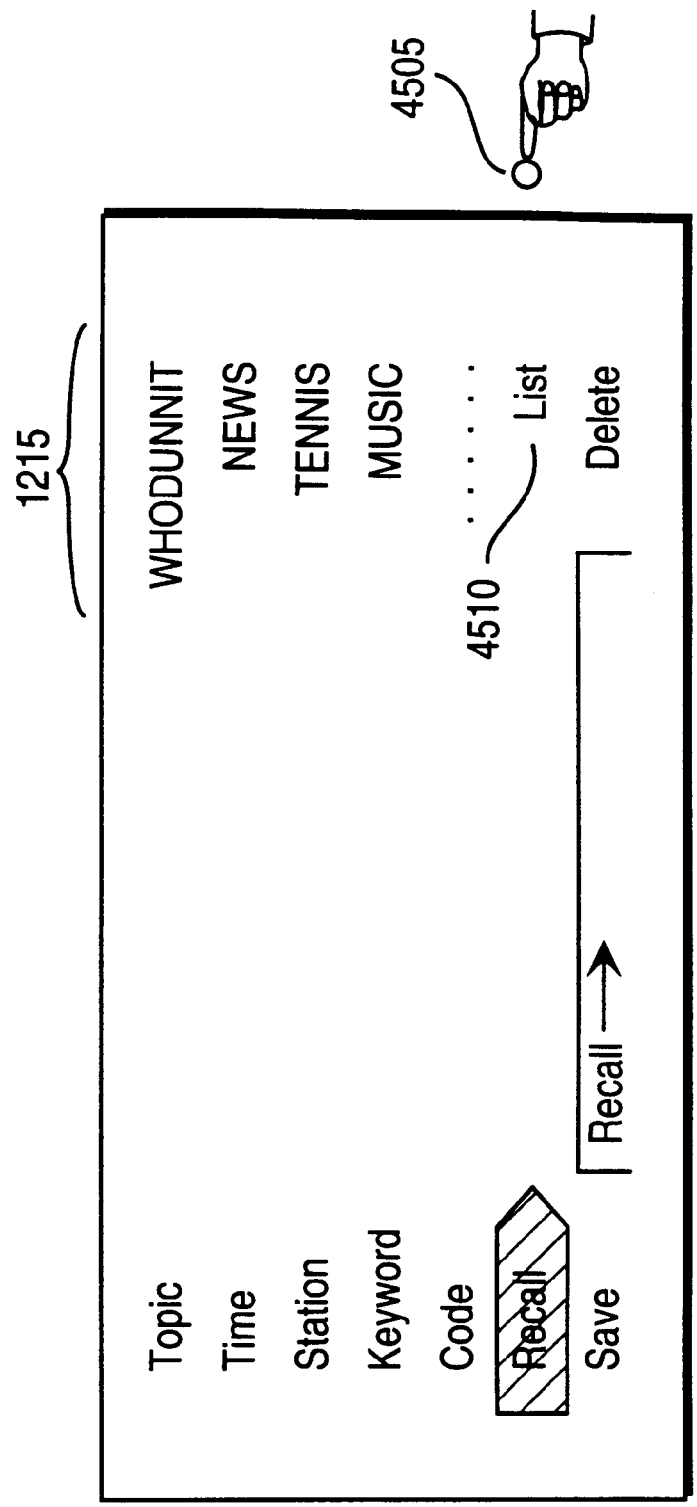
Figure 46:
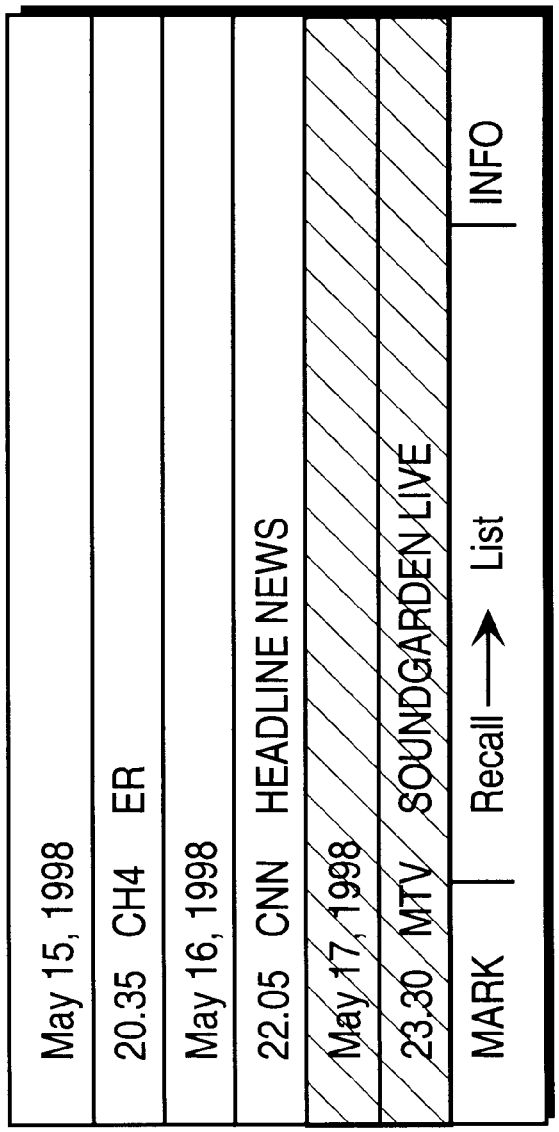

Referring now to FIGS. 44 through 46, a set of menu displays illustrate the operation of the present invention for recalling a list of marked programs. By selecting the recall function and pressing the appropriate softkey (e.g., MUSIC) complex selection steps may be reduced to very few keystrokes. As illustrated in FIG. 44, the menu item 4410 is selected using function key 4405. The result of this user action is illustrated in FIG. 45. As illustrated in FIG. 45, a set of user defined categories of previously marked programs is illustrated in second display area 1215. In the example of FIG. 45, the user selects menu item 4510 using function key 4505. As a result, a list of marked programs is displayed as illustrated in FIG. 46. A marked program may be selected and additional information requested or programmed into the VCR. Additionally, a delete softkey allows removal of the marked program from the list if it is not of interest anymore. Marked programs of the past may be automatically deleted.

Figure 47:
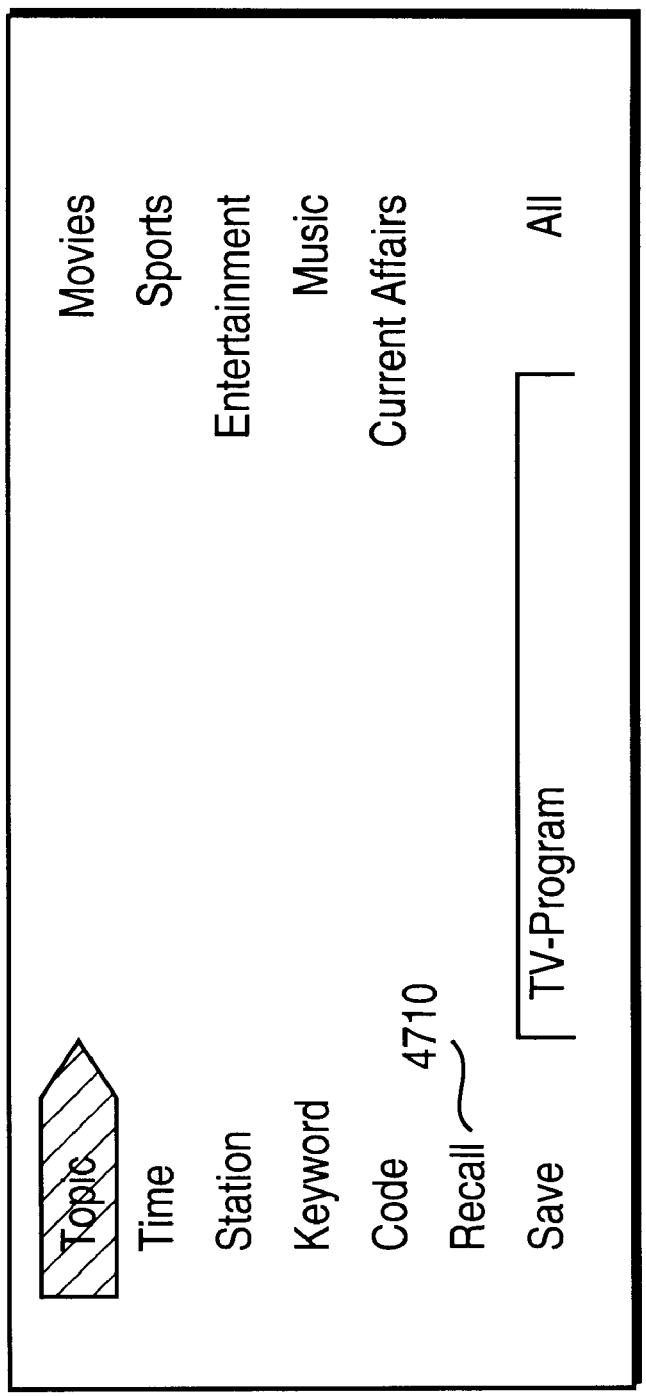
Figure 48:
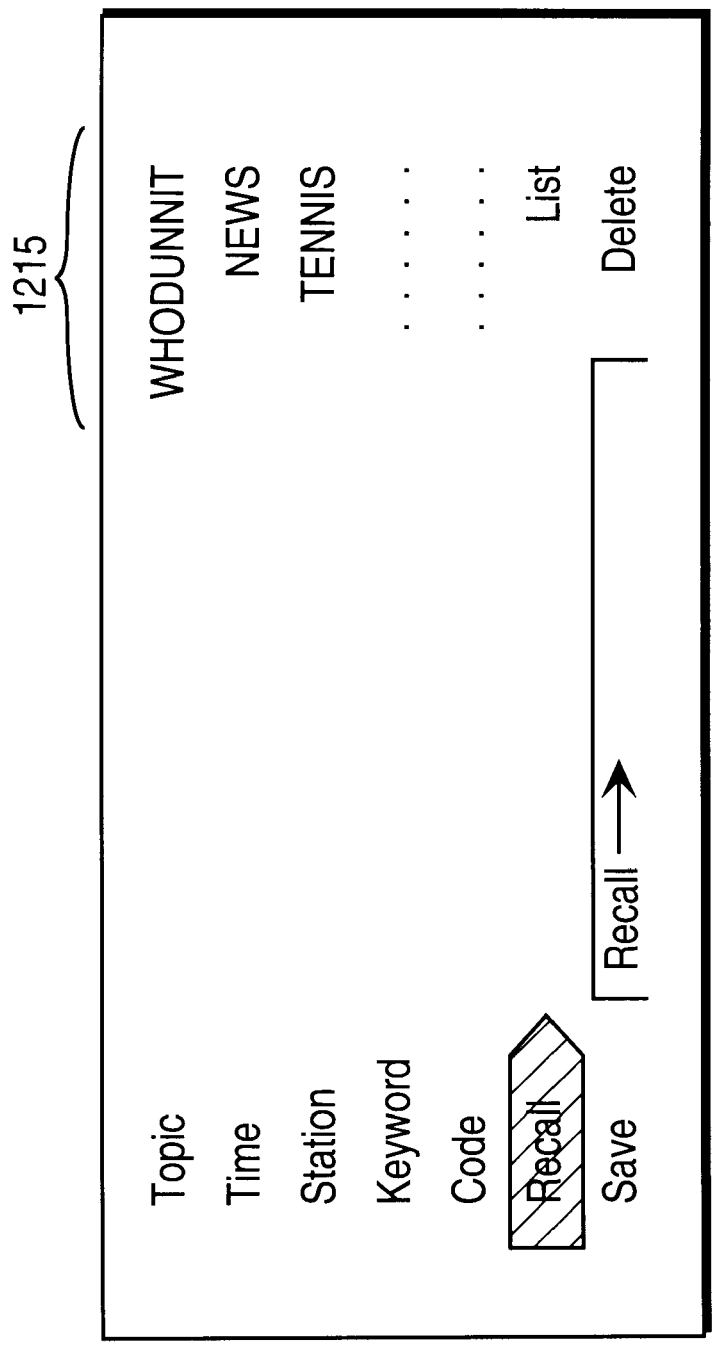
Figure 49:
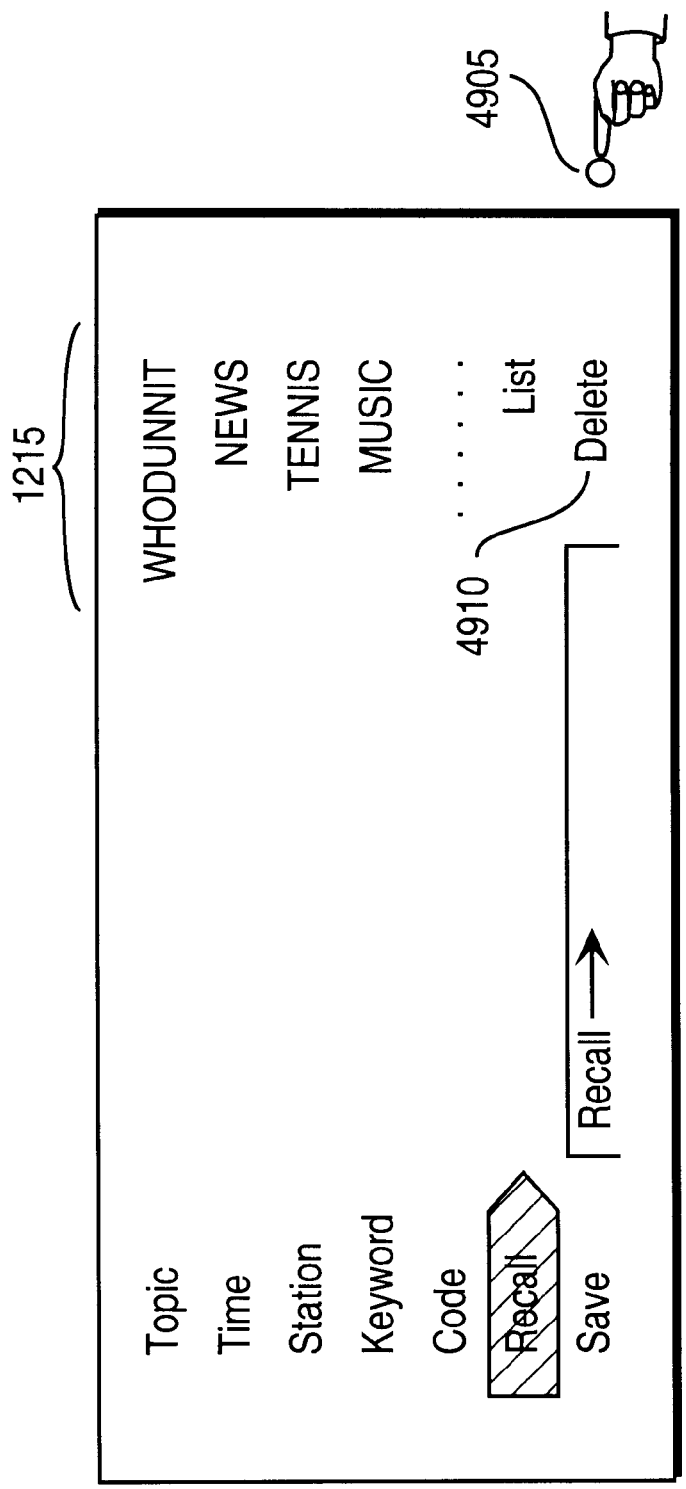
Figure 50:
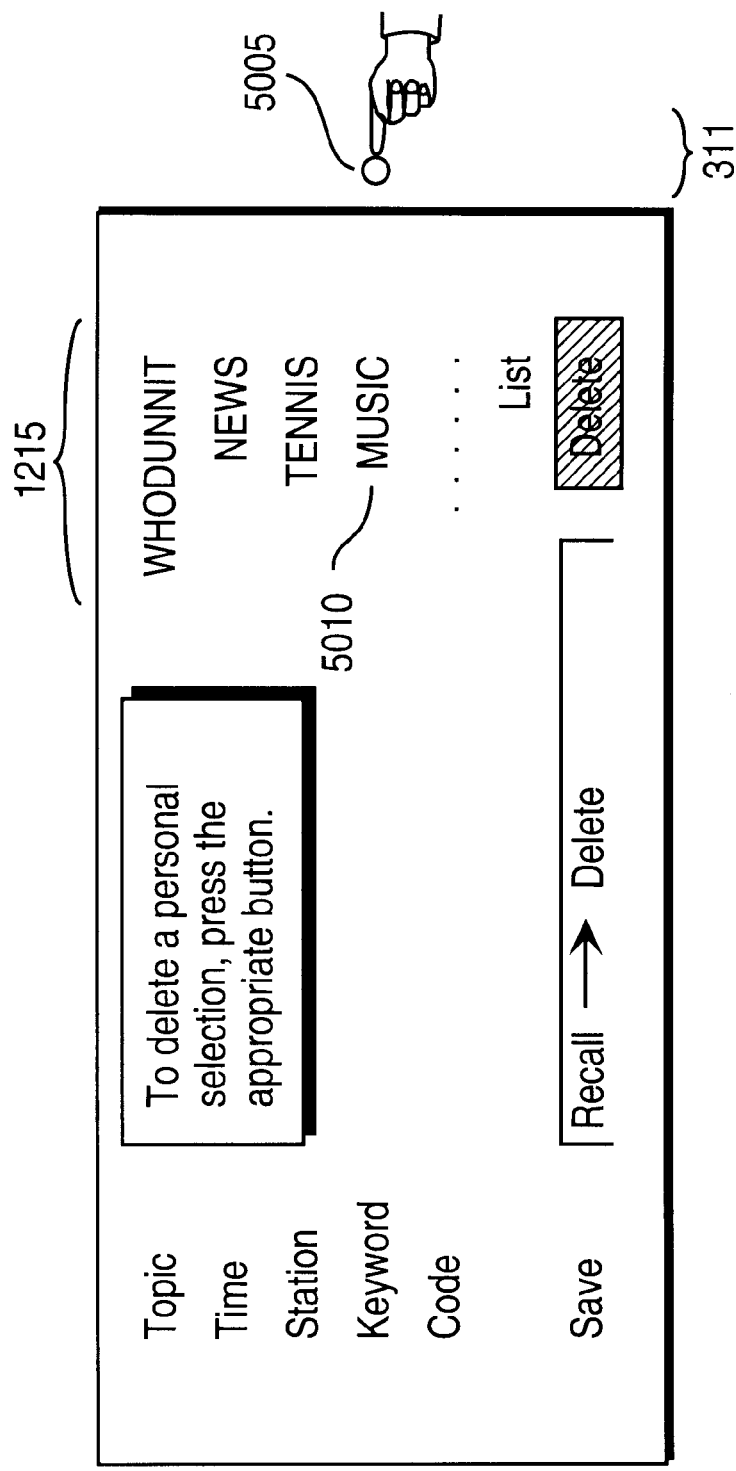
Figure 51:
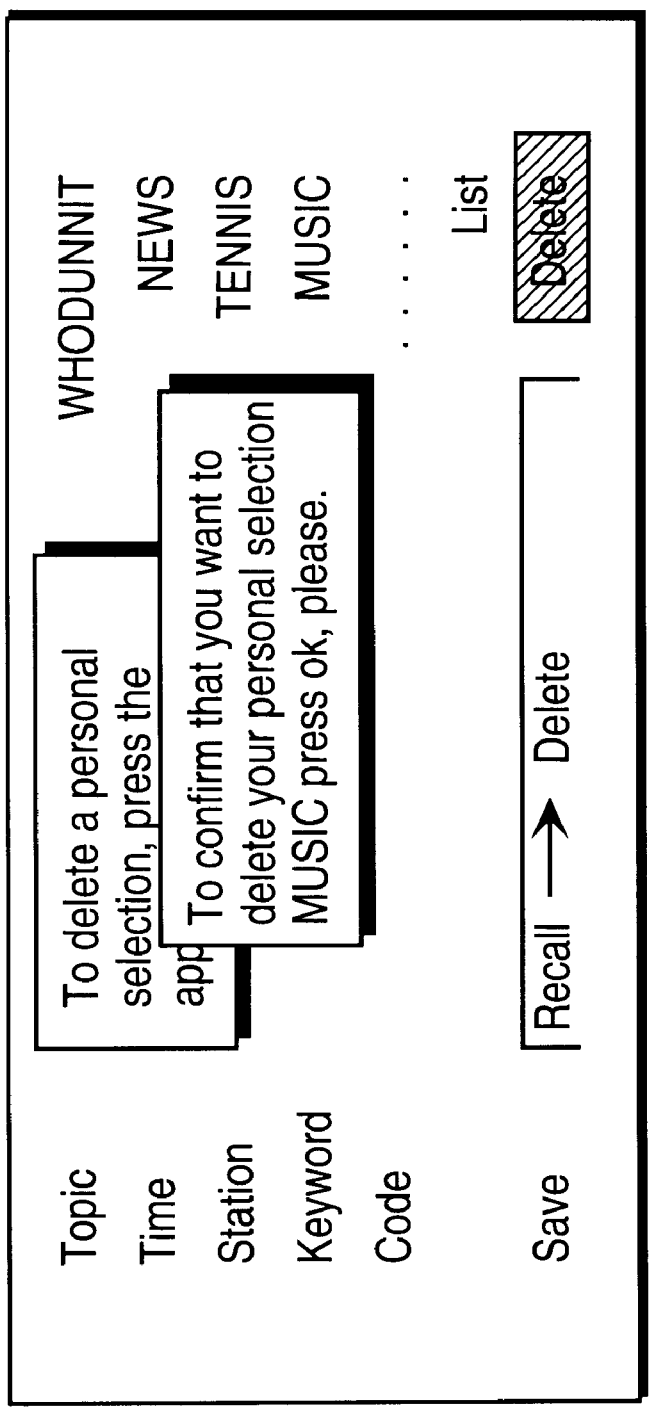

Referring now to FIGS. 47 through 51, a set of menu displays illustrate the operation of the present invention for deleting the complete list of marked programs or personal programming selections. Referring to FIG. 47, a user invokes this functionality by selecting menu item 4710 using function key 4705. The result of this user action is displayed in FIG. 48. As illustrated in FIG. 48, the menu items in second display area 1215 have been replaced with a list of marked programs or personal selections as a result of the selection of menu item 4710. In an alternative example, FIG. 49 illustrates an alternative example of the menu display as a result of the activation of menu item 4710. As shown in FIG. 49, the user selects the "delete" menu 4910 using function key 4905. As a result, a message is displayed for the user as shown in FIG. 50. This message prompts the user to select the personal selection or marked program to delete. In the example of FIG. 50, the user selects item 5010 for deletion using function key 5005. As a result of this user action, the user receives a message asking for confirmation of the deletion as illustrated in FIG. 51. In response to this prompt for confirmation, the user activates a predefined function key such as an "OK" button to confirm the deletion. As a result of this action the marked program or personal selection is deleted.

Figure 52:
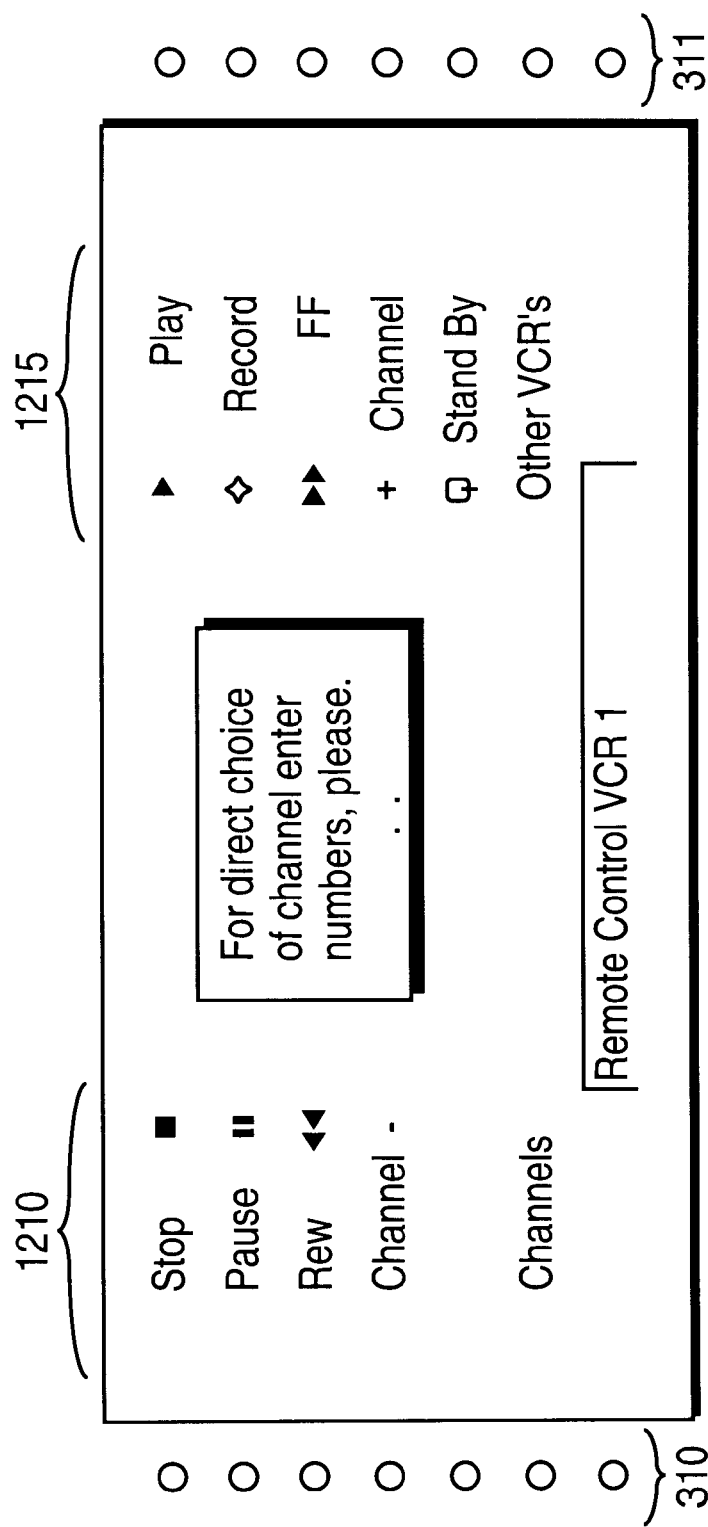
Figure 53:
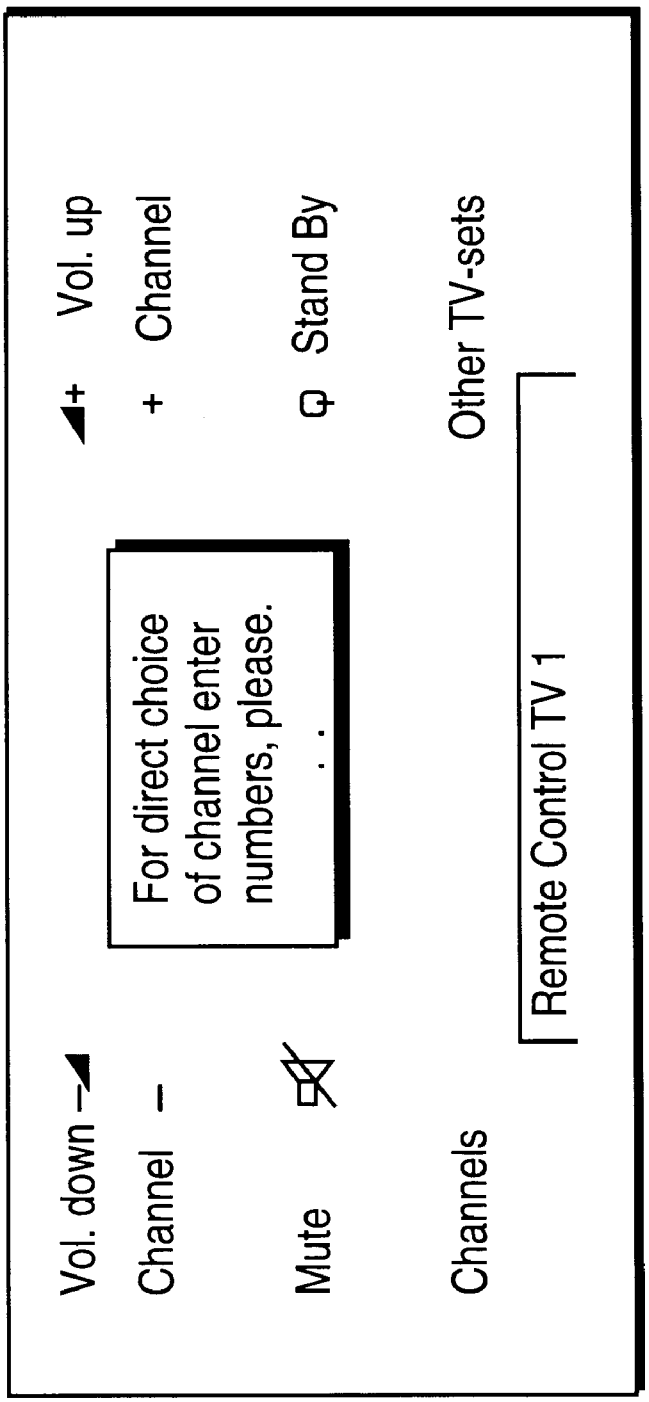

Referring now to FIGS. 52 and 53, other menu displays illustrate the operation of the present invention for controlling a television monitor and/or a video cassette recorder (VCR). In FIG. 52, various menu items are displayed in first display area 1210 and second display area 1215. These menu items correspond to standard functions provided on conventional VCRs. Any of these functions can be selected using function keys 310 or 311 provided on remote device 200. As a result of the activation of one of these menu items, remote device 200 emits well-known infrared coded signals to invoke the selected function in the VCR. Similarly as illustrated in FIG. 53, menu items corresponding to standard functions in a conventional television set are displayed in first display area 1210 and second display area 1215. These functions may also be selected using function keys 310 or 311. In similar fashion, the remote device 200 emits IR signals to the television receiver corresponding to the selected function. In this manner, remote device 200 can be used to control a standard VCR or television set.

Thus, a hand-held device and system for monitoring and controlling electronic devices using a dual partition user interface with a dual partition selection means is disclosed. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A control device for monitoring and controlling an electronic device, comprising:

a display component for displaying a dual partition selection list, the dual partition selection list having a first selection list and a second selection list, at least a portion of the first selection list and at least a portion of the second selection list being at least partly concurrently displayable on the display component; and a selection component for selecting elements from the dual partition selection list, the selection component having a first selection component for selecting elements from the first selection list, a selection made from the first selection list using the first selection component causing a display of corresponding items in the second selection list while the first selection list is at least partly concurrently displayed, a selection made from the second selection list using the second selection component causing a display of corresponding items in the first selection list while the second selection list is at least partly concurrently displayed.

2. The control device as claimed in claim 1 wherein the display component and the selection component resides in a hand-held device.

3. The control device as claimed in claim 1 wherein the display component is a monitor and the selection component resides in a hand-held device.

4. The control device as claimed in claim 1 further including a data interface for receiving information from a network.

5. The control device as claimed in claim 4 wherein the information includes electronic program guide information.

6. The control device as claimed in claim 1 wherein the selection component includes a selection for activating a function for selecting a program by program time.

7. The control device as claimed in claim 1 wherein the selection component includes a selection for activating a function for selecting a program by program type.

8. The control device as claimed in claim 1 wherein the selection component includes a selection for activating a function for selecting a broadcast station.

9. The control device as claimed in claim 1 wherein the selection component includes a selection for activating a function for selecting a program by keyword.

10. The control device as claimed in claim 1 wherein the selection component includes a selection for activating a function for selecting and recalling personal preferences.

11. The control device as claimed in claim 1 wherein the selection component includes a selection for activating a function for displaying detailed information about a particular program.

12. The control device as claimed in claim 1 wherein the selection component includes a selection for activating a marking function for marking at least one program for application of further specified functions.

13. The control device as claimed in claim 1 wherein the display component includes an information display for displaying a history of user selections previously made.

14. The control device as claimed in claim 1 wherein the selection component includes a function for automatically rearranging menu selections based on a history of user selections previously made.

15. The control device as claimed in claim 1 further including a non-volatile memory device for storing a unique identifier.

16. A hand-held control device for monitoring and controlling an electronic device, comprising:
   a base unit including a VBI decoder and a modem; and
   a personal navigator coupled to the base unit via a data link, the personal navigator further including a display component for displaying a selection list including information received from the VBI decoder or the modem, the display component being housed in a hand-held control device.

17. The control device as claimed in claim 16 wherein the information includes electronic program guide information.

18. The control device as claimed in claim 16 wherein the functionality of the base station is integrated into a set-top box.

19. The control device as claimed in claim 16 wherein the data link further includes a bidirectional IR link.

20. The control device as claimed in claim 16 wherein the data link further includes a bidirectional RF link.

21. The control device as claimed in claim 16 further including a non-volatile memory device for storing a unique identifier.

22. A hand-held control device for monitoring and controlling an electronic device, comprising:
   a base unit including a microcontroller and an interface coupled to the microcontroller for receiving external information; and
   a personal navigator coupled to the base unit via a data link, the personal navigator further including a display component for displaying a selection list including at least a portion of the external information received from the interface, the display component being housed in a hand-held control device.

23. The control device as claimed in claim 22 wherein the interface further includes a VBI decoder for receiving external information via a VBI encoded signal.

24. The control device as claimed in claim 22 wherein the interface further includes a modem for receiving external information via a telephone network.

25. The control device as claimed in claim 22 wherein the interface further includes a VBI decoder and a modem for receiving external information via a VBI encoded signal and a telephone network.

26. The control device as claimed in claim 22 wherein the interface further includes a cable modem for receiving external information via an encoded cable signal.

27. The control device as claimed in claim 22 wherein the interface further includes a set-top box interface for receiving external information via a set-top box.

28. The control device as claimed in claim 22 wherein the interface further includes a wireless receiver for receiving external information via an RF signal.

29. The control device as claimed in claim 22 wherein the external information includes electronic program guide information.

30. The control device as claimed in claim 22 wherein the external information includes electronic commerce information.

31. The control device as claimed in claim 22 wherein the external information includes information obtained from the Internet.

32. The control device as claimed in claim 22 wherein the external information includes electronic mail information.

33. The control device as claimed in claim 22 wherein the external information includes control code information.

34. The control device as claimed in claim 22 wherein the external information includes software or firmware upgrades for the base unit or the personal navigator.

35. The control device as claimed in claim 22 further including a non-volatile memory device coupled to the microcontroller for storing a unique identifier.

36. The control device as claimed in claim 22 wherein the personal navigator further includes a smart card interface for receiving additional external information.

37. The control device as claimed in claim 22 wherein the functionality of the base unit and the functionality of the personal navigator is integrated together into the same unit.

38. The control device as claimed in claim 22 wherein the functionality of the base unit is integrated into a set-top box.

39. The control device as claimed in claim 22 wherein the personal navigator further includes functionality for use as a cordless telephone.

40. A hand-held control device for monitoring and controlling an electronic device, comprising:
   a base unit including a microcontroller and an interface coupled to the microcontroller for receiving external information; and
   a personal navigator coupled to the base unit via a data link, the personal navigator further including a display component for displaying a selection list including at least a portion of the external information received from the interface, the personal navigator further including a smart card interface for receiving additional external information, the display component being housed in a hand-held control device.

* * * * *